United States Patent
Nagasawa et al.

(10) Patent No.: US 11,469,913 B2
(45) Date of Patent: Oct. 11, 2022

(54) DATA COLLECTION SERVER, DATA UTILIZATION SERVER AND EQUIPMENT BASED ON USE FREQUENCY AMONG A PLURALITY OF STORAGE CORRESPONDING TO DIFFERENT LEVELS OF USE

(71) Applicant: Mitsubishi Electric Corporation, Tokyo (JP)

(72) Inventors: Masato Nagasawa, Tokyo (JP); Shoichiro Sakurai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/263,974

(22) PCT Filed: Aug. 23, 2019

(86) PCT No.: PCT/JP2019/033065
§ 371 (c)(1),
(2) Date: Jan. 28, 2021

(87) PCT Pub. No.: WO2020/040297
PCT Pub. Date: Feb. 27, 2020

(65) Prior Publication Data
US 2021/0234713 A1    Jul. 29, 2021

(30) Foreign Application Priority Data
Aug. 24, 2018    (JP) .............................. JP2018-157582

(51) Int. Cl.
*H04L 43/00*    (2022.01)
*H04L 12/14*    (2006.01)

(52) U.S. Cl.
CPC ...... *H04L 12/1435* (2013.01); *H04L 12/1442* (2013.01); *H04L 12/1485* (2013.01)

(58) Field of Classification Search
CPC ............. H04L 12/1435; H04L 12/1442; H04L 12/1482; G06F 3/0611; G06F 3/0659; G06F 3/064; G06F 3/061
See application file for complete search history.

(56) References Cited

U.S. PATENT DOCUMENTS 9,342,456 B2 *   5/2016   Kobayashi .......... G06F 11/3034
2006/0184565 A1*  8/2006   Nishikawa ............. G06F 3/064
(Continued)

FOREIGN PATENT DOCUMENTS

JP    2002-007873 A    1/2002
JP    2008-205878 A    9/2008
(Continued)

OTHER PUBLICATIONS

Office Action dated Dec. 7, 2021, issued for the corresponding JP patent application No. 2020-538492 and the English translation.
(Continued)

*Primary Examiner* — Abdelnabi O Musa
(74) *Attorney, Agent, or Firm* — Posz Law Group, PLC

(57) ABSTRACT

A data collection server includes a communicator, a use frequency estimator, and a data saver. The communicator receives device data from a device. The use frequency estimator estimates use frequency of the device data received by the communicator. The data saver stores the device data in, among a plurality of storage servers corresponding to different levels of use frequency, one of the plurality of storage servers that corresponds to the use frequency estimated by the use frequency estimator.

12 Claims, 75 Drawing Sheets

(56) References Cited

U.S. PATENT DOCUMENTS

| | | | |
|---|---|---|---|
| 2010/0064111 A1 | 3/2010 | Kunimatsu et al. | |
| 2016/0085480 A1* | 3/2016 | Chiu | G06F 3/061 |
| | | | 711/117 |
| 2016/0357451 A1* | 12/2016 | Chen | G06F 3/067 |
| 2019/0294550 A1* | 9/2019 | Hori | G09B 5/06 |

FOREIGN PATENT DOCUMENTS

| | | |
|---|---|---|
| JP | 2010-267187 A | 11/2010 |
| JP | 2011-022933 A | 2/2011 |
| JP | 2015-038484 A | 2/2015 |
| WO | 2020/067376 A1 | 4/2020 |

OTHER PUBLICATIONS

The Extended European Search Report dated Sep. 23, 2021 in the corresponding EP patent application No. 19852861.4.
International Search Report dated Nov. 5, 2019 issued in the corresponding International Application No. PCT/JP2019/033065 (and English translation).

\* cited by examiner

FIG. 2

| STORAGE SERVER | STORAGE FEE | RETRIEVE FEE | RETRIEVE SPEED |
|---|---|---|---|
| STORAGE A | HIGH | NO CHARGE | HIGH |
| STORAGE B | LOW | HIGH | NORMAL |
| STORAGE C | LOW | LOW | LOW |

FIG. 3

| DEVICE ID | DETAILS | DATE AND TIME |
|---|---|---|
| XXX (AIR CONDITIONER) | COOLING TURNED ON | 2018/9/1 08:30 |
| | SET TEMPERATURE 25 °C | 2018/9/1 08:42 |
| | ROOM TEMPERATURE 27 °C | 2018/9/1 09:00 |
| | WIND DIRECTION SET DOWNWARD | 2018/9/1 09:17 |

⋮

| XXX (AIR CONDITIONER) | SET TEMPERATURE 27 °C | 2018/9/1 14:49 |
|---|---|---|
| | ROOM TEMPERATURE 27 °C | 2018/9/1 15:00 |

⋮

| YYY (WATER HEATER) | HOT WATER FILLING TURNED ON | 2018/9/1 18:44 |
|---|---|---|
| | SET HOT WATER TEMPERATURE 40 °C | 2018/9/1 18:44 |
| | SET HOT WATER AMOUNT 80% | 2018/9/1 18:44 |
| | HOT WATER AMOUNT 70% | 2018/9/1 19:01 |

| DEVICE TYPE | DETAILS IN DEVICE DATA | MEANING |
|---|---|---|
| AIR CONDITIONER | COOLING TURNED ON | ON/OFF CONTROL |
| | SET TEMPERATURE 25 °C | TEMPERATURE CONTROL |
| | WIND DIRECTION SET DOWNWARD | WIND DIRECTION CONTROL |
| | ROOM TEMPERATURE 27 °C | STATUS |
| WATER HEATER | HOT WATER FILLING TURNED ON | ON/OFF CONTROL |
| | SET HOT WATER TEMPERATURE 40 °C | TEMPERATURE CONTROL |
| | SET HOT WATER AMOUNT 80% | HOT WATER AMOUNT CONTROL |
| | HOT WATER AMOUNT 70% | STATUS |

| DEVICE TYPE | MEANING | USE FREQUENCY |
| --- | --- | --- |
| AIR CONDITIONER | ON/OFF CONTROL | HIGH |
| | TEMPERATURE CONTROL | INTERMEDIATE |
| | WIND DIRECTION CONTROL | LOW |
| | STATUS | HIGH |
| WATER HEATER | ON/OFF CONTROL | HIGH |
| | TEMPERATURE CONTROL | INTERMEDIATE |
| | HOT WATER AMOUNT CONTROL | LOW |
| | STATUS | HIGH |

| DEVICE ID | DEVICE DATA | | SUPPLEMENTARY INFORMATION | | |
|---|---|---|---|---|---|
| | DETAILS | DETECTION DATE AND TIME | DEVICE TYPE | MEANING | USE FREQUENCY |
| XXX | COOLING TURNED ON | 2018/9/1 08:30 | AIR CONDITIONER | ON/OFF CONTROL | HIGH |
| XXX | SET TEMPERATURE 25 °C | 2018/9/1 08:42 | AIR CONDITIONER | TEMPERATURE CONTROL | INTERMEDIATE |
| XXX | ROOM TEMPERATURE 27 °C | 2018/9/1 09:00 | AIR CONDITIONER | STATUS | HIGH |
| XXX | WIND DIRECTION SET DOWNWARD | 2018/9/1 09:17 | AIR CONDITIONER | WIND DIRECTION CONTROL | LOW |
| ... | | | | | |
| YYY | HOT WATER FILLING TURNED ON | 2018/9/1 18:44 | WATER HEATER | ON/OFF CONTROL | HIGH |
| YYY | SET HOT WATER TEMPERATURE 40 °C | 2018/9/1 18:44 | WATER HEATER | TEMPERATURE CONTROL | INTERMEDIATE |
| YYY | SET HOT WATER AMOUNT 80% | 2018/9/1 18:44 | WATER HEATER | HOT WATER AMOUNT CONTROL | LOW |
| YYY | HOT WATER AMOUNT 70% | 2018/9/1 19:01 | WATER HEATER | STATUS | HIGH |
| ... | | | | | |

FIG. 18

| CONST-RUCTION ID | CONST-RUCTOR ID | DEVICE ID | DETAILS OF CONST-RUCTION | DATE OF CONST-RUCTION | PLACE OF CONST-RUCTION | CONST-RUCTION IMAGE | USER ID | ADDRESS |
|---|---|---|---|---|---|---|---|---|
| aaaa | MMM | XXX (AIR CONDI-TIONER) | INSTALLATION | 2017/7/1 | LIVING ROOM, YARD | ... | AAA | HOUSE A |
| bbbb | | | OUTDOOR UNIT REPAIR | 2018/2/26 | YARD | ... | | |
| cccc | | | INSPECTION | 2018/7/1 | LIVING ROOM, YARD | ... | | |
| dddd | | YYY (WATER HEATER) | INSPECTION | 2017/11/7 | BATHROOM | ... | AAA | HOUSE A |
| eeee | | | INSTALLATION | 2016/1/20 | WASHROOM | ... | | |
| ffff | | ZZZ (WASHING MACHINE) | PLUMBING REPLACEMENT | 2018/5/9 | WASHROOM | ... | BBB | HOUSE B |
| ... | | | | | | | | |

FIG. 19

| USER ID | ADDRESS | DEVICE ID |
|---|---|---|
| AAA | HOUSE A | XXX (AIR CONDITIONER) |
| AAA | HOUSE A | YYY (WATER HEATER) |
| BBB | HOUSE B | ZZZ (WASHING MACHINE) |
| BBB | HOUSE B | ... |
| CCC | APARTMENT C ROOM NO. XXX | ... |
| DDD | OFFICE BUILDING D | ... |
| DDD | OFFICE BUILDING D | ... |
| DDD | OFFICE BUILDING D | ... |
| DDD | OFFICE BUILDING D | ... |

| DATA SIZE | -GIGABYTE |
|---|---|
| TARGET DEVICE | AIR CONDITIONER |
| DATA DETAILS | ON/OFF CONTROL, STATUS |
| TARGET PERIOD | 2018/8/1 00:00 - 2018/8/1 23:59 |
| DATA TRANSMITTER | ... |
| SALES PRICE | ... YEN |

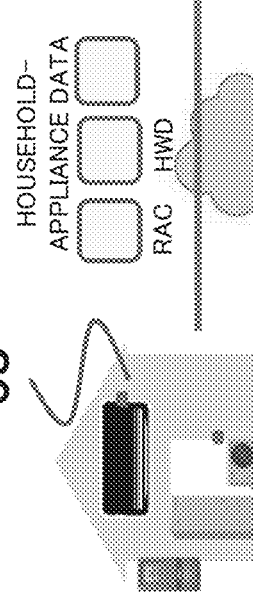

INFORMATION RELATING TO RAC — 60

| DEVICE | HEADING | DETAILS | | CHECK TIME/DATE | DEVICE/ADAPTER ID |
|---|---|---|---|---|---|
| RAC | CONTROL | ONOFF | COOLING, HIGH, ON | 13:05:20 | ID:345*** |
| RAC | STATE | ROOM TEMPERATURE | 30 °C | | |
| RAC | CONTROL | TEMPERATURE | 26 °C | | ID:345*** |
| RAC | SETTING | WIND DIRECTION | UP, DOWN, RIGHT, AND LEFT | DOWNWARD SWING | ID:345*** |

INFORMATION RELATING TO HWD — 61

| DEVICE | HEADING | DETAILS | | CHECK TIME/DATE | DEVICE/ADAPTER ID |
|---|---|---|---|---|---|
| HWD | SETTING | AMOUNT OF HOT WATER | 80% | MARCH 20 | ID:567*** |
| HWD | CONTROL | ONOFF | HOT WATER FILLING TURNED ON | 16:30 | ID:567*** |
| HWD | CONTROL | HOT WATER TEMPERATURE | 40 °C | | ID:567*** |
| HWD | STATE | AMOUNT OF HOT WATER | 5% | 16:35 | ID:567*** |

FIG. 33
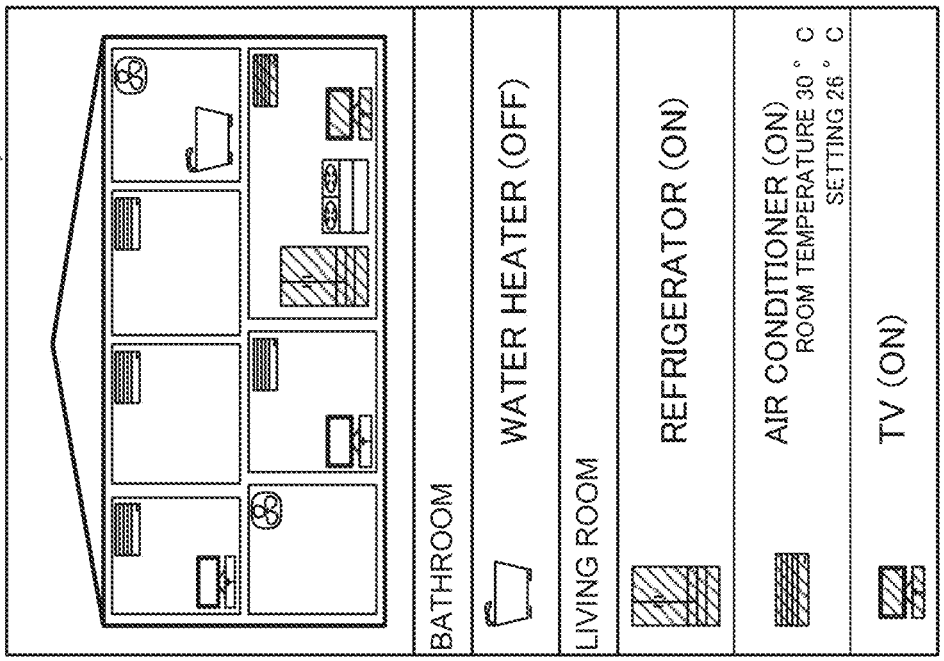
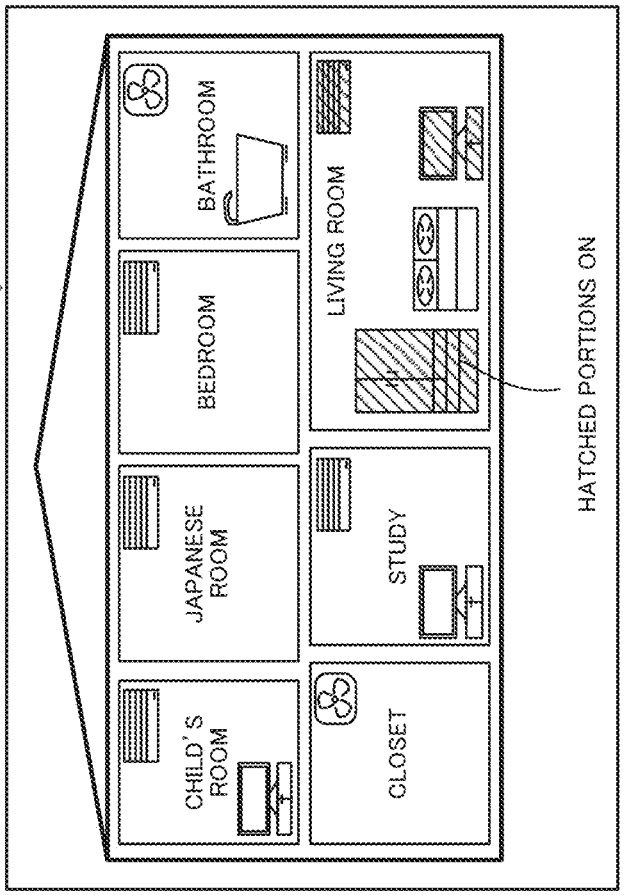

FIG. 46

HIGHLY FREQUENT ACCESS ⟷ LESS FREQUENT ACCESS

| 81 | SERVER A | SERVER B | SERVER C |
|---|---|---|---|
| CAPACITY PRICE (PER MONTH) | ¥2.5/GB | ¥1.5/GB | ¥0.5/GB |
| DATA RETRIEVING CHARGE | NONE | ¥1.0/GB | ¥1.5/GB |
| ACCESS CHARGE (PER 1000) | NONE | ¥0.1 | ¥5.5 |
| RETRIEVING TIME | PER MILLISECOND | PER SECOND | 3 – 5 HOURS |

FIG. 72

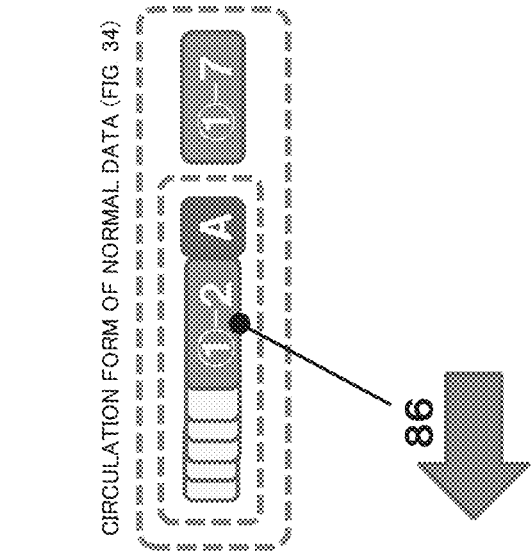

CIRCULATION FORM OF NORMAL DATA (FIG. 34)

86

| | DATA CHARACTERISTIC INFORMATION (FIG. 3) | |
|---|---|---|
| 1-1 | SUPPLEMENTARY INFORMATION ID | **** |
| 1-2 | FILE FORMAT | JSON |
| 2-1 | DATA STORAGE LINK ID | **** |
| 2-2 | LOWER-HIERARCHY SUPPLEMENTARY INFORMATION LINK ID | **** |
| 2-3 | FILE DISTRIBUTION FREQUENCY | EVERY DAY |
| 3-1 | ENCRYPTION | ENCRYPTED |
| 3-2 | ENCRYPTION TYPE | **** |
| 4-1 | DATA DISTRIBUTOR | ** ELECTRIC COMPANY |
| 4-2 | DATA PROCESSOR | ** ELECTRIC COMPANY |
| 4-3 | ORIGINAL-DATA SUPPLIER MANUFACTURER | ** MANUFACTURING COMPANY |
| 5-1 | PRESENCE/ABSENCE OF CERTIFICATE | PRESENT |
| 5-2 | CERTIFIER | ** INFORMATION BANK |
| 6-1 | DATA SIZE | **** |
| 6-3 | DATA PROCESSING HISTORY | MONTH/DATE/TIME |
| 6-4 | DATA PROCESSING DETAILS | CATEGORIZED BY MEANING |
| 6-6 | DATA UPDATE FREQUENCY | PER 30 MINUTES |
| 7-1 | DATA SELLER | ** ELECTRIC COMPANY |
| 7-2 | DATA ACQUISITION PERIOD | MONTH/DATE/TIME TO MONTH/DATE/TIME |
| 7-3 | DATA DISTRIBUTING DEVICE | TWO RACS AND ONE HWD |
| 7-4 | DATA CATALOG DETAILS | ON/OFF, TEMPERATURE SETTING, WIND POWER, WIND DIRECTION, AND HOT WATER AMOUNT |

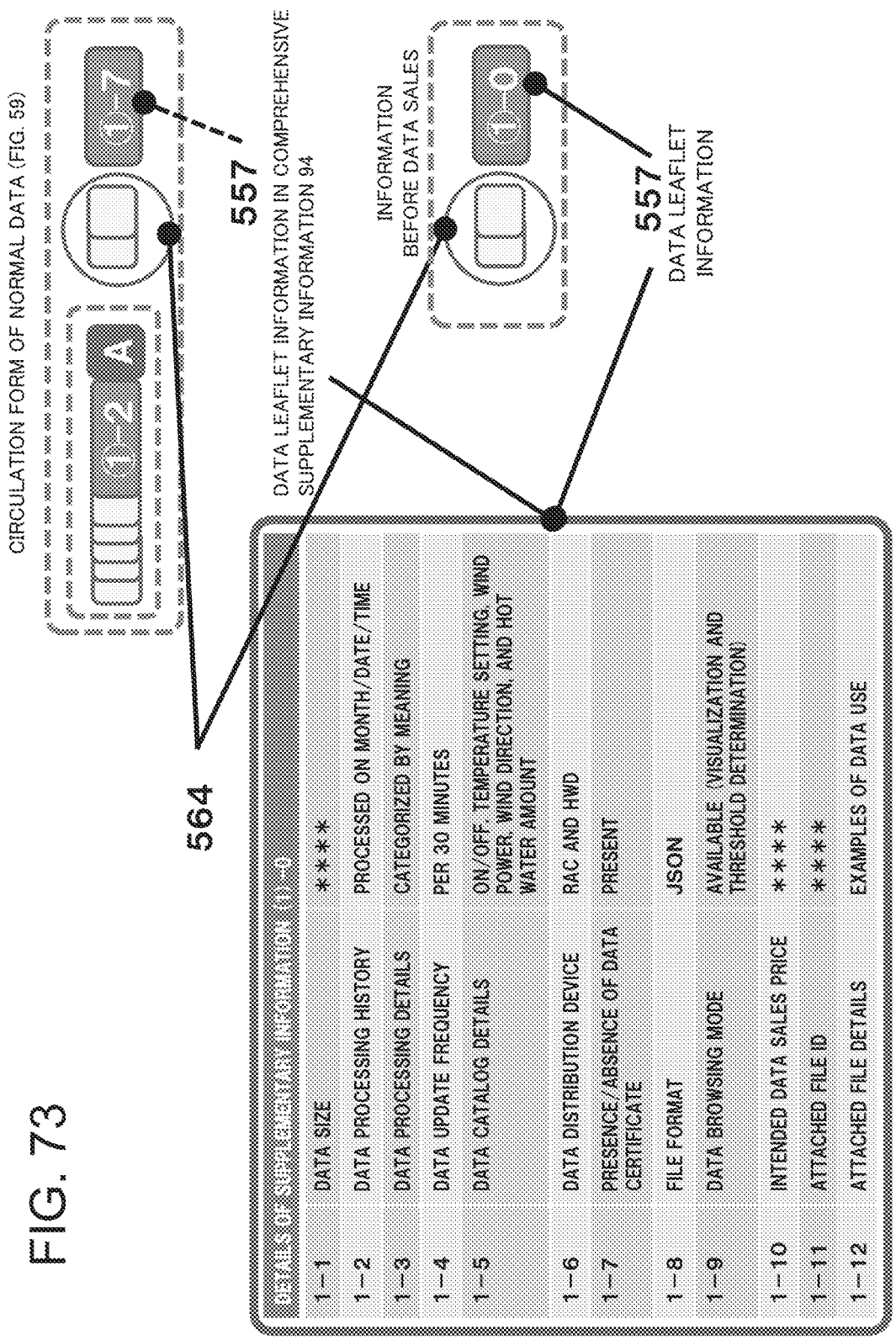

FIG. 74

CIRCULATION FORM OF NORMAL DATA (FIG. 59)

DATA LEAFLET INFORMATION
557
DISTRIBUTABLE BEFORE DATA SALES

94
COMPREHENSIVE SUPPLEMENTARY INFORMATION

ATTACHED AFTER SALES
NO CERTIFICATE REQUESTED
INFORMATION UPDATABLE

| # | Item | Value |
|---|---|---|
| 1-1 | ID OF FILE | **** |
| 1-2 | DATA SIZE | **** |
| 1-3 | DATA PROCESSING HISTORY | MONTH/DATE/TIME |
| 1-4 | DATA PROCESSING DETAILS | CATEGORIZED BY MEANING |
| 1-5 | DATA UPDATE FREQUENCY | PER 30 MINUTES |
| 1-6 | DATA CATALOG DETAILS | ON/OFF, TEMPERATURE SETTING, WIND POWER, WIND DIRECTION, AND HOT WATER AMOUNT |
| 1-7 | DATA DISTRIBUTION DEVICE | RAC AND HWD |
| 1-8 | PRESENCE/ABSENCE OF DATA CERTIFICATE | PRESENT |
| 1-9 | FILE FORMAT | JSON |
| 1-10 | DATA BROWSING MODE | AVAILABLE (VISUALIZATION AND THRESHOLD DETERMINATION) |
| 1-11 | INTENDED DATA SALES PRICE | **** |
| 2-1 | DATA STRUCTURE (INCLUDING HIERARCHIES) | THREE HIERARCHIES CATEGORIZED BY UPDATE FREQUENCY |
| 2-2 | LOCATION OF FILE | UPPERMOST HIERARCHY DATA FILE |
| 2-3 | FILE DISTRIBUTION FREQUENCY | EVERY DAY |
| 2-4 | ENCRYPTION | ENCRYPTED |
| 2-5 | ENCRYPTION TYPE | **** |
| 2-6 | DATA DISTRIBUTOR | ** ELECTRIC COMPANY |
| 2-7 | DATA PROCESSOR | ** ELECTRIC COMPANY |
| 2-8 | ORIGINAL-DATA SUPPLIER MANUFACTURER | ** MANUFACTURING COMPANY |
| 2-9 | CERTIFIER | ** INFORMATION BANK |
| 2-10 | DATA FILE ID | **** |
| 2-11 | DATA ESTIMATE | **** |

FIG. 75

| | | | |
|---|---|---|---|
| | METADATA (CONTENTS) | | |
| 1-1 | ID OF FILE | **** | |
| 1-2 | DATA SIZE | **** | |
| 1-3 | DATA PROCESSING HISTORY | | PROCESSED ON MONTH/DATE/TIME |
| 1-4 | DATA PROCESSING DETAILS | | CATEGORIZED BY MEANING |
| 1-5 | DATA UPDATE FREQUENCY | | PER 30 MINUTES |
| 1-6 | DATA CATALOG DETAILS | | ON/OFF, TEMPERATURE SETTING, WIND POWER, WIND DIRECTION, AND HOT WATER AMOUNT |
| 1-7 | DATA DISTRIBUTION DEVICE | | RAC AND HWD |
| 1-8 | PRESENCE/ABSENCE OF DATA CERTIFICATE | | PRESENT |
| 1-9 | FILE FORMAT | | JSON |
| ... | ... | | ... |
| 2-1-1 | ENTIRE DATA STRUCTURE (INCLUDING HIERARCHIES) | | THREE HIERARCHIES CATEGORIZED BY UPDATE FREQUENCY + CATEGORIZED BY PRICE |
| 2-2-1 | LOCATION OF FILE | | UPPERMOST HIERARCHY DATA FILE |
| 2-2-2 | FILE 1 (ID: ****) | | FIRST HIERARCHY (HIGH UPDATE FREQUENCY) + FOR FREE |
| 2-2-3 | FILE 2 (ID: ****) | | SECOND HIERARCHY 1 (INTERMEDIATE UPDATE FREQUENCY) + ¥100/T |
| 2-2-4 | FILE 3 (ID: ****) | | SECOND HIERARCHY 2 (INTERMEDIATE UPDATE FREQUENCY) + ¥200/T |
| 2-2-5 | FILE 4 (ID: ****) | | THIRD HIERARCHY (LOW UPDATE FREQUENCY) + ¥500/T |
| 2-3 | FILE DISTRIBUTION FREQUENCY | | EVERY DAY |
| 2-4 | ENCRYPTION | | ENCRYPTED |

94

ONE PARENT FILE INCLUDING COMPREHENSIVE SUPPLEMENTARY INFORMATION AND FOUR CHILDREN FILES ARE INCLUDED.

ENTIRE STRUCTURE AND LOCATION OF EACH IoT DATA FILE IN ENTIRE STRUCTURE IS DESCRIBED.

US 11,469,913 B2

DATA COLLECTION SERVER, DATA UTILIZATION SERVER AND EQUIPMENT BASED ON USE FREQUENCY AMONG A PLURALITY OF STORAGE CORRESPONDING TO DIFFERENT LEVELS OF USE

CROSS REFERENCE TO RELATED APPLICATION

This application is a U.S. national stage application of PCT/JP2019/033065 filed on Aug. 23, 2019, which claims priority to Japanese patent application no. 2018-157582 filed on Aug. 24, 2018, the contents of which are incorporated herein by reference.

TECHNICAL FIELD

The present disclosure relates to a data collection server, a data utilization server, equipment, a data circulation system, a data collection method, and a program.

BACKGROUND ART

Data circulation markets have been formed for trading device data acquired from devices. For example, Patent Literature 1 describes forming a data circulation market with a sensing network including multiple wireless communication nodes, a mediation server for collecting sensing data from the wireless communication nodes, and an application server for receiving such sensing data from the mediation server.

CITATION LIST

Patent Literature

Patent Literature 1: Unexamined Japanese Patent Application Publication No. 2015-38484

SUMMARY OF INVENTION

Technical Problem

The advanced technologies related to the Internet of Things (IoT) may cause circulation of massive amounts of device data in the data circulation market. However, Patent Literature 1 does not describe any techniques for handling such massive amounts of data despite possible circulation of massive amounts of data in the data circulation market. Techniques are thus awaited for handling massive amounts of device data.

In response to the above issue, an objective of the present disclosure is to provide, for example, a data collection server for appropriately handling massive amounts of device data.

Solution to Problem

To achieve the above objective, a data collection server according to an aspect of the present disclosure includes reception means for receiving device data from a device, use frequency estimation means for estimating use frequency of the device data received by the reception means, and saving means for storing the device data in, among a plurality of storage means corresponding to different levels of use frequency, one of the plurality of storage means that corresponds to the use frequency estimated by the use frequency estimation means.

Advantageous Effects of Invention

The present disclosure enables appropriate handling of massive amounts of device data through estimation of the use frequency of device data.

BRIEF DESCRIPTION OF DRAWINGS

FIG. 2 is a table showing example characteristics of a storage server connected to a data collection server according to Embodiment 1 of the present disclosure;

FIG. 3 is a table of example device data transmitted by devices in Embodiment 1 of the present disclosure;

FIG. 6 is a table of an example meaning of device data identified by the data collection server according to Embodiment 1 of the present disclosure;

FIG. 7 is a table of example use frequency estimated based on the meaning of the device data identified by the data collection server according to Embodiment 1 of the present disclosure;

FIG. 8 is a table of example data stored in a storage server by the data collection server according to Embodiment 1 of the present disclosure;

FIG. 18 is a table of an example of construction data transmitted by a constructor server according to Embodiment 3 of the present disclosure;

FIG. 19 is a table of example data stored in a personal information storage by a data collection server according to Embodiment 3 of the present disclosure;

FIG. 21 is a table of example comprehensive supplementary information included in the circulation data transmitted by the data collection server according to Embodiment 4 of the present disclosure:

FIG. 30 is a diagram of information output from devices;

FIG. 33 is a diagram of an example monitoring service with device information;

FIG. 46 is a pattern list of data storage examples;

FIG. 72 is a diagram of table details for supplementary information;

FIG. 73 is a diagram of table details for data leaflet information;

FIG. 74 is a diagram of table details for comprehensive supplementary information; and FIG. 75 is a diagram of description of a data structure.

DESCRIPTION OF EMBODIMENTS

Figure 1:
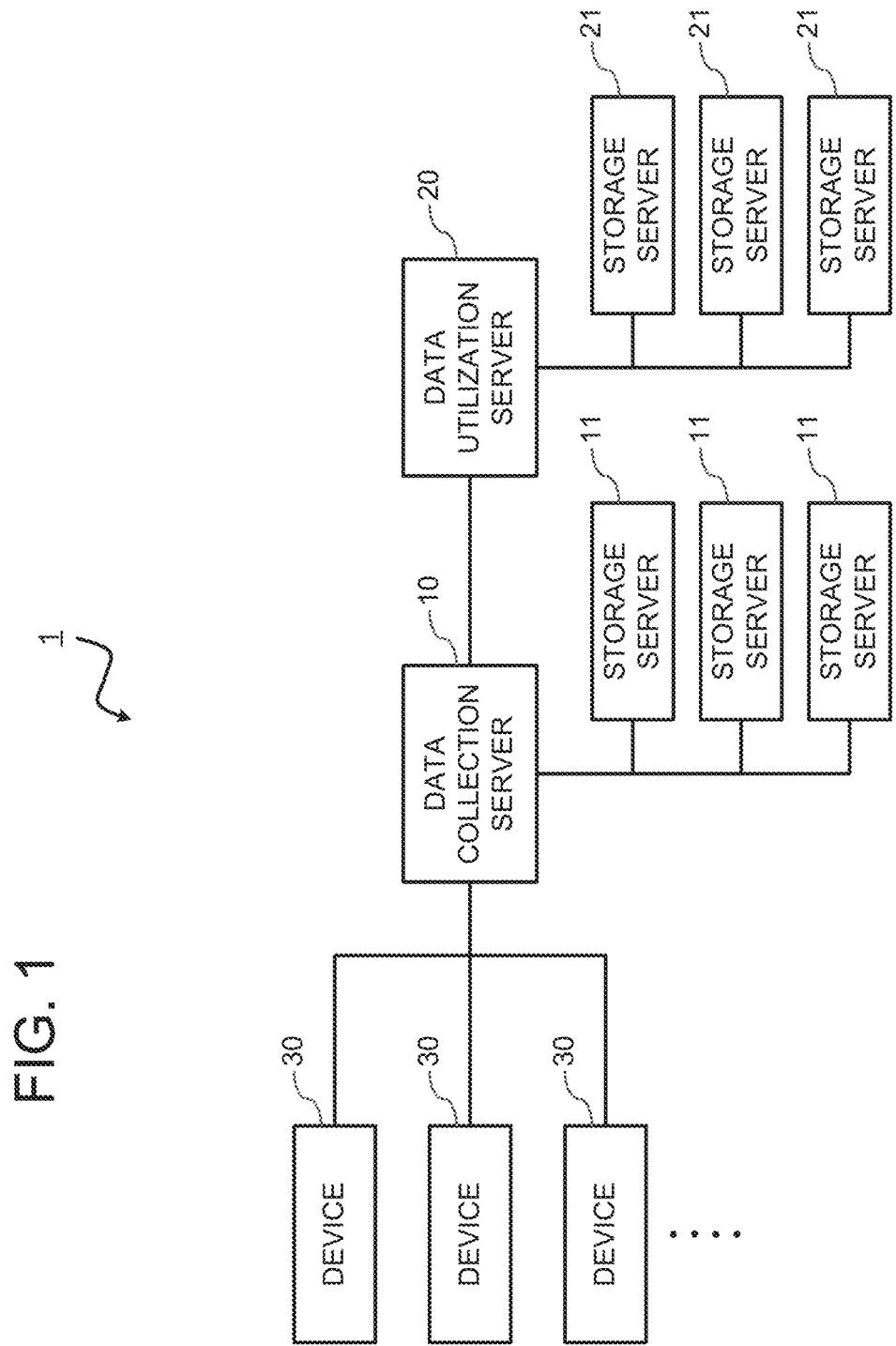
FIG. 1 is a block diagram of a data circulation system according to Embodiment 1 of the present disclosure.

A data circulation system according to one or more embodiments of the present disclosure will now be described with reference to the drawings. Throughout the drawings, the same or equivalent components are denoted by the same reference numerals.

Embodiment 1

A data circulation system 1 according to Embodiment 1 will now be described with reference to FIG. 1. The data circulation system 1 may be used for trading device data. The data circulation system 1 includes a data collection server 10, multiple storage servers 11, a data utilization server 20, multiple storage servers 21, and multiple devices 30. The data circulation system 1 is an example of a data circulation system according to the present disclosure. FIG.

I shows three storage servers 11 and three storage servers 21, without their numbers being limited to three.

The data collection server 10 is, for example, a maker server administered by a manufacturer of the devices 30. The data collection server 10 receives device data from the devices 30 and stores the device data in the storage server 11. The data collection server 10 retrieves device data stored in the storage server 11 and transmits, to the data utilization server 20, circulation data including the device data. The data collection server 10 may receive device data about the devices 30 manufactured by a manufacturer different from the administrator of the data collection server 10. The data collection server 10 is an example of a data collection server according to the present disclosure.

Each of the storage servers 11 is, for example, a cloud storage server administered by a cloud provider. For example, an administrator of the data collection server 10 pays a use fee to the administrator of the storage server 11 in accordance with, for example, the quantity of data stored or read. The storage server 11 is an example of storage means according to the present disclosure.

For example, the multiple storage servers 11 have the characteristics shown in FIG. 2. The three storage servers 11 shown in FIG. 2 are referred to as a storage A, a storage B, and a storage C. The storage fee is referred to as a fee charged when a predetermined quantity of data, such as 1-gigabyte data, is stored in each storage server 11. The charged fee increases in proportion to the storage fee and the quantity of data. A retrieve fee refers to a fee charged when a predetermined quantity of data, such as 1-gigabyte data, is retrieved from each storage server 11. The charged fee increases in proportion to the retrieve fee and the quantity of data retrieved. The retrieve speed refers to the speed at which data is retrieved from each storage server 11.

The storage A charges a high storage fee but no retrieve fee, and operates with a high retrieve speed. Thus, the storage A is appropriate for stating a small-sized, frequently used data. The storage A is mainly a high-speed, low-capacity, and expensive secondary storage such as a solid state drive (SSD). The storage B charges a low storage fee and operates with a normal retrieve speed, but Charges a high retrieve fee. Thus, the storage B is appropriate for storing large-sized, less-frequently used data that is periodically analyzed, for example, weekly or monthly. The storage B is mainly a low-speed, large-capacity, and less expensive secondary storage such as a hard disk drive (HDD). The storage C charges a low storage fee and a low retrieve fee, but operates with a low retrieve speed. Thus, the storage C is appropriate for storing data not periodically used. The storage C is minty a low-speed, large-capacity, and less expensive secondary storage such as a tape drive.

Referring hack to FIG. 1, the data utilization server 20 is a servicer server administered by a servicer that provides, for example, services based on device data to customers. The servicer provides various services to customers through the data utilization server 20, Examples of the services based on device data include monitoring the operational statuses of the devices 30 in a customer's home based on device data, and suggesting a plan for power saving to a customer based on device data accumulated for one month.

The data utilization server 20 requests circulation data from the data collection server 10. The data utilization server 20 receives circulation data transmitted, upon the request, from the data collection server 10 and stores the circulation data in the storage server 21. The data utilization server 20 provides services to customers based on the device data included in the stored circulation data. The data utilization server 20 is an example of a data utilization server according to the present disclosure.

The storage server 11 and the storage server 21 are, for example, cloud storage servers that are administered by a cloud provider. For example, the administrator of the data utilization server 20 pays a use fee to the administrator of the storage server 21 in accordance with, for example, the quantity of data stored or read. The storage server 21 is an example of storage means according to the present disclosure. The multiple storage servers 21 have the characteristics shown in, for example, FIG. 2, like the storage servers 11.

The devices 30 are, for example, IoT devices that can communicate with the data collection server 10. Examples of the devices 30 include electrical devices such as air conditioners, water heaters, and cookers, and sensors such as power meters, thermometers, and airflow meters. The devices 30 transmit information about their operation, status, or other aspects as device data to the data collection server 10. The devices 30 are examples of devices according to the present disclosure.

FIG. 3 is a table of an example device data. The device data for each device 30 includes a device identifier (ID) for individually identifying the device 30, information about the operation, status, or other aspects of the device 30, and information about the date and time on which the operation, status, or other aspects was detected. The device ID for individually identifying the device 30 may be, for example, a character string combining the model number and the serial number of the device 30. The operation is detected when, for example, the operation is performed in response to a user operation. The status is detected at predetermined time intervals of, for example, one hour. The device 30 may transmit device data to the data collection server 10 immediately upon detecting the operation, status, or other aspects of the device 30. In some embodiments, the device 30 may temporarily store device data without immediately transmitting the data, and transmit the stored data at predetermined time intervals. The device data is represented in, for example, the JavaScript Object Notation (BON) or the Extensible Markup Language (XML).

Figure 4:
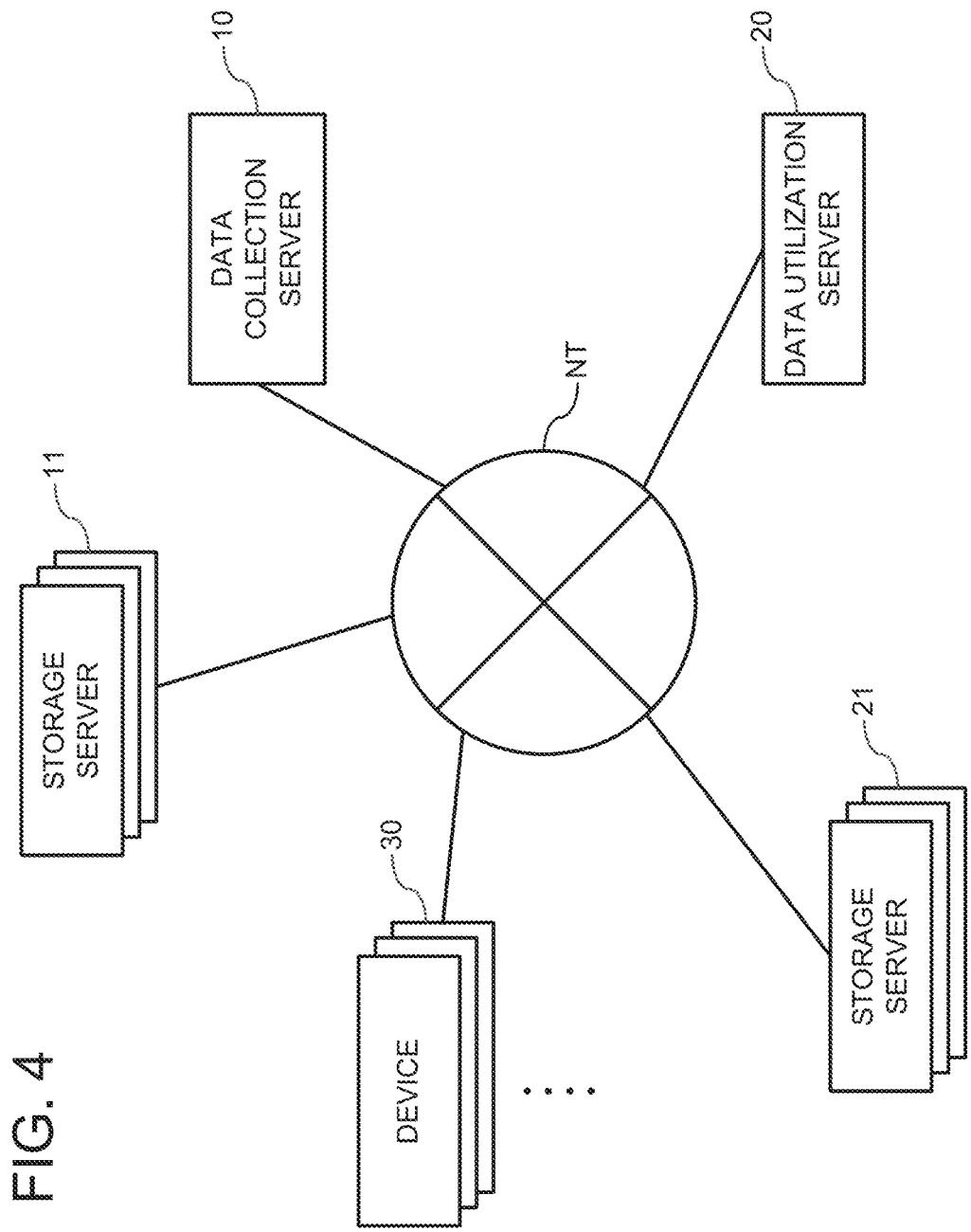
FIG. 4 is a diagram of the data circulation system according to Embodiment 1 of the present disclosure configured via the Internet.

In FIG. 1, the devices 30 and the data collection server 10 are connected together, the data collection server 10 and the storage servers 11 are connected together, the data collection server 10 and the data utilization server 20 are connected together, and the data utilization server 20 and the storage servers 21 are connected together. These connections may be established without physical communication lines. For example, as shown in FIG. 4, the data collection server 10, the storage servers 11, the data utilization server 20, the storage servers 21, and the devices 30 may be connected to the Internet NT, and the servers and the devices 30 may communicate with each other via the Internet NT. Communication between some of the servers and the devices 30 may be established via a network other than the Internet NT For example, the devices 30 and the data collection server 10 may communicate with each other on a wireless sensor network formed from a low power wide area network (LPWAN) instead of the Internet NT, and others may communicate with each other on the Internet NT.

The data collection server 10 and the data utilization server 20 communicate with each other through, for example, a predetermined web application programming interface (API). For example, the data collection server 10 is a web API server having an interface conforming to the web API, and the data utilization server 20 is a web API client that can communicate with the web API server or the data collection server 10. The data utilization server 20 can also communicate with a data collection server administered by an administrator different from the administrator of the data collection server 10 and conforming to the web API, in the same manner as with the data collection server 10. The communication through the web API may be performed with the Hypertext Transfer Protocol Secure (HTTPS) for security.

Figure 5:
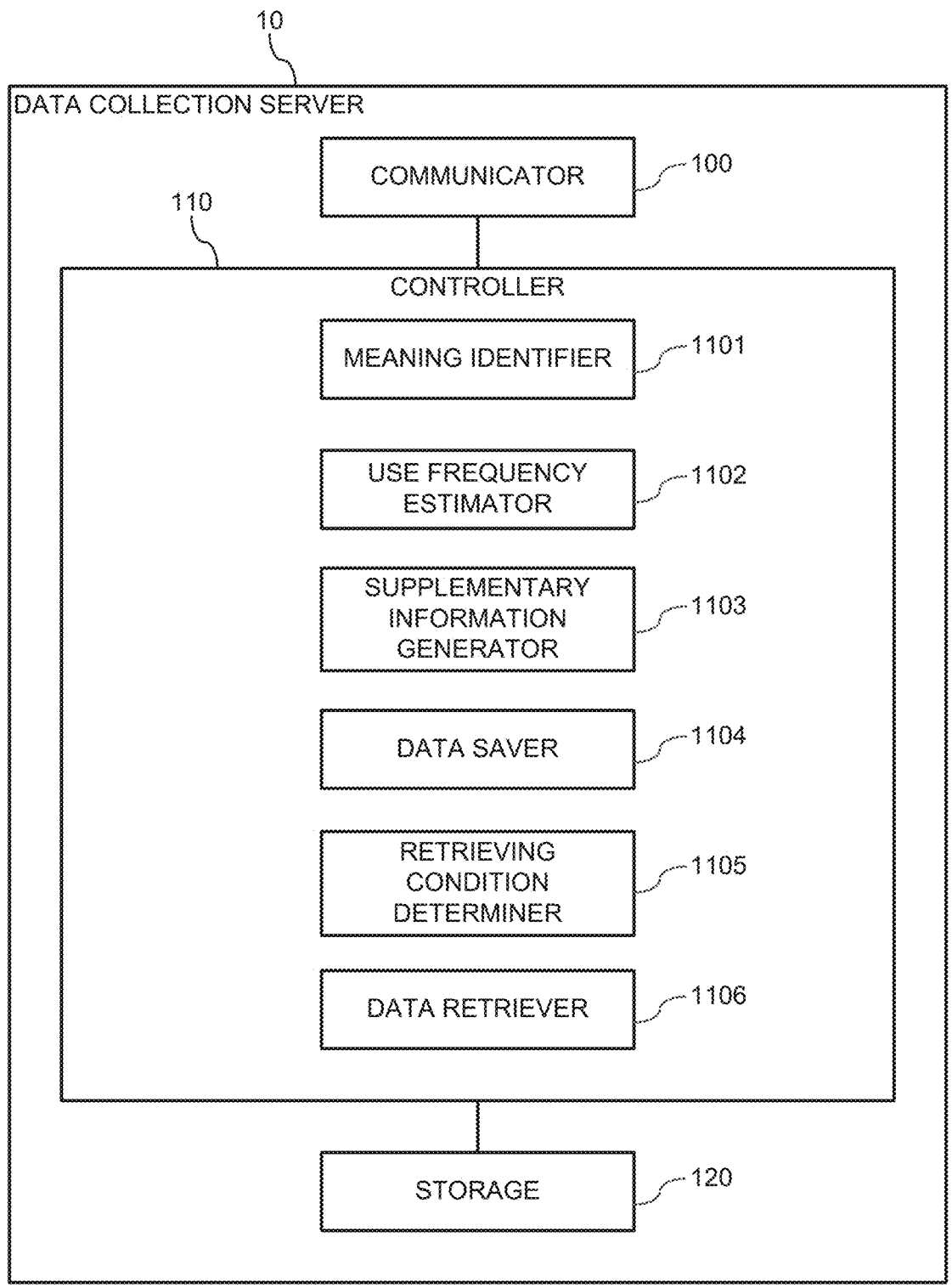
FIG. 5 is a functional block diagram of the data collection server according to Embodiment 1 of the present disclosure.

With reference to FIG. 5, the functional components of the data collection server 10 will now be described. The data collection server 10 includes a communicator 100, a controller 110, and a storage 120.

The communicator 100 is, for example, a network interface that can communicate with, for example, the Internet NT. The communicator 100 communicates with the devices 30, the storage server 11, and the data utilization server 20. In particular, the communicator 100 receives device data from a device 30 and transmits circulation data (described later) to the data utilization server 20. The communicator 100 is an example of reception means and transmission means according to the present disclosure.

The controller 110 centrally controls the data collection server 10. The controller 110 includes a meaning identifier 1101, a use frequency estimator 1102, a supplementary information generator 1103, a data saver 1104, a retrieving condition determiner 1105, and a data retriever 1106.

The meaning identifier 1101 identifies the meaning of device data received by the communicator 100 from the devices 30. The meaning identifier 1101 is an example of meaning identification means according to the present disclosure. FIG. 6 is a table of an example meaning of device data identified. For example, when the device type of the device 30 is an air conditioner, and the details of the device data are to turn on cooling, the meaning identifier 1101 identifies the meaning of the device data as ON/OFF control. The device type is identifiable from the device ID included in the device data. The meaning of the device data is identified based on the table stored in, for example, the storage 120 (described later) and indicating mapping between the details and the meaning of the device data.

The use frequency estimator 1102 estimates the use frequency of device data based on the meaning of the device data identified by the meaning identifier 1101.

The use frequency estimator 1102 is an example of use frequency estimation means according to the present disclosure.

The use frequency of device data herein is the use frequency of device data expected to be stored in the storage server 11. For example, when the device data indicates ON/OFF control, the device data is expected to be highly frequently used. When the device data is to be stored in the storage server 11, the stored device data is thus expected to be highly frequently used. When the meaning of the device data is wind direction control, the wind direction setting may be changed less frequently, and data for the wind direction control may be less frequently used. Thus, the use frequency of device data may be low.

FIG. 7 is a table of example use frequency estimated based on the meaning of the device data. For example, when device data indicates ON/OFF control, the device data is estimated as being highly frequently used. The use frequency of device data is estimated based on the table stored in, for example, the storage 120 (described later) and indicating mapping between the meaning and the use frequency of device data. The use frequency estimator 1102 then estimates the use frequency of device data to be the use frequency predetermined in a manner associated with the meaning identified by the meaning identifier 1101.

The supplementary information generator 1103 generates supplementary information corresponding to device data. In particular, the supplementary information generator 1103 generates supplementary information including information about the meaning identified by the meaning identifier 1101 and information about the use frequency estimated by the use frequency estimator 1102. Besides the above information, the supplementary information includes, for example, device type information that specifies the device type of an electric device targeted by the device data. The supplementary information is expressed in a schema language, such as a JSON schema, an XML schema, or document type definition (DTD).

The data saver 1104 stores device data in the storage server 11 in accordance with the use frequency estimated by the use frequency estimator 1102. The storage server 11 in accordance with the use frequency is a storage server 11 to which device data is to be stored in accordance with the level of the use frequency of the device data. In the example shown in FIG. 2, device data with high use frequency may be stored in the storage A. Similarly, device data with intermediate use frequency may be stored in the storage B, and device data with low use frequency may be stored in the storage C. The data saver 1104 is an example of saving means according to the present disclosure.

The data saver 1104 stores the supplementary information generated by the supplementary information generator 1103 in the storage server 11 in a manner associated with the corresponding device data. Although the associated device data has use frequency other than high, the supplementary information may be stored in, for example, the storage server 11 for high use frequency, such as the storage A. This is because the supplementary information may be used as an index during data retrieval and may be more frequently used than the associated device data, with the supplementary information having a smaller capacity than the device data. When supplementary information is stored in the storage A, the supplementary information includes information indicating a link to the device data stored in another storage server 11, FIG. 8 is a table of example data stored in a storage server 11. FIG. 8 collectively shows data with high, intermediate, and low use frequency. As described above, data pieces with different levels of use frequency are stored in different storage servers 11.

Figure 9:
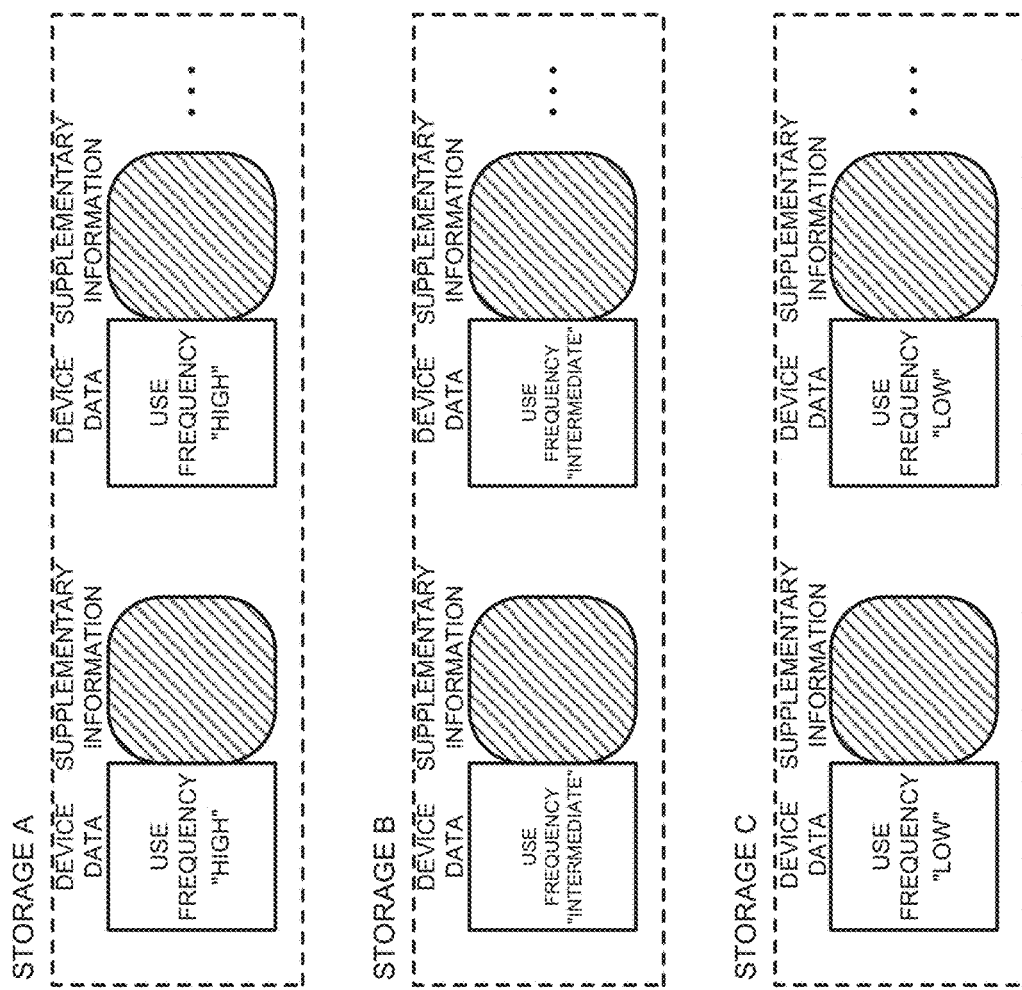
FIG. 9 is a diagram of an example of device data and supplementary information stored in each storage server according to Embodiment 1 of the present disclosure.

FIG. 9 is a diagram of an example of device data and related supplementary information stored in each storage server 11. In the example shown in FIG. 9, device data with high use frequency and corresponding supplementary information are stored in the storage A, device data with intermediate use frequency and corresponding supplemental) information are stored in the storage B, and device data with low use frequency and corresponding supplementary information are stored in the storage C.

Figure 10:
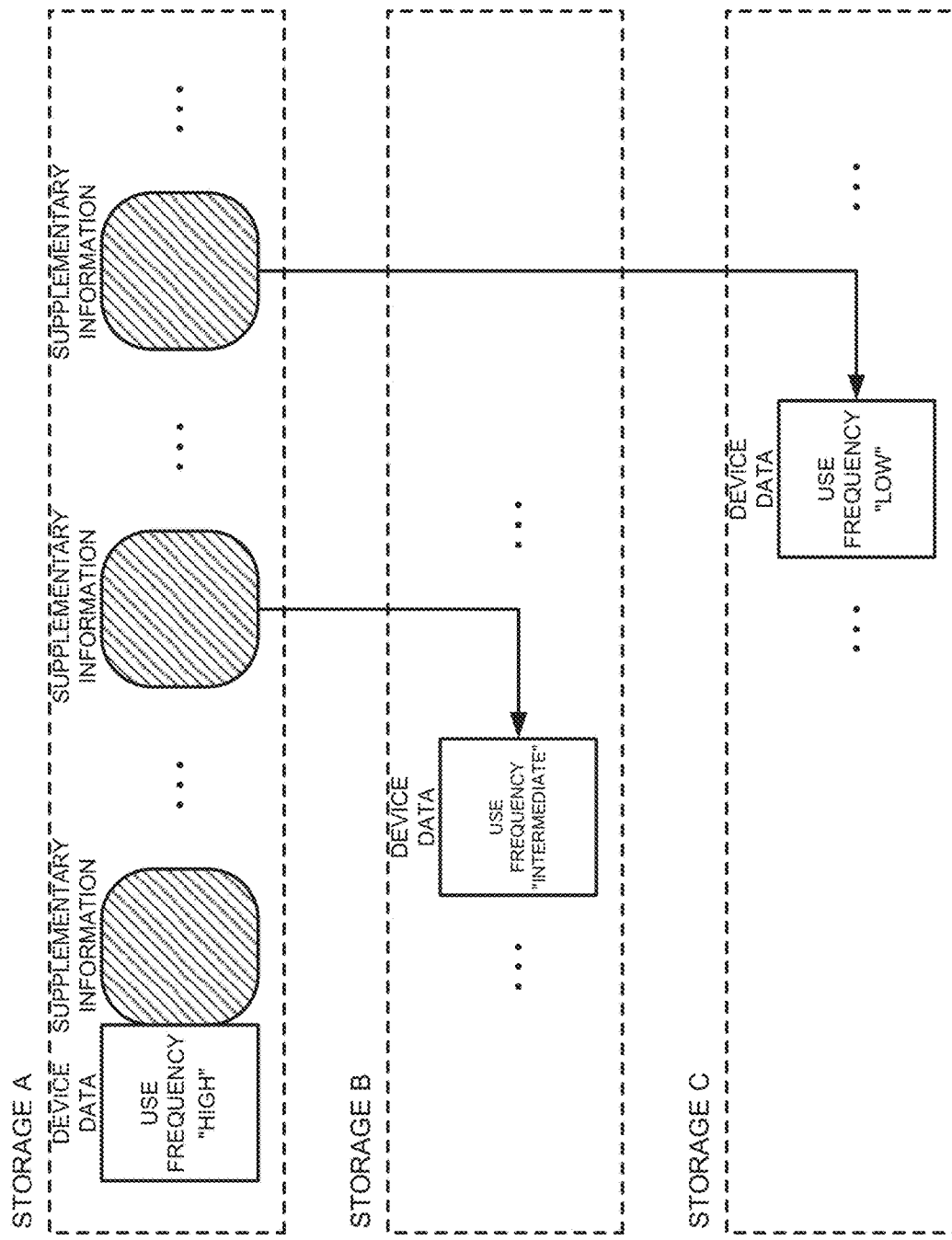
FIG. 10 is a diagram of another example of device data and supplementary information stored in the storage servers according to Embodiment 1 of the present disclosure.

FIG. 10 is a diagram of another example of device data and related supplementary information stored in the storage servers 11. Arrows in FIG. 10 represent links from supplementary information to device data. In the example shown in FIG. 10, unlike in FIG. 9, all the pieces of supplementary information are stored in the storage A, or in other words, in the storage server 11 corresponding to high use frequency. The pieces of supplementary information corresponding to device data with use frequency other than high include links to device data stored in another storage server 11.

Referring again to FIG. 5, the retrieving condition determiner 1105 determines the retrieving conditions of device data to be retrieved from the storage server 11 based on a data request received by the communicator 100 from the data utilization server 20. When, for example, the data utilization server requests circulation data relating to ON/OFF control of an air conditioner for the last one month, the retrieving condition determiner 1105 determines, as retrieving conditions, that device data is dated within the last one month, and has the meaning indicated by supplementary information corresponding to the device data for ON/OFF control of an air conditioner.

The data retriever 1106 retrieves device data and supplementary information from the storage servers 11 in accordance with the retrieving conditions determined by the retrieving condition determiner 1105. The data retriever 1106 is an example of data retrieving means according to the present disclosure.

The controller 110 transmits, via the communicator 100, circulation data including device data and supplementary information retrieved by the data retriever 1106 to the data utilization server 20. Thus, circulation data includes information about device data and the meaning of the device data, and information about the use frequency of the device data.

In addition to the above process, the controller 110 performs various processes for, for example, data processing.

The storage 120 stores various types of information used in control of the data collection server 10 with the controller 110. For example, as described above, the storage 120 stores a table indicating mapping between the details and the meaning of device data and a table indicating mapping between the meaning and the use frequency of device data.

Figure 11:
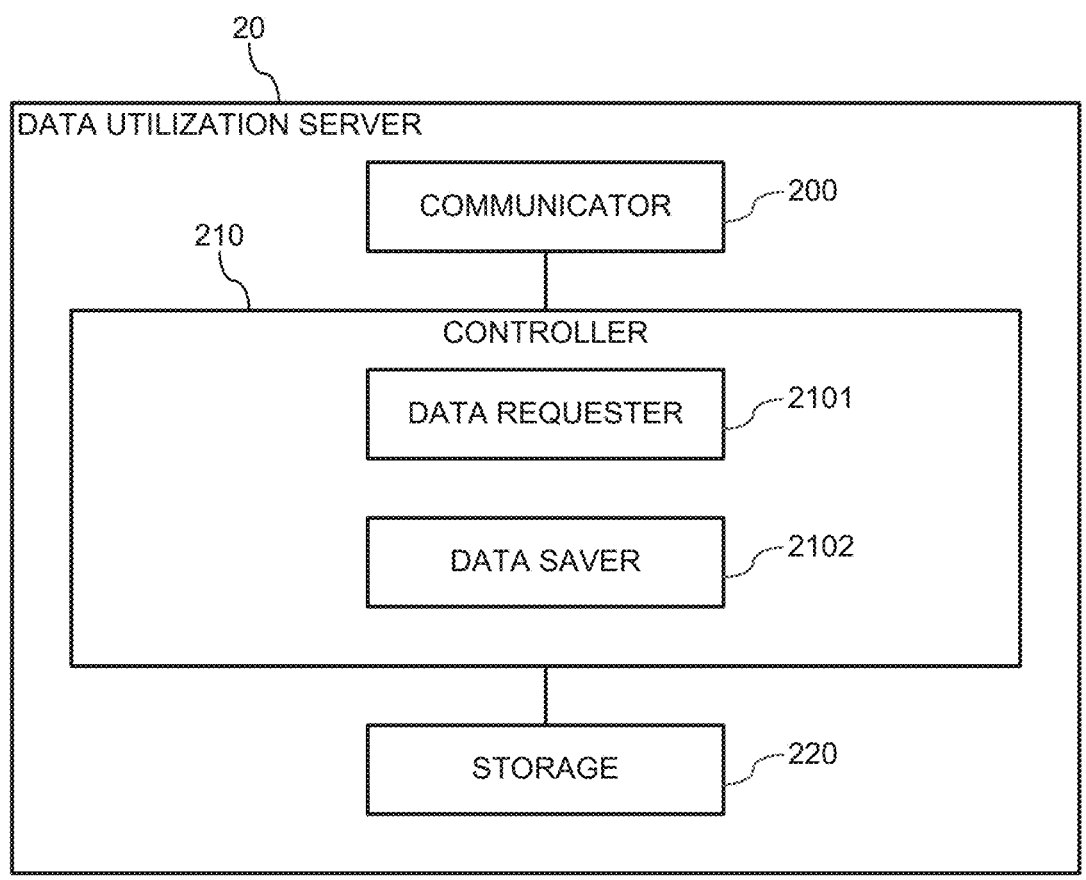
FIG. 11 is a functional block diagram of a data utilization server according to Embodiment 1 of the present disclosure.

With reference to FIG. 11, the functional components of the data utilization server 20 will now be described. The data utilization server 20 includes a communicator 200, a controller 210, and a storage 220.

The communicator 200 is, for example, a network interface that can communicate with the Internet NT. The communicator 200 communicates with the data collection server 10 and the storage server 21. In particular, the communicator 200 receives circulation data from the data collection server 10. The communicator 200 is an example of reception means according to the present disclosure.

The controller 210 centrally controls the data utilization server 20. The controller 210 includes a data requester 2101 and a data saver 2102.

The data requester 2101 requests the data collection server 10 to transmit circulation data via the communicator 200. Examples of the request details include requests for data satisfying specific conditions, such as a request for data for ON/OFF control of an air conditioner for the last three days, and a request for data of the room temperature exceeding 30° C. within the last one month.

The data saver 2102 stores circulation data received by the communicator 200 in the storage server 21 corresponding to the use frequency included in the circulation data. The data saver 2102 is an example of saving means according to the present disclosure.

Besides the above processes, the controller 210 performs various processes such as processing for providing the service, and data processing.

Figure 12:
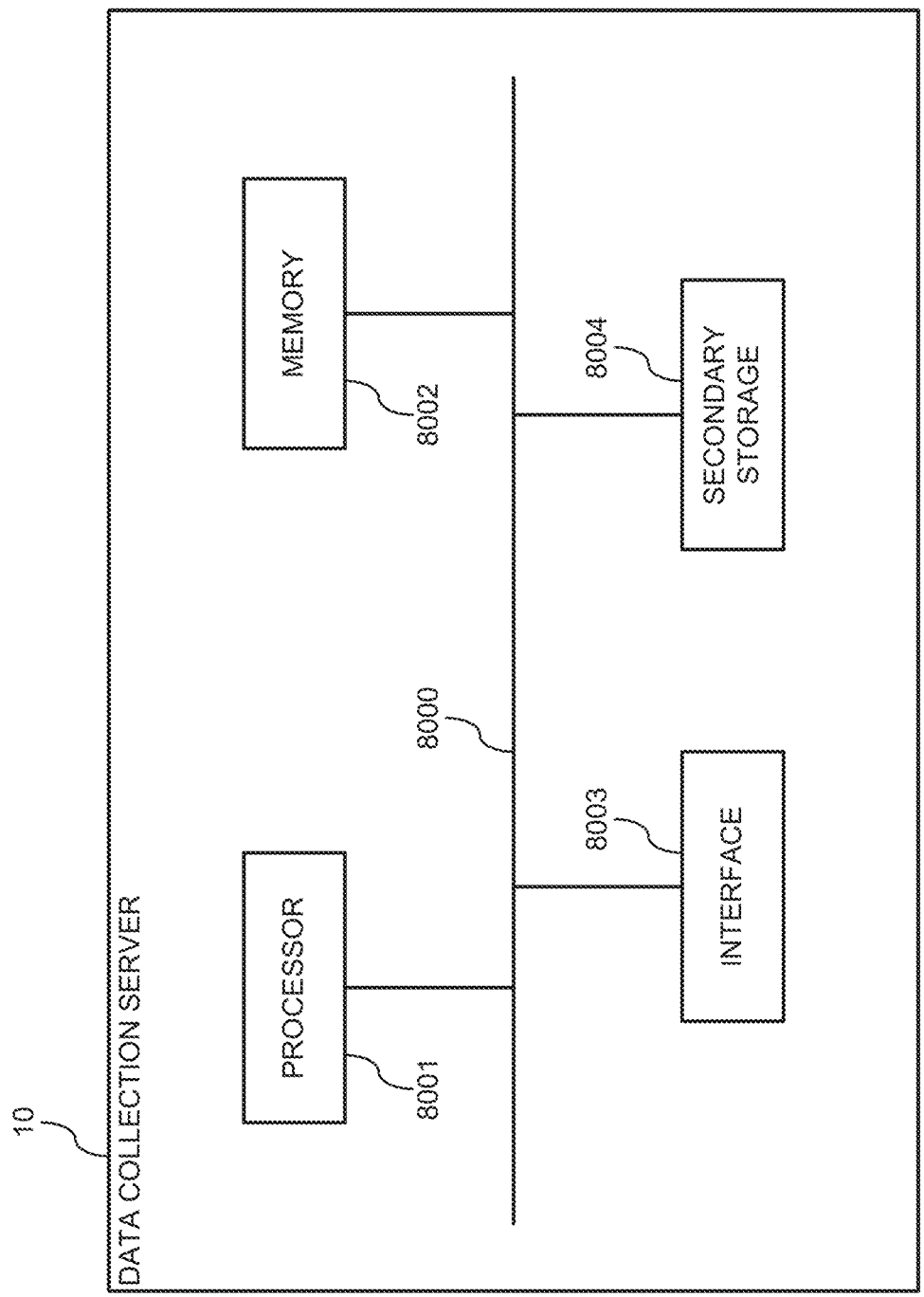
FIG. 12 is a diagram of the data collection server according to Embodiment 1 of the present disclosure showing the hardware configuration.

With reference to FIG. 12, an example hardware configuration of the data collection server 10 will now be described. The data collection server 10 shown in FIG. 12 is implemented by a computer, such as a personal computer or a microcontroller.

The data collection server 10 includes a processor 8001, a memory 8002, an interface 8003, and a secondary storage 8004 that are connected to one another with a bus 8000.

The processor 8001 is, for example, a central processing unit (CPU). The functions of the data collection server 10 are implemented by the processor 8001 reading an operational program from the secondary storage 8004 into the memory 8002 and executing the program.

The memory 8002 is, for example, a primary storage including a random-access memory (RAM). The memory 8002 stores the operational program read from the secondary storage 8004 by the processor 8001. The memory 8002 serves as a work memory used by the processor 8001 for executing the operational program.

The interface 8003 is, for example, an input-output (I/O) interface, such as a serial port or a network interlace. The interface 8003 functions as the communicator 100.

The secondary storage 8004 is, for example, a flash memory, a HDD, or a SSD. The secondary storage 8004 stores the operational program to be executed by the processor 8001. The secondary storage 8004 functions as the storage 120.

The data utilization server 20 may also have the hardware configuration shown in, for example, FIG. 12.

Figure 13:
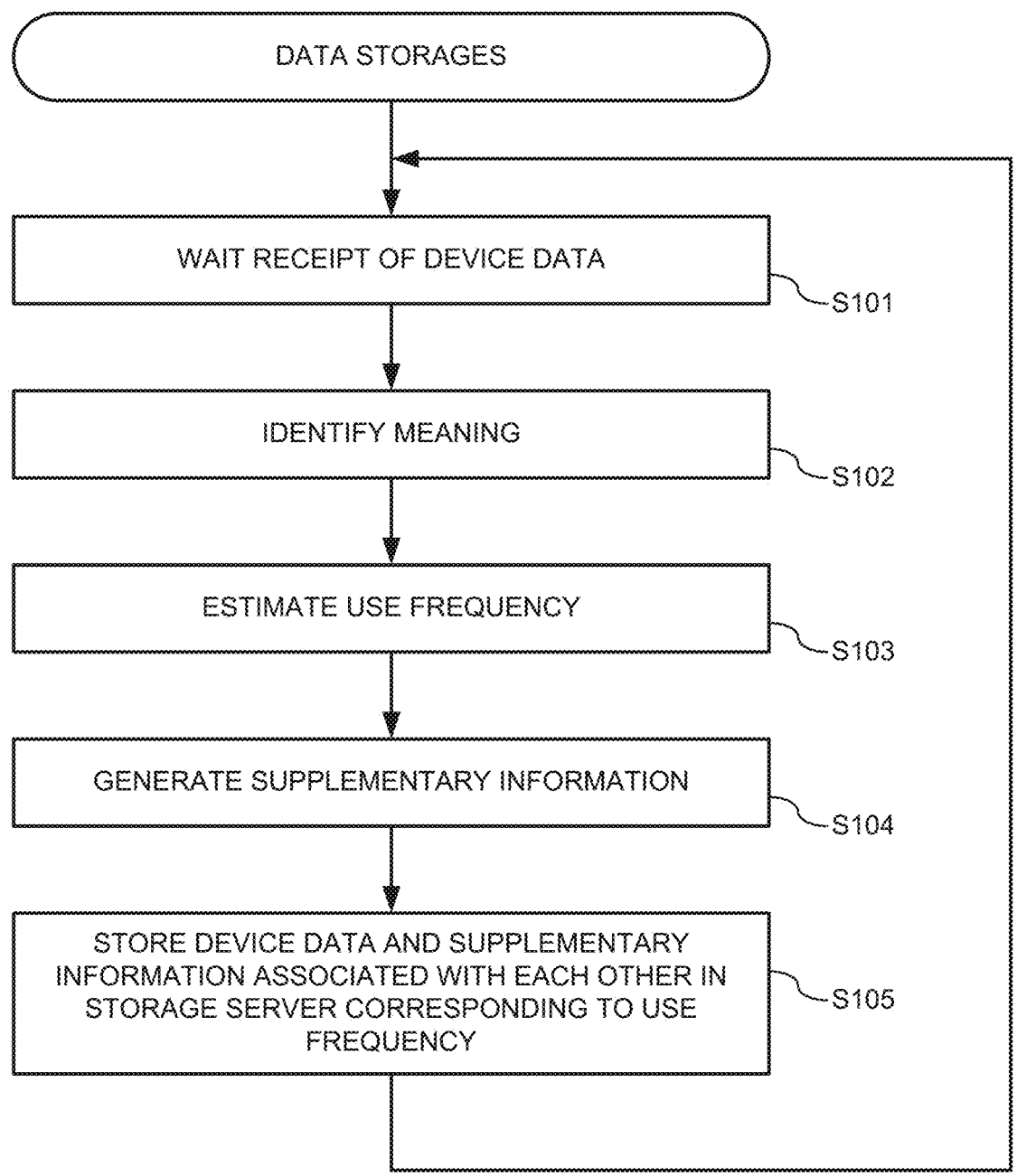
FIG. 13 is a flowchart showing an example data storage operation performed by the data collection server according to Embodiment 1 of the present disclosure.

An example data storage operation performed by the data collection server 10 will now be described with reference to FIG. 13. The operation is executed by the control of the controller 110.

First, the communicator 100 waits for receipt of device data from the device 30 (step S101). When the communicator 100 receives device data, the process advances to the next operation.

Subsequently, the meaning identifier 1101 identifies the meaning of the received device data (step S102). As described above, the meaning of the device data is identified based on, for example, a table indicating mapping between the meaning and the details of device data stored in the storage 120.

Subsequently, the use frequency estimator 1102 estimates the use frequency of the received device data based on the meaning identified by the meaning identifier 1101 (step S103). As described above, the use frequency is estimated based on, for example, a table indicating mapping between the meaning and the use frequency of device data stored in the storage 120.

Subsequently, the supplementary information generator 1103 generates supplementary information corresponding to the received device data and including information about the meaning identified by the meaning identifier 1101 and information about the use frequency estimated by the use frequency estimator 1102 (step S104).

Subsequently, the data saver 1104 stores the device data and the supplementary information in a manner associated with each other in the storage server 11 corresponding to the estimated use frequency (step S105). However, as described above, the supplementary information may be stored in the storage server 11 corresponding to high use frequency.

After the data storage, the controller 10 repeats the processing from step S101.

Figure 14:
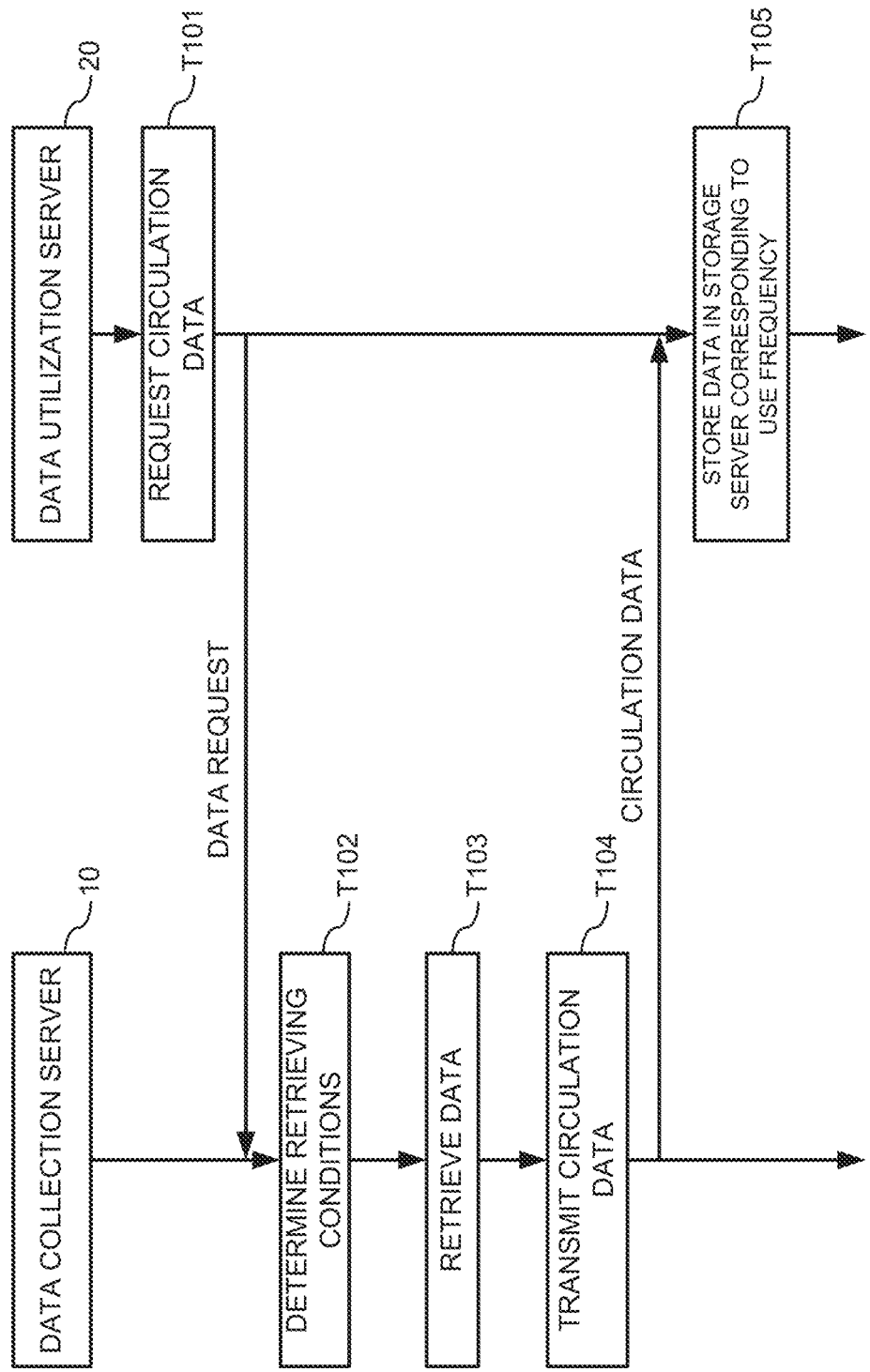
FIG. 14 is a sequence diagram of an example data circulation operation performed by the data collection server and the data utilization server according to Embodiment 1 of the present disclosure.

An example data circulation operation performed by the data collection server 10 and the data utilization server 20 will be described with reference to FIG. 14.

First, the data requester 2101 in the data utilization server 20 requests the data collection server 10 to transmit circulation data (step T101).

Subsequently, the data collection server 10 receiving the data request from the data utilization server 20 determines, with the retrieving condition determiner 1105, the retrieving conditions based on the received data request (step T102).

Subsequently, the data retriever 1106 in the data collection server 10 retrieves device data and supplementary information from the storage servers 11 based on the determined retrieving conditions (step T103).

Subsequently, the communicator 100 in the data collection server 10 transmits, to the data utilization server 20, circulation data including the retrieved device data and supplementary information (step T104).

Thereafter, the data utilization server 20 receiving the circulation data from the data collection server 10 stores, with the data saver 2102, the data in the storage server 21 corresponding to the use frequency included in the circulation data (step T105).

The data circulation system 1 according to Embodiment 1 has been described. In Embodiment 1, the data collection server 10 estimates the use frequency of device data based on the meaning of the device data, and stores the device data in the storage server 11 corresponding to the use frequency. Thus, massive amounts of device data can be efficiently stored. Efficiently storing massive amounts of device data can reduce the fee to be paid by the administrator of the data collection server 10 to the administrator of the storage servers 11.

The data collection server 10 transmits, to the data utilization server 20, device data and supplementary information including information about the meaning of the device data and information about the use frequency of the device data as circulation data. Thus, the data utilization server 20 receiving circulation data can efficiently store massive amounts of device data in the storage server 21 by storing data in the storage server 21 corresponding to the use frequency indicated by the circulation data without estimating the use frequency.

In either case, the structure according to Embodiment 1 can handle massive amounts of device data in an appropriate manner.

Modification of Embodiment 1

In Embodiment 1, the data collection server 10 directly receives device data from the devices 30. However, device data may not be directly received from the devices 30. For example, a home energy management system (HEMS) controller may receive device data from the devices 30, and the data collection server 10 may receive device data from the HEMS controller. In this case as well, the data collection server 10 receives device data from the devices 30 via the HEMS controller.

In Embodiment 1, the use frequency estimator 1102 estimates the use frequency of device data to be predetermined use frequency corresponding to the meaning identified by the meaning identifier 1101. In some embodiments, the use frequency estimator 1102 may estimate use frequency based on the acquisition frequency of device data having the same meaning as identified by the meaning identifier 1101. For example, when device data having the same meaning is acquired ten times a day, the device data having this meaning is estimated to have high use frequency.

In Embodiment 1, the data utilization server 20 stores data in the storage server 21 corresponding to the use frequency specified by the circulation data received from the data collection server 10. However, the data utilization server 20 may not store data in the storage server 21 corresponding to the use frequency indicated by circulation data. For example, when handling device data that is highly frequently used in the data collection server 10 but not highly frequently used in the data utilization server 20, the data utilization server 20 may store the data in the storage server 21 corresponding to intermediate use frequency, although the data is indicated by circulation data as having high use frequency.

In Embodiment 1, in transmitting circulation data, the data collection server 10 transmits information about the use frequency estimated upon receipt of device data included in the circulation data. In some embodiments, in transmitting circulation data, the data collection server 10 may include information about the use frequency different from the estimated use frequency in the circulation data. For example, device data included in circulation data to be transmitted may relate to temperature control of a water healer with intermediate use frequency, and an administrator of the data utilization server 20 receiving circulation data may be a servicer that provides a hot-water supply analysis service for a public bath. In this case, data relating to temperature control of a water heater is useful information for the administrator of the data utilization server 20, and thus has high use frequency. The data collection server 10 thus may transmit, to the data utilization server 20, circulation data including the device data relating to temperature control of the water heater while determining the circulation data as having high use frequency. More specifically, the data collection server 10 may change the use frequency depending on the data utilization server 20 before transmitting circulation data.

Embodiment 2

A data circulation system 1 according to Embodiment 2 will be described. The data circulation system according to Embodiment 2 differs in that the device 30 identifies the meaning of device data of the device 30, estimates the use frequency of the device data, and transmits supplementary information associated with the device data to the data collection server 10. The other components are substantially the same as those in Embodiment 1.

Figure 15:
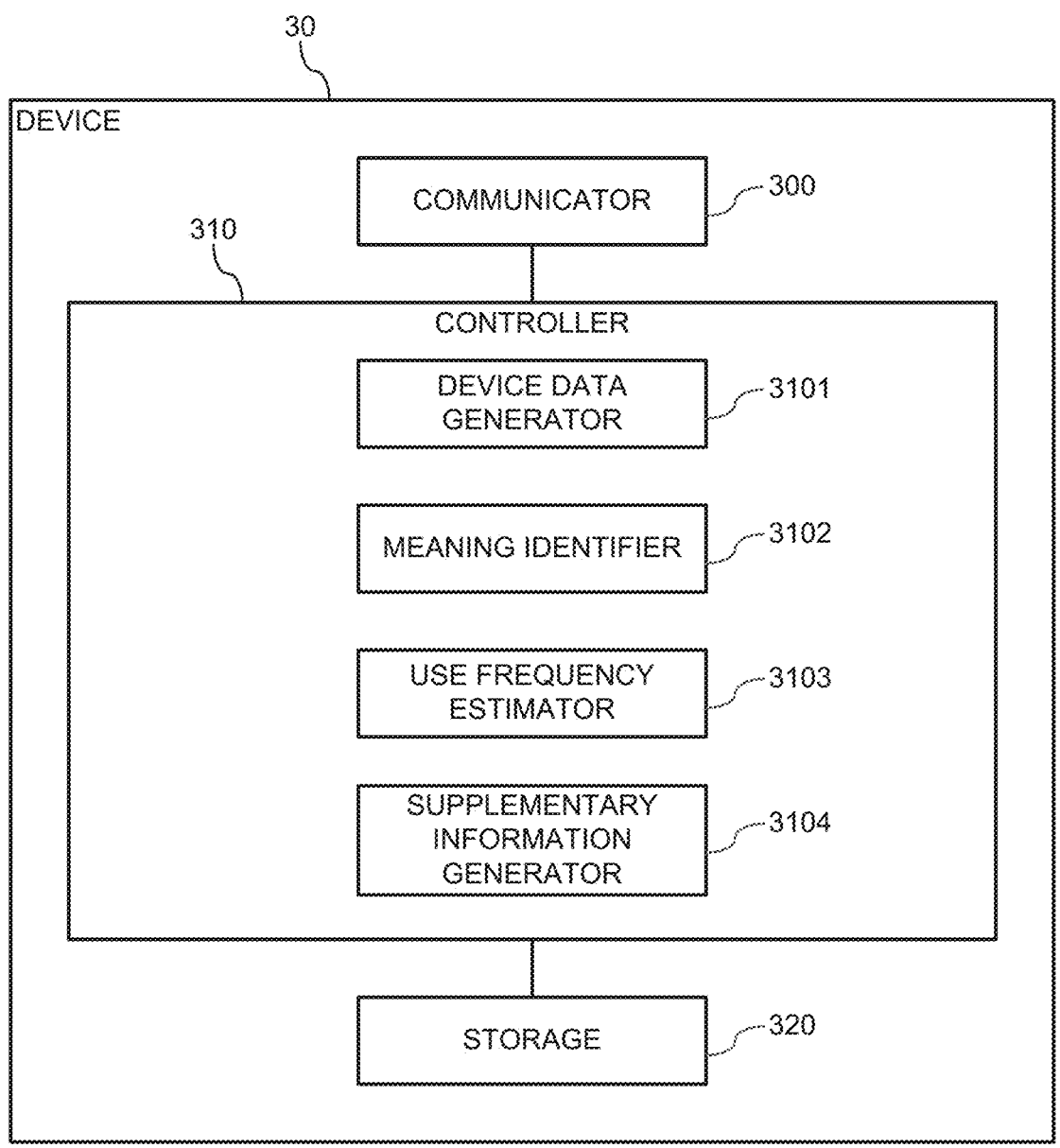
FIG. 15 is a functional block diagram of a device according to Embodiment 2 of the present disclosure.

With reference to FIG. 15, the functional components of the device 30 according to Embodiment 2 will be described. The device 30 includes a communicator 300, a controller 310, and a storage 320.

The communicator 300 is, for example, a network interface that can communicate with the Internet NT. The communicator 300 communicates with the data collection server 10. In particular, the communicator 300 transmits, to the data collection server 10, device data and supplementary information associated with the device data. The communicator 300 is an example of transmission means according to the present disclosure.

The controller 310 centrally controls the device 30. The controller 310 includes a device data generator 3101, a meaning identifier 3102, a use frequency estimator 3103, and a supplementary information generator 3104.

The device data generator 3101 generates device data based on the operation, status, or other aspects of the device 30. The device data generator 3101 is an example of device data generation means according to the present disclosure.

The functions of the meaning identifier 3102, the use frequency estimator 3103, and the supplementary information generator 3104 are substantially the same as those of the meaning identifier 1101 and the use frequency estimator 1102 of the data collection server 10, and thus will not be described. The use frequency estimator 3103 is an example of use frequency estimation means according to the present disclosure.

The functions of the storage 320 are substantially the same as the functions of the storage 120 of the data collection server 10, and thus will not be described.

Figure 16:
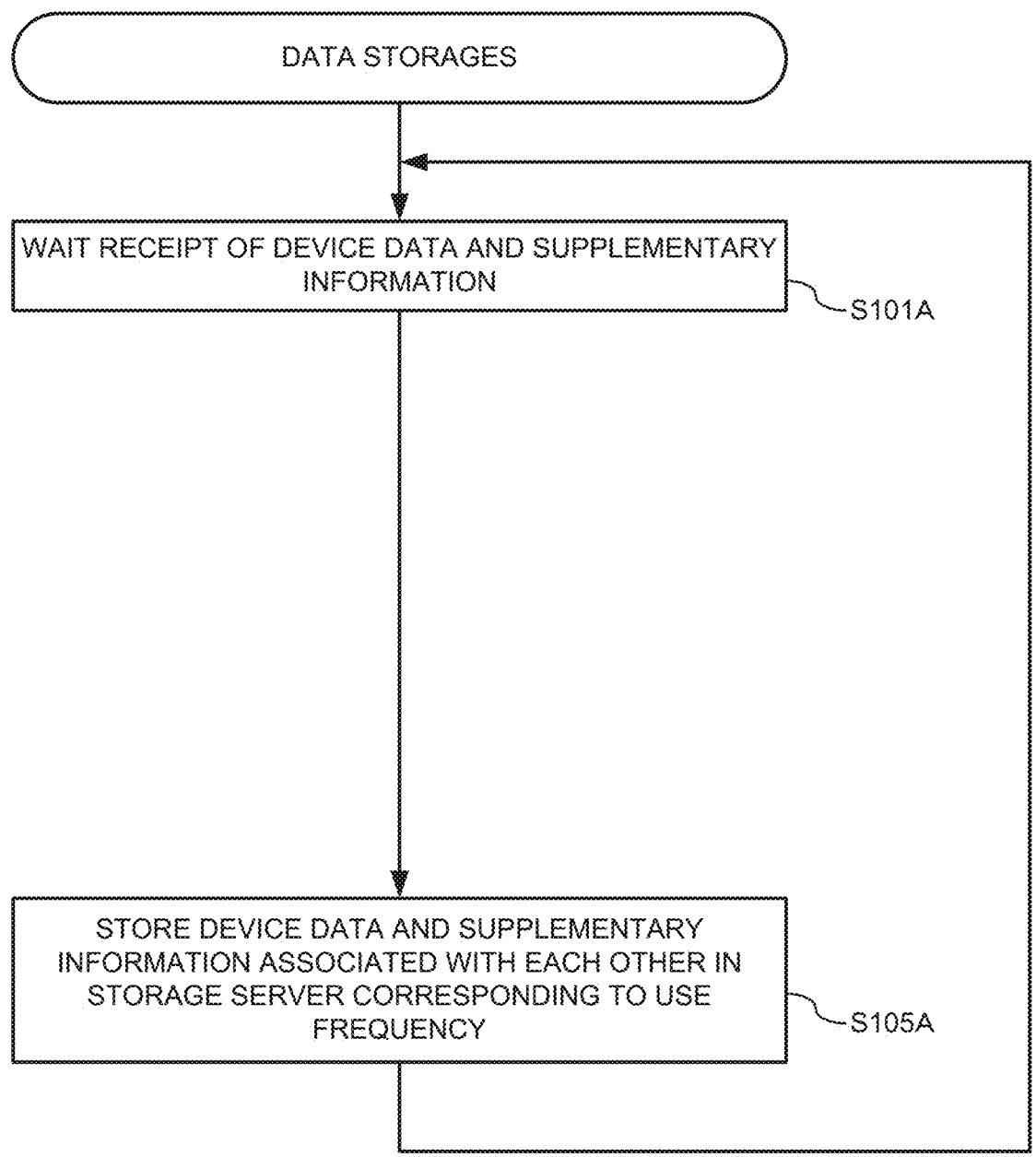
FIG. 16 is a flowchart showing an example data storage operation performed by a data collection server according to Embodiment 2 of the present disclosure.

With reference to FIG. 16, an example data storage operation performed by the data collection server 10 according to Embodiment 2 will now be described in comparison with the operation according to Embodiment 1 shown in FIG. 13.

First, the communicator 100 waits for receipt of device data and supplementary information from the device 30 (step S101A). This step differs from step S101 according to Embodiment 1 in that the communicator 100 also waits for receipt of supplementary information.

Subsequently, the data saver 1104 stores the received device data and supplementary information in the storage server 11 corresponding to the use frequency specified by the received supplementary information (step S105A). The presence of supplementary information and information about the use frequency included in the supplementary information eliminate the operations in steps S102 to S104 performed in Embodiment 1.

After the data storage, the controller 110 repeats the processing from step S101A.

The data circulation operation is totally the same as the operation in Embodiment 1, and thus will not be described.

The data circulation system 1 according to Embodiment 2 has been described. According to Embodiment 2, the device 30 estimates the use frequency of device data. Thus, massive amounts of device data can be efficiently stored without the data collection server 10 estimating the use frequency. This reduces the processing load on the data collection server 10. In other words, the structure according to Embodiment 2 can handle massive amounts of device data in an appropriate manner.

Embodiment 3

Figure 17:
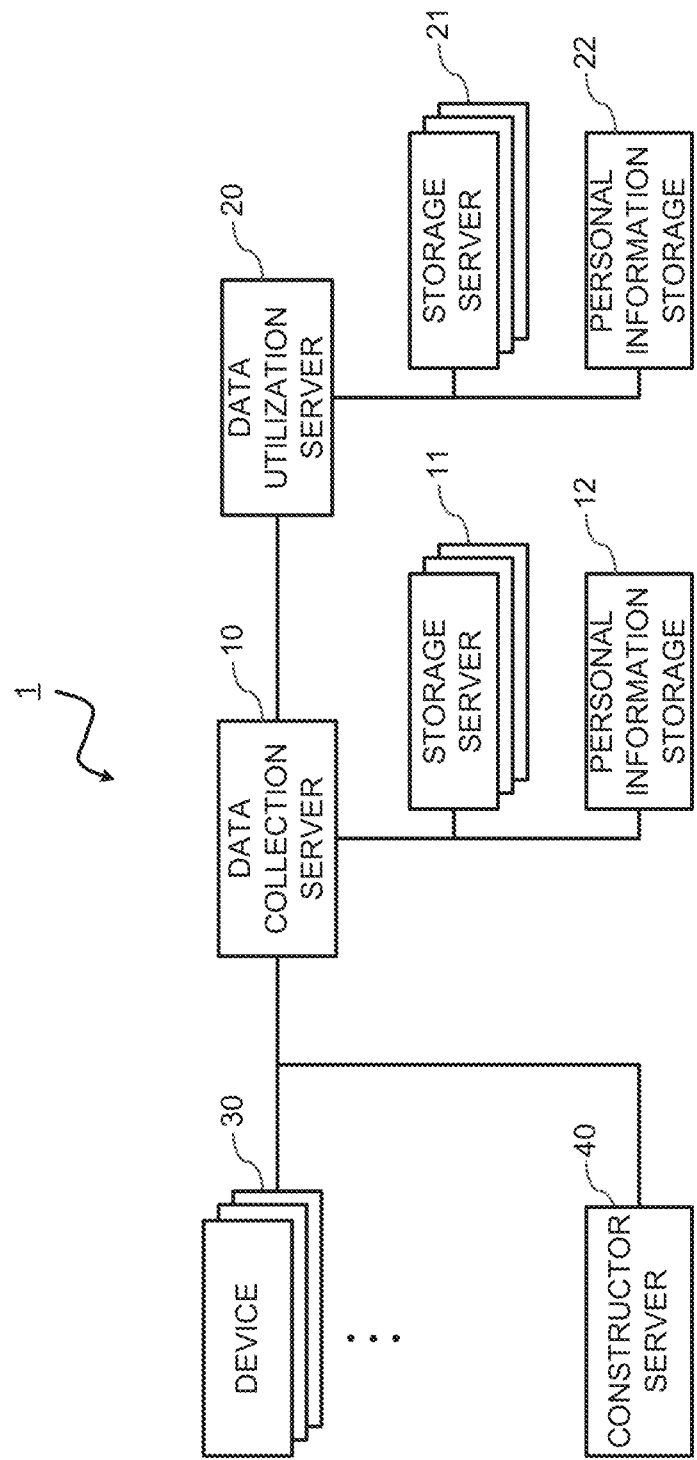
FIG. 17 is a diagram of a data circulation system according to Embodiment 3 of the present disclosure showing the system configuration.

A data circulation system 1 according to Embodiment 3 will be described with reference to FIG. 17. The data circulation system 1 according to Embodiment 3 handles, besides device data, construction data relating to construction such as installation, inspection, or renovation of the device 30 performed by a constructor. In addition to the components in the data circulation system 1 according to Embodiment 1, the data circulation system 1 according to Embodiment 3 also includes a personal information storage 12, a personal information storage 22, and a constructor server 40.

In addition to the functions of the data collection server 10 according to Embodiment 1, the data collection server 10 also has the functions described below. The data collection server 10 receives construction data from the constructor server 40. The data collection server 10 stores construction data in a manner associated with device data. The data collection server 10 stores, in the personal information storage 12, personal information included in construction data and associated with the device 30. The data collection server 10 transmits, to the data utilization server 20, circulation data including construction data.

In addition to the functions of the data utilization server 20 according to Embodiment 1, the data utilization server 20 also has the functions described below.

The data utilization server 20 receives, from the data collection server 10, circulation data including construction data. The data utilization server 20 stores construction data in a manner associated with device data. The data collection server 10 stores, in the personal information storage 22, personal information included in construction data and associated with the device 30.

The personal information storage 12 is, for example, a storage server for storing personal information administered by the administrator of the data collection server 10. The personal information storage 12 stores personal information associated with the device 30. The personal information storage 12 is an example of personal information storage means according to the present disclosure.

The personal information storage 22 is, for example, a storage server for storing personal information administered by the administrator of the data utilization server 20. The personal information storage 22 stores personal information associated with the device 30. The personal information storage 22 is an example of personal information storage means according to the present disclosure.

The constructor server 40 is a server operated by, for example, a constructor having a cooperative relationship with the manufacturers of the devices 30. The constructor server 40 transmits construction data associated with the devices 30 to the data collection server 10. The construction data is input to the constructor server 40 through, for example, a portable terminal of the constructor during construction of the device 30.

An example of construction data will be described with reference to FIG. 18. The construction data includes a construction identification (ID) that identifies individual constructions, IDs of constructors, device IDs of the constructed devices 30, construction-related information such as the construction details, the date of construction, the place of construction, and construction images, user IDs of users of the constructed devices 30, and addresses of the installation places of the constructed devices 30. As described above, the device IDs can individually identify the devices 30. Thus, each of the devices 30, the corresponding user, and the corresponding address are associated with each other based on construction data More specifically, construction data includes personal information. Similarly to device data, construction data is represented in, for example, the JSON or the XML.

The data collection server 10 according to Embodiment 3 will now be described with reference to FIG. 5 focusing on its differences from Embodiment 1.

The communicator 100 differs from the communicator 100 according to Embodiment 1 in that the communicator 100 also communicates with the constructor server 40. In particular, the communicator 100 receives construction data from the constructor server 40.

The use frequency estimator 1102 differs from the use frequency estimator 1102 according to Embodiment 1 in that the use frequency estimator 1102 also estimates the use frequency of construction data. Unlike estimation of the use frequency of device data, in estimating the use frequency of construction data, the use frequency estimator 1102 estimates the use frequency for each type of data included in the construction data. This estimation will be described with reference to the example shown in FIG. 18. Data relating to the construction ID, the constructor ID, the device ID, the construction details, and the construction date is estimated to have high use frequency, and these types of data are estimated as having high use frequency. In contrast, data relating to the construction place and the construction image is expected to be rarely used, and thus these types of data are estimated as having low use frequency. Data relating to the user ID and the address is personal information, and stored in the personal information storage 12, as described later. Thus, rise frequency of these types of data is not estimated.

The supplementary information generator 1103 differs from the supplementary information generator 1103 according to Embodiment 1 in that the supplementary information generator 1103 also generates supplementary information corresponding to construction data. The supplementary information for construction data includes the use frequency of various types of data included in construction data and estimated by the rise frequency estimator 1102. As described later, supplementary information may include information associating data stored in the storage server 11 corresponding to high use frequency with data, stored in other storage servers 11.

The data saver 1104 differs from the data saver 1104 according to Embodiment 1 in that the data saver 1104 also stores construction data and supplementary information corresponding to the construction data in the storage server 11, and stores personal information included in construction data in the personal information storage 12 in a manner associated with the device ID. The personal information is not stored in the storage server 11.

The data saver 1104 stores various types of data included in construction data in the storage server 11 corresponding to the estimated use frequency. Data, relating to the same construction is stored in a different storage server 11 corresponding to use frequency. Thus, supplementary information may include information associating data stored in the storage server 11 corresponding to high use frequency with data stored in other storage servers 11.

The data saver 1104 stores personal information included in construction data, such as the user ID and the address in a manner associated with the device ID included in construction data in the personal information storage 12. FIG. 19 is a table of example data stored in the personal information storage 12. As shown in FIG. 19, personal information including the user ID individually identifying a user and the address of the installation place of the device 30 is stored in a manner associated with the device ID of the device 30.

The data utilization server 20 according to Embodiment 3 differs from the data utilization server 20 according to Embodiment 1 in substantially the same aspects as in the data collection server 10, and thus will not be described. The data storage operation and the data circulation operation are also substantially the same as the operations in Embodiment 1 except for handling construction data and storing personal information in the personal information storage, and thus will not be described.

The data circulation system 1 according to Embodiment 3 has been described. According to Embodiment 3, construction data can be handled in addition to device data. The device ID and personal information associated together are stored in the personal information storage 12, and personal information is not stored in the storage server 11. Thus, the user and the device 30 can be associated with each other while personal information can be managed separately from the other information. Thus, for example, a service of providing device data relating to a specific user can be implemented. Deleting personal information and the associated device ID stored in the personal information storage 12 disables identification of an individual from the device data remaining in the storage server 11. Thus, the data circulation system 1 according to Embodiment 3 can handle massive amounts of data appropriately while protecting personal information.

Embodiment 4

A data circulation system 1 according to Embodiment 4 will be described. In Embodiment 1, circulation data includes device data and supplementary information corresponding to the device data. The data utilization server 20 may request massive amounts of data, such as all the data pieces relating to ON/OFF control during a certain period. Thus, circulation data to be transmitted to the data utilization server 20 can be massive. In the data circulation market, a pair of device data and supplementary information to be transmitted may be collectively handled, Embodiment 4 is a modification of Embodiment 1 in response to this issue.

Figure 20:
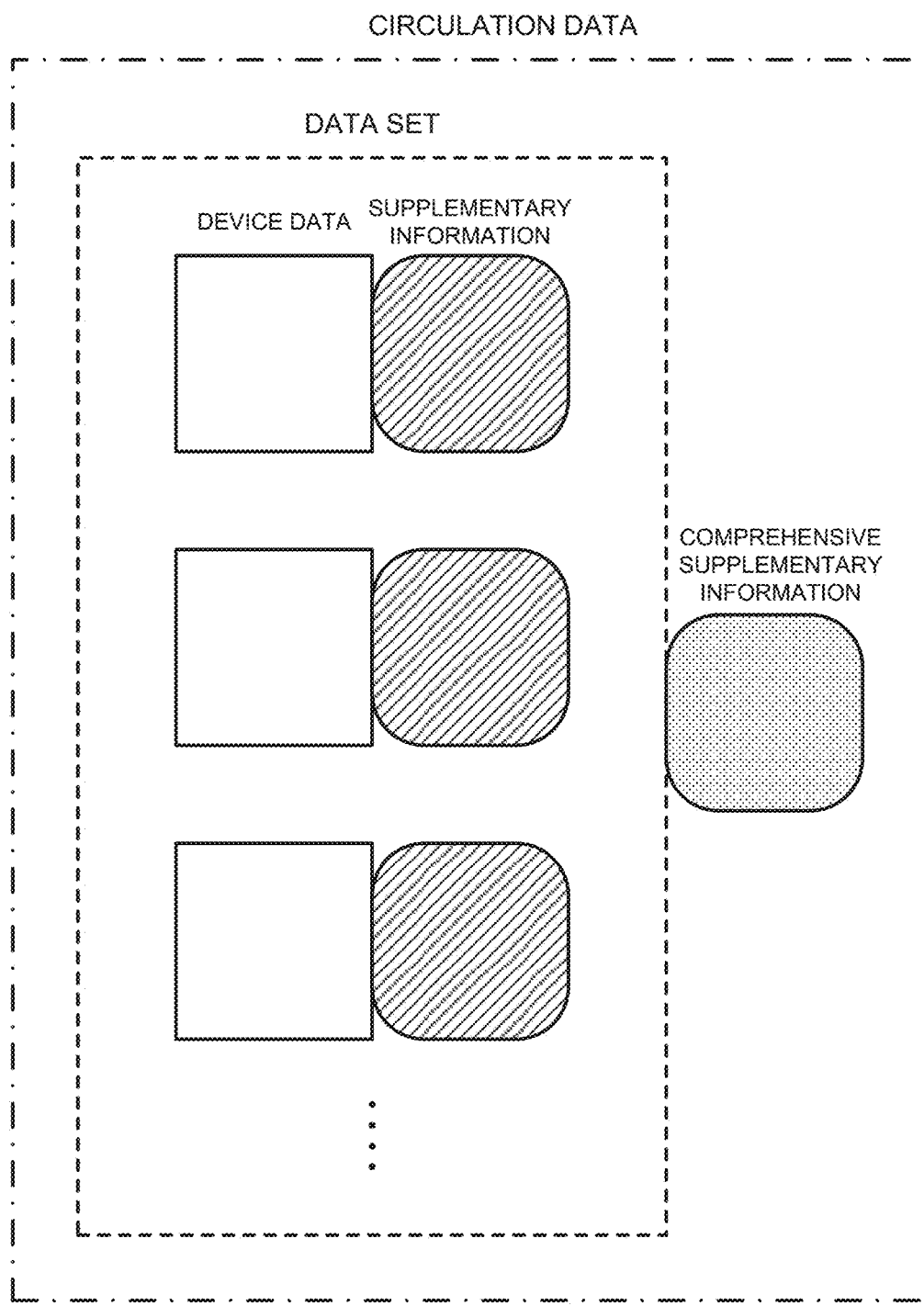
FIG. 20 is a diagram of example circulation data transmitted by a data collection server according to Embodiment 4 of the present disclosure.

As shown in FIG. 20, circulation data in Embodiment 4 includes at least one pair of device data and supplementary information (hereinafter referred to as a data set), and comprehensive supplementary information relating to the data set. The data collection server 10 transmits such circulation data to the data utilization server 20. As shown in FIG. 21, for example, the comprehensive supplementary information includes information relating to a data set, such as the data size of the data set, a target device indicating the type of device data targeted by the data set, the details of the data set, a target period indicating the period of the data set, the data transmitter that transmits the data set, and the sales price of the data set.

Figure 22:
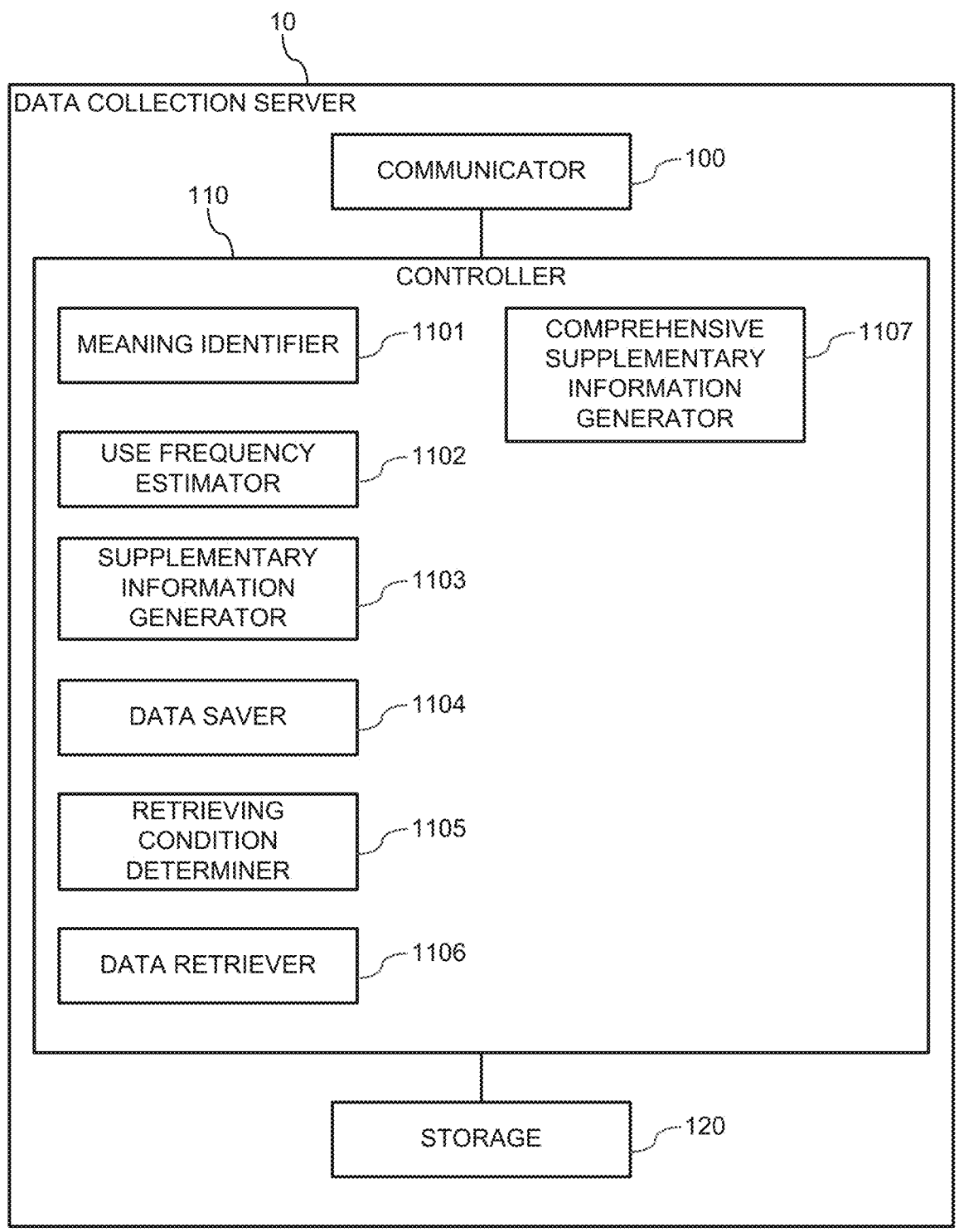
FIG. 22 is a functional block diagram of the data collection server according to Embodiment 4 of the present disclosure.

The functional components of the data collection server 10 that differ from the functional components according to Embodiment 1 will be described with reference to FIG. 22. In addition to the controller 110 according to Embodiment 1, the controller 110 for the data collection server 10 also includes a comprehensive supplementary information generator 1107.

The comprehensive supplementary information generator 1107 generates information relating to the entire data set retrieved by the data retriever 1106 as comprehensive supplementary information. For example, the comprehensive supplementary information generator 1107 generates information such as a target device, the data details, and the target period among information to be included in the comprehensive supplementary information based on the retrieving conditions determined by the retrieving condition determiner 1105. The comprehensive supplementary information generator 1107 is an example of comprehensive supplementary information generation means according to the present disclosure.

Under control of the controller 110, the communicator 100 transmits data including a data set and comprehensive supplementary information to the data utilization server 20 as circulation data.

The data utilization server 20 has the same functional components as the data utilization server 20 according to Embodiment 1, and thus will not be described. The data storage operation is also the same as the operation according to Embodiment 1, and thus will not be described. The data circulation operation is also substantially the same as the operation according to Embodiment 1 except that circulation data includes the data set and the comprehensive supplementary information, and thus will not be described.

The data circulation system 1 according to Embodiment 4 has been described. According to Embodiment 4, the data circulation system 1 generates comprehensive supplementary information corresponding to a data set, and collectively transmits the data set and the comprehensive supplementary information as circulation data. Thus, massive amounts of data can be easily handled. In other words, the data circulation system 1 according to Embodiment 4 can handle massive amounts of data appropriately.

Modification of Embodiment 4

In Embodiment 4, the data collection server 10 generates comprehensive supplementary information to transmit circulation data. However, in the data collection server 10, the comprehensive supplementary information generator 1107 may generate comprehensive supplementary information at any timing, and the data saver 1104 may store the comprehensive supplementary information in the storage server 11 corresponding to high use frequency. Examples of information to be comprehensive supplementary information include information relating to a data set highly intended by the data utilization server 20. For example, a data set relating to the room temperature for a month may be highly intended by the data utilization server 20. Thus, comprehensive supplementary information corresponding to the data set may be generated in advance and stored in the storage server 11.

Embodiment 4 may be combined as appropriate with any of the above embodiments and modifications. For example, Embodiment 4 may be combined with Embodiment 3. The comprehensive supplementary information may also include information as to whether the data set includes personal information. In this case, the sales price of the comprehensive supplementary information may be varied depending on whether the information includes personal information.

Embodiment 5

A data circulation system 1 according to Embodiment 5 will be described. In the modification of Embodiment 4, the data collection server 10 generates comprehensive supplementary information in advance. The data circulation system according to Embodiment 5 is another modification of the modification of Embodiment 4. In the data, circulation system according to Embodiment 5, the data collection server 10 can form a sales catalog of circulation data using comprehensive supplementary information generated in advance, and the data utilization server 20 can purchase circulation data listed in the sales catalog.

Figure 23:
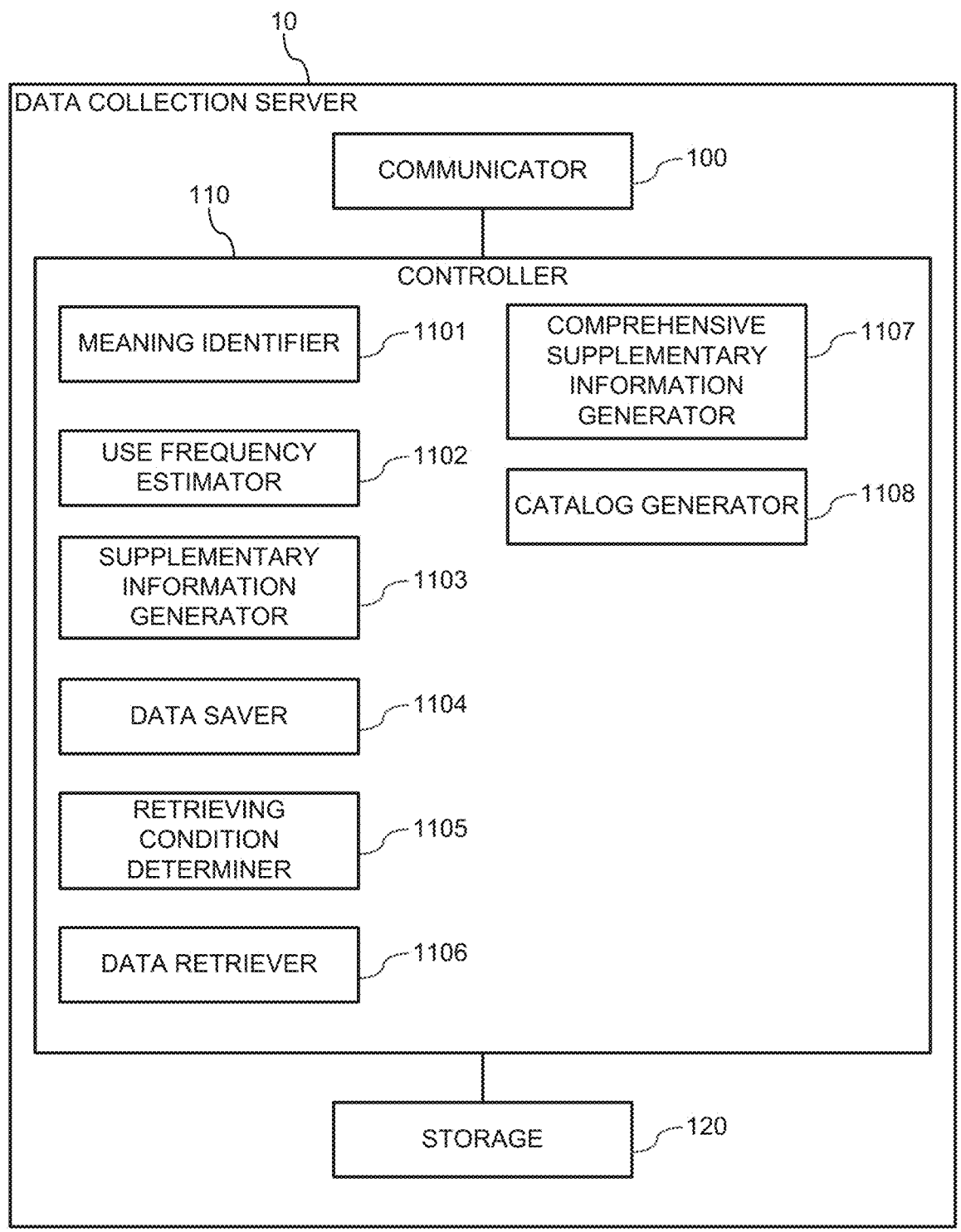
FIG. 23 is a functional block diagram of a data collection server according to Embodiment 5 of the present disclosure.

With reference to FIG. 23, the functional components of the data collection server 10 that differ from the functional components according to Embodiment 4 will be described. The data collection server 10 also includes a catalog generator 1108, in addition to the components of the data collection server 10 according to Embodiment 4.

The catalog generator 1108 generates, based on comprehensive supplementary information stored in the storage server 11, a sales catalog of the data sets associated with the comprehensive supplementary information. The sales catalog is used to advertise the sales of circulation data including the data sets to the administrator of the data utilization server 20. The sales catalog may include information used by the administrator of the data utilization server 20 to determine whether to purchase the circulation data including the data details, the target period, and the price of data. For example, the details of the sales catalog are substantially similar to example comprehensive supplementary information shown in FIG. 21. The catalog generator 1108 is an example of catalog generation means according to the present disclosure.

Under the control of the controller 110, the communicator 100 transmits the sales catalog to the data utilization server 20.

The functional components of the data utilization server 20 that differ from the functional components of the data utilization server 20 according to Embodiment 4 will now be described with reference to FIG. 11.

The communicator 200 receives a sales catalog of circulation data from the data collection server 10. The data requester 2101 determines whether to purchase the circulation data based on the information in the received sales catalog. When determining to purchase the circulation data, the data requester 2101 requests the data collection server 10 to transmit the circulation data via the communicator 200. The determination as to whether to purchase circulation data may be based on predetermined conditions such as the data details, the target period, and the sales price of the data, or based on an input from the administrator of the data collection server 10 through an input device.

The data storage operation is similar to the operation according to Embodiment 4, and thus will not be described. The data circulation operation is also substantially the same as the operation according to Embodiment 4 except that the data collection server 10 transmits a sales catalog to the data utilization server 20, and the data utilization server 20 that has received the sales catalog determines whether to purchase circulation data, and thus will not be described.

The data circulation system 1 according to Embodiment 5 has been described. According to Embodiment 5, the data collection server 10 generates the sales catalog of circulation data, and transmits the catalog to the data utilization server 20.

Thus, massive amounts of device data can be smoothly handled. The data circulation system 1 according to Embodiment 5 can thus appropriately handle massive amounts of device data.

Embodiment 6

Figure 24:
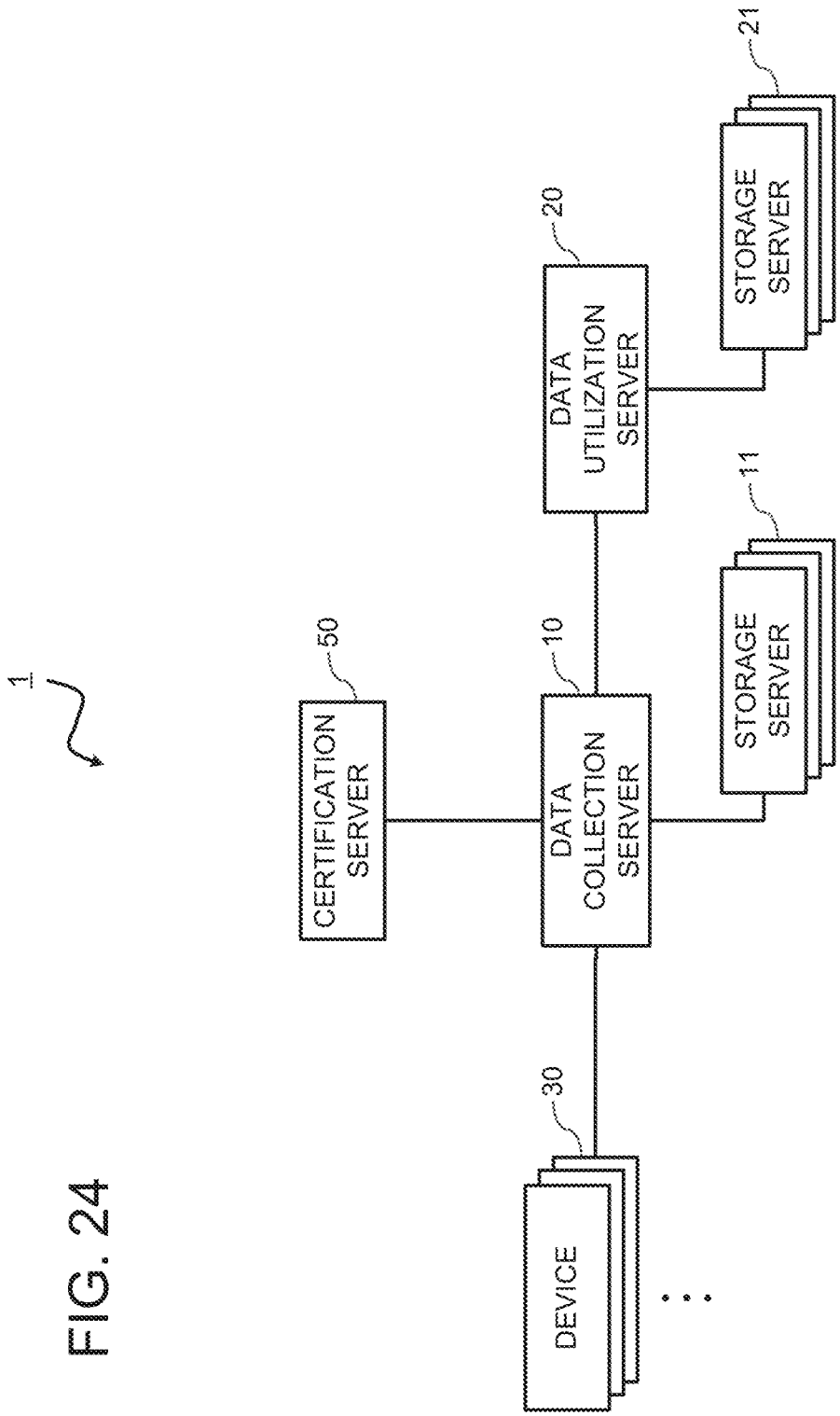
FIG. 24 is a diagram of a data circulation system according to Embodiment 6 of the present disclosure showing the system configuration.

With reference to FIG. 24, a data circulation system 1 according to Embodiment 6 will be described. No structures according to the above embodiments and modifications focus on the authenticity of device data. Thus, falsified device data without authenticity may be circulated. Thus, the authenticity of data is to be achieved. Embodiment 6 is a modification of Embodiment 1 in response to this issue.

The data collection server 10 also includes a certification server 50, in addition to the components of the data collection server 10 according to Embodiment 1. The certification server 50 is, for example, a server administered by a third-party organization irrelevant to both the administrator of the data collection server 10 and the administrator of the data utilization server 20. The certification server 50 issues, based on a request from the data collection server 10, a certificate that certifies the authenticity of device data included in the data collection server. A specific operation of issuing the certificate will be described later. The certification server 50 is an example of a certification server according to the present disclosure.

With reference to FIG. 5, the functional components of the data collection server 10 that differ from the functional components of the data collection server 10 according to Embodiment 1 will be described.

The controller 110 determines a data set whose authenticity is to be certified. The controller 110 also includes the certificate in circulation data when transmitting the circulation data to the communicator 100.

The communicator 100 communicates with the certification server 50. In particular, the communicator 100 transmits supplementary information, a data certification request, and inspection target data to the certification server 50, and receives an inspection target data request and a certificate from the certification server 50.

The retrieving condition determiner 1105 determines conditions for retrieving inspection target data requested by the certification server 50.

The data saver 1104 stores, in the storage server 11, the certificate received from the certification server 50 in a manner associated with the corresponding device data and supplementary information.

The data utilization server 20 is substantially the same as the data utilization server 20 according to Embodiment 1 except that circulation data includes a certificate, and thus will not be described. The data storage operation and the data circulation operation are also substantially the same as the operations in Embodiment 1, and thus will not be described.

Figure 25:
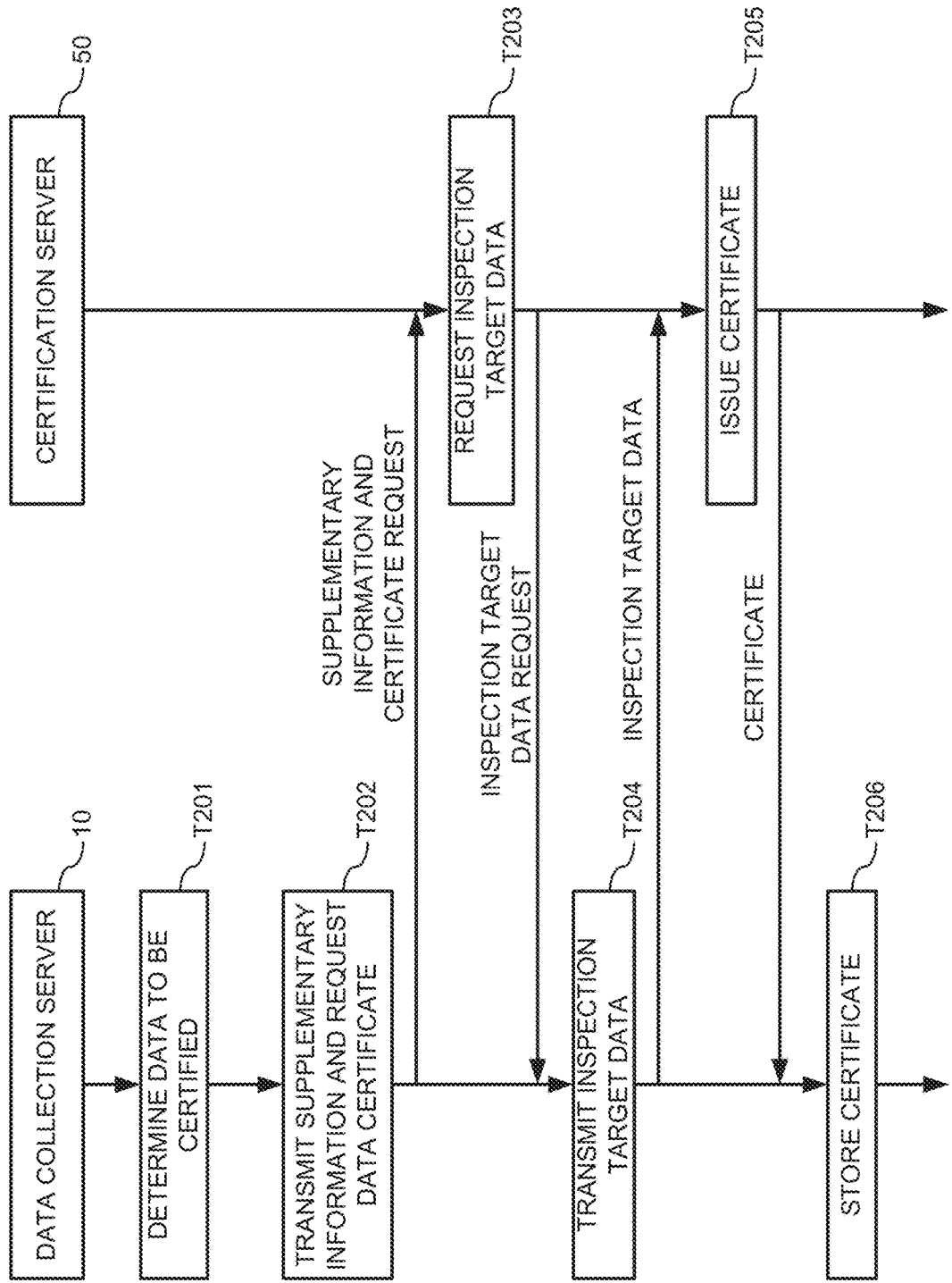
FIG. 25 is a sequence diagram of an example data certification operation performed by a data collection server and a certification server according to Embodiment 6 of the present disclosure.

With reference to FIG. 25, an example data certification operation performed by the data collection server 10 and the certification server 50 will now be described.

First the data collection server 10 causes the controller 110 to determine device data whose authenticity is to be certified (step T201). Multiple pieces of related device data may be collectively determined as data whose authenticity is to be certified. For example, data for ON/OFF control data for ON/OFF control of an air conditioner for a specific month may be collectively determined as certification target data.

Subsequently, the data collection server 10 causes the controller 110 to transmit supplementary information corresponding to the device data determined as a certification target to the certification server 50, and requests the certification server 50 to certify the authenticity of the device data (step T202).

Subsequently, the certification server 50 that has received supplementary information and the certification request determines, based on the received supplementary information, device data to be inspected to certify authenticity as inspection target data, and requests the inspection target data from the data collection server 10 (step T203).

All the pieces of device data corresponding to supplementary information may be inspected. However, the amount of data can be massive, and such inspection may not be realistic. Thus, the certification server 50 may randomly pick up several percent of all the data pieces based on supplementary information to determine the sampled pieces as inspection targets, and request the data of the inspection targets from the data collection server 10.

The data collection server 10 that has received the inspection target data request causes the retrieving condition determiner 1105 to determine conditions for retrieving inspection target data, causes the data retriever 1106 to retrieve device data serving as the inspection target data, from the storage server 11, and causes the communicator 100 to transmit the inspection target data to the certification server 50 (step T204).

The certification server 50 that has received the inspection target data inspects the authenticity of the inspection target data. When successfully certifying the authenticity, the certification server 50 issues a certificate to the data collection server 10 (step T205). Authenticity certification is based on, for example, correlation or the change amount of the values of the inspection target. For example, when device data relating to the room temperature serves as inspection target data, the device data is determined as having no authenticity when, for example, the correlation or change amount unnatural for the room temperature is inspected. Although not shown in FIG. 25, when the authenticity fails to be certified, no certificate is issued.

The data collection server 10 that has received a certificate causes the data saver 1104 to store the certificate in the storage server 11 in a manner associated with the corresponding device data and supplementary information.

The data circulation system 1 according to Embodiment 6 has been described. The data circulation system 1 according to Embodiment 6 can certify the authenticity of device data, and thus can appropriately handle massive amounts of device data circulating in the data circulation market.

Modification of Embodiment 6

Figure 26:
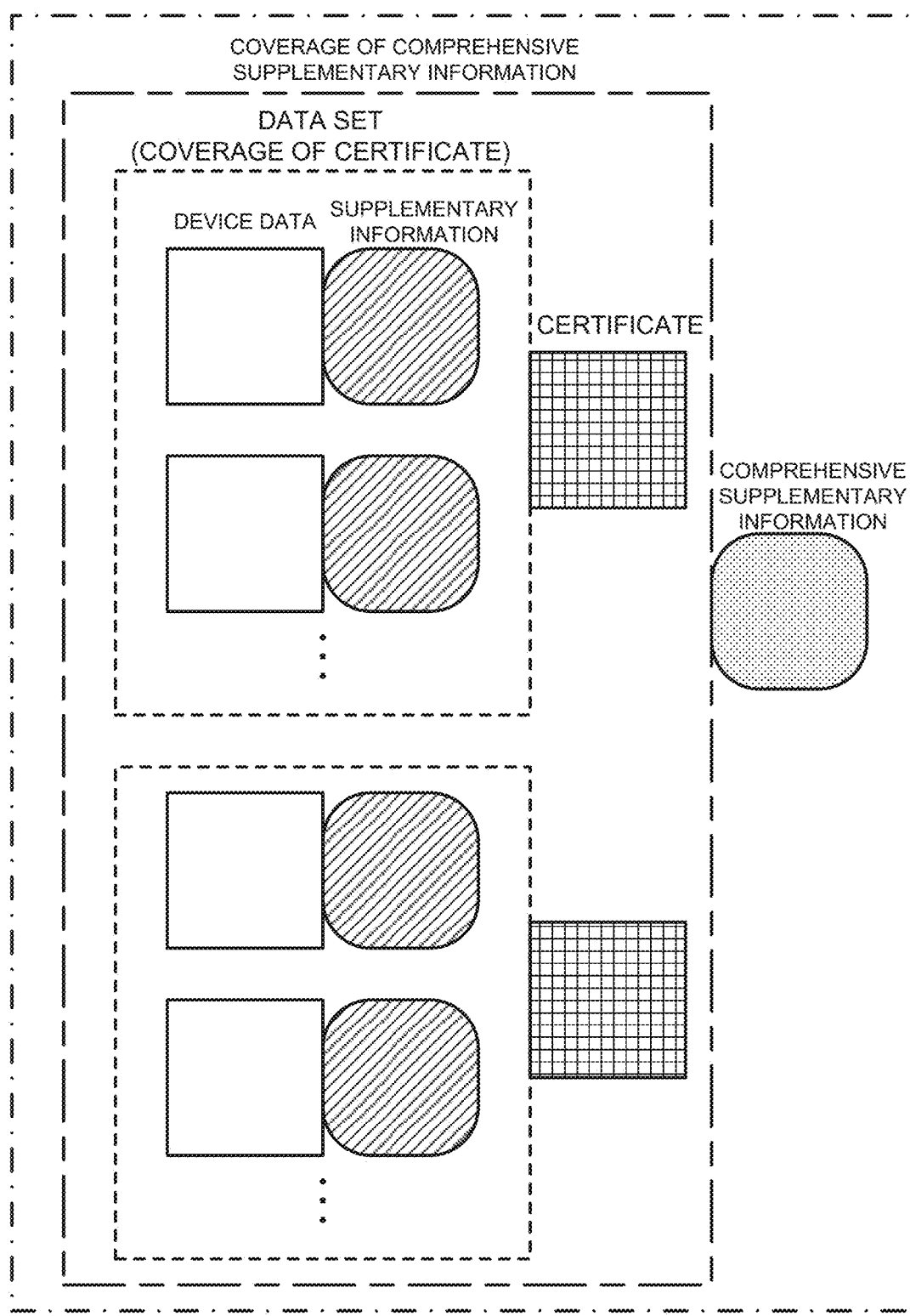
FIG. 26 is a diagram of example circulation data transmitted by a data collection server according to a modification of Embodiment 6 of the present disclosure.

For example, Embodiment 6 may be combined with Embodiment 4 or 5 as appropriate. FIG. 26 is a diagram of example circulation data including a certificate according to a modification of Embodiment 6. The certificate covers one data set. Comprehensive supplementary information is associated with two data sets and two certificates corresponding to the data sets. In this manner, each certificate may certify multiple pieces of device data, and multiple certified data sets may be associated with one piece of comprehensive supplementary information. Thus, multiple certified data sets can be collectively circulated. In this modification, comprehensive supplementary information may include information about the presence of the certificate.

Other Modifications

In the above embodiments and modifications, device data is not processed. However, device data may undergo minor processing for, for example, standardization of the number of significant digits of numeric data or the date and time. In this case, additional information indicating that the data is processed and information relating to the details of the processing or information on the processor may be added to supplementary information corresponding to the processed device data Adding information relating to processing to the supplementary information enables identification of the processing background or the processor when a problem occurs during processing. In other words, the traceability of data processing is achieved.

The above embodiments and modifications exclude the possibility that device data pieces may have different values. However, for example, thermal image information acquired by a thermal image sensor mounted on some air conditioners can be high value information. For example, the meaning identifier 1101 in the data collection server 10 may thus identify the value of device data as the meaning of the device data, categorize data sets in accordance with the values, and associate the data sets of the same value in comprehensive supplementary information. The sales price indicated by the comprehensive supplementary information may be set to correspond to the value, instead of individually corresponding to the data set. This may facilitate, for example, the settings of the sales price or calculation of the amount. Device data pieces with different values may be stored in different storage servers 11 corresponding to the values.

In the above embodiments and modifications, device data does not undergo any statistical processing. However, device data aggregated in a predetermined period, such as weekly power consumption or monthly average room temperature, may be demanded frequently. Retrieving and transmitting, with the data utilization server 20, all the device data pieces in the predetermined period is inefficient when aggregated device data is to be used alone. Thus, the data collection server 10 may, at any timing, aggregate device data of a predetermined period, and store the aggregated device data in the storage server 11. In this case, supplementary information corresponding to the aggregated device data may include information indicating that device data is aggregated and a link to the data before aggregation. The aggregated data may be stored in a dedicated storage server 11 different from a storage for other data.

The data size of the aggregated data is not very large. The aggregated data can thus be received by a terminal device with a small storage capacity such as a smartphone or a tablet terminal. In Embodiment 5, a sales catalog relating to such aggregated data can thus be transmitted to a terminal device, and the terminal device can request and purchase the aggregated data.

In the above embodiments and modifications, device data stored in one of the storage servers 11 may be moved to another storage server 11. For example, device data left over a predetermined period such as a month or a half year after storage may have lower use frequency. Moving such device data to the storage server 11 corresponding to lower use frequency enables more efficient storage of device data. When device data is moved to another storage server 11, information indicating such movement of the device data may be added to supplementary information to improve traceability.

In addition, any two or more of the embodiments and modifications may be combined as appropriate within the scope of the general knowledge of persons having ordinary skill in the art to form an embodiment of the present disclosure. For example, Embodiments 3 and 6 may be combined to certify the authenticity of construction data.

In the hardware configuration shown in FIG. 12, the data collection server 10 includes the secondary storage 8004. However, the secondary storage 8004 may be installed external to the data collection server 10, and the data collection server 10 and the secondary storage 8004 may be connected to each other via the interface 8003. In this configuration, the secondary storage 8004 may be a removable medium such as a universal serial bus (USB) flash drive or a memory card.

In place of the hardware configuration shown in FIG. 12, the data collection server 10 may include a control circuit including an application-specific integrated circuit (ASIC) or a field-programmable gate array (FPGA). In the hardware configuration shown in FIG. 12, some functions of the data collection server 10 may be implemented by, for example, a control circuit connected to the interface 8003.

The program used in the data collection server 10 may be distributed on a non-transitory computer-readable recording medium such as a compact disc read-only memory (CD-ROM), a digital versatile disc (DVD), a USB flash drive, a memory card, or an HDD. A specific or a general-purpose computer on which the program is installed can function as the data collection server 10.

The program described above may be stored in a storage in another server on the Internet and may be downloaded from the server.

Supplementary Explanation of Related Techniques

Techniques relating to the above embodiments and modifications will be supplementary described with reference to the drawings. Encircled numerals in the drawings are shown as parenthesized numerals in the examples described. For example, an encircled numeral 1 corresponds to (1) in the examples described below.

Figure 27:
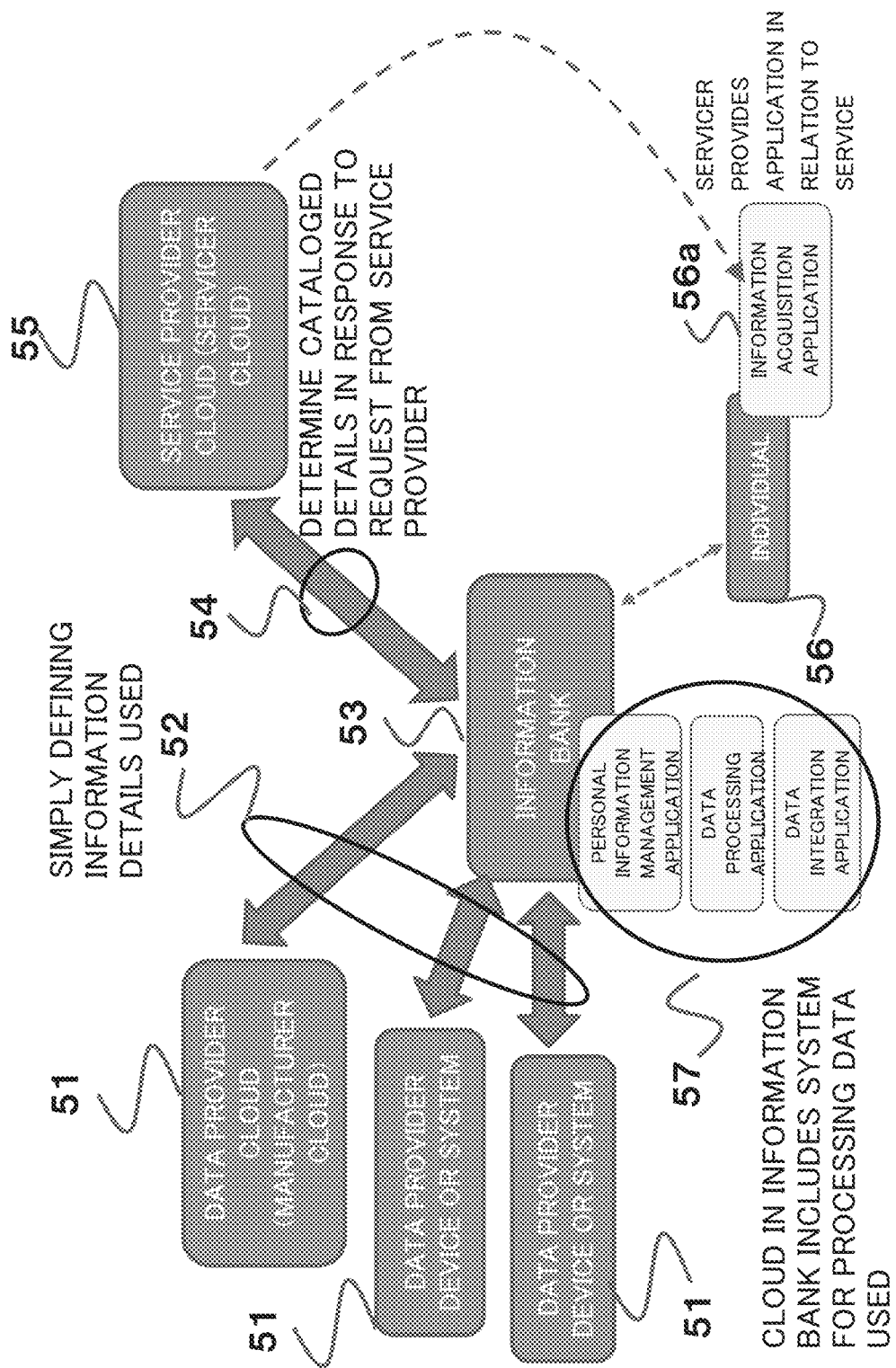
FIG. 27 is a diagram of a known data circulation system using an information bank.

FIG. 27 is a diagram of a known data circulation system using an information bank. The information bank is an organization that mediates circulation of device data serving as big data. In the example below, servers operated by operators such as a manufacturer, a servicer, and an information bank are expressed with the names of the operators as appropriate. In the system shown in FIG. 27, big data uploaded by a manufacturer is provided to a servicer 55 via an information bank 53. The information bank 53 processes data uploaded by data providers 51 (such as a manufacturer cloud) by, for example, standardizing the data format.

In particular, a device manufacturer without a cloud, a device manufacturer with a manufacturer cloud and without a circulation system, and a device manufacturer including a dedicated information technology (IT) section for processing large scale data are to entrust the data circulation operation to the information bank 53. The data circulation operation entrusted to the information bank 53 includes management of personal information, data accumulation and aggregation, and generation of data catalogs. In this case, the information bank 53 handles data circulation. Thus, the manufacturers may not specifically define an application programming interlace (API), such as a data format (and may simply provide actual information).

The information bank 53 handles data circulation. Thus, the entire system is established without specifically defining the API, such as a data format (by simply providing actual information). Thus, the information bank 53 includes data handling applications 57, such as a personal information management application, a data processing application, or a data integration application, and processes and provides data with the applications 57.

In this case, the information bank 53 mediates circulation. Thus, the needs of a data provider and the servicer 55 are to be adjusted, or data circulation may be limited depending on the business model of the information bank 53.

An open system described later (a system for directly circulating data from the data provider 51 to the servicer 55), which relates to the embodiments of the present disclosure, has higher circulation performance. However, when a provider fails to build a system for the above reasons, the provider may use both the information bank 53 and the open system. The data form is thus to comply with the form in the open system. Additionally, an individual 56 may request browsing or deleting data relating to personal information and acquires data of the individual 56 from the information bank 53 via an information acquisition application 56a.

Figure 28:
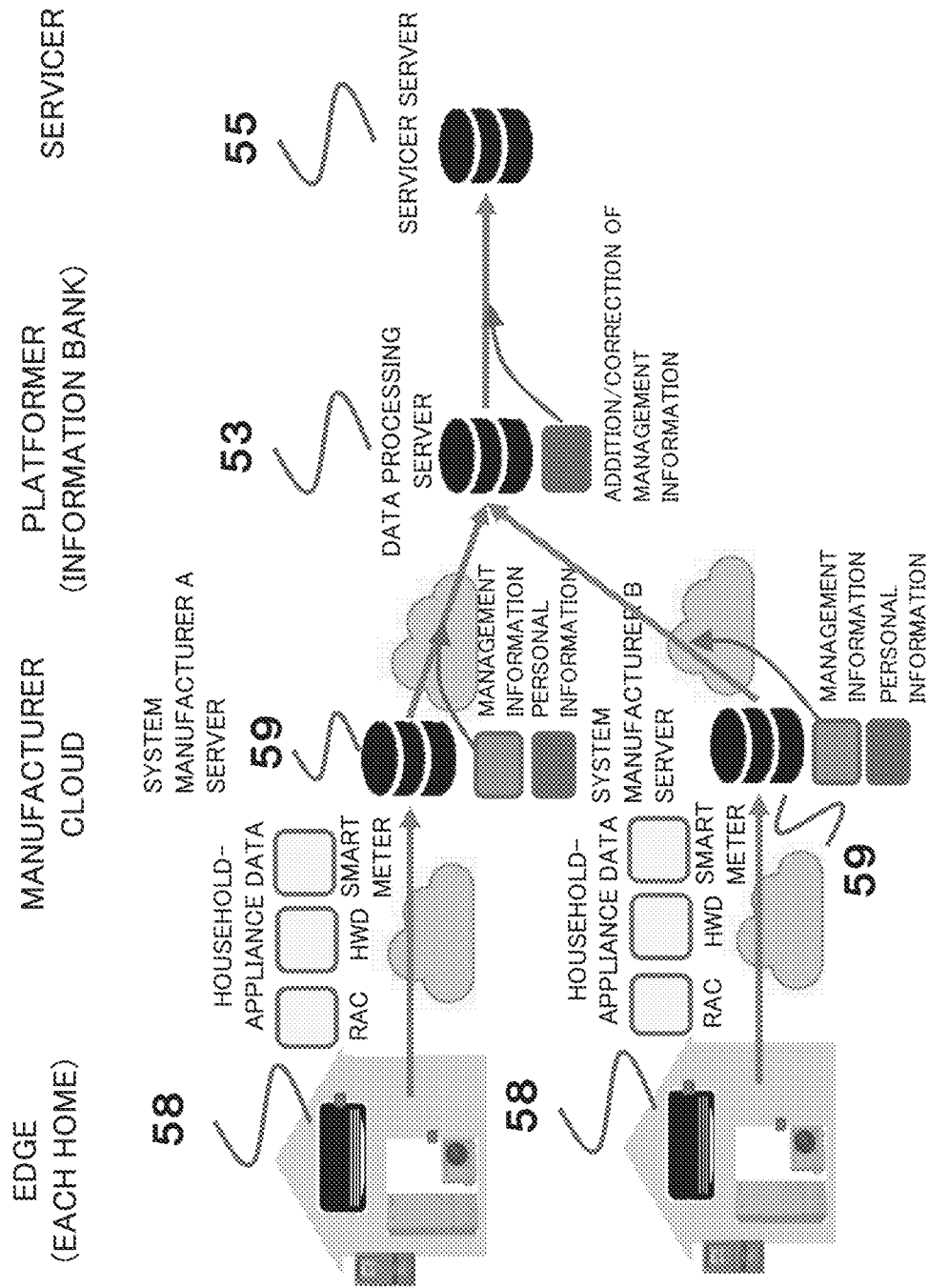
FIG. 28 is a diagram of a data flow in the known data circulation system using the information bank.

FIG. 28 is a diagram of a data flow in the known data circulation system using the information bank 53. When households 58 each have a customer-premises control system such as a HEMS system, IoT data at each household 58 is managed by each system manufacturer server 59 responsible for the system, the information bank 53 collects the IoT data, processes data format or other details, and provides the resultant to the servicer 55. In this system, the data is provided in a catalog (or by describing the meaning of each data piece in a standard language and generalizing the data for ease of use) for enhancing usability for the servicer 55.

Data uploaded from the devices, for example, household appliances (home electronics) is in a unit as per device installed in each household 58. Typically, data is temporarily uploaded, by a communication adaptor attached to each device or communication means built in the device, on the system manufacturer server 59 managed by, for example, the corresponding manufacturer. A system operator, such as a constructor, may upload data on a cloud system of the system operator in addition to other systems such as a building system, and a HEMS system. In this system, data of each device is uploaded per device with, for example, a device ID or an ID number of an adaptor. When the devices include a room air conditioner (RAC), a water heater (or hot water dispenser, HWD), and a smart meter (SMM), data in each device unit is serially transferred to the cloud.

Data with high data update frequency is frequently uploaded, and data with low data update frequency is uploaded in the form of a data file with low frequency. When devices are installed and constructed for each household 58 and systemized in a system such as a HEMS system, besides data uploaded from the devices, data may be uploaded on the manufacturer cloud with management information including installation and personal information including an individual ID separately input and the devices of each household 58 linked with the household 58 and the individual 56.

Figure 29:
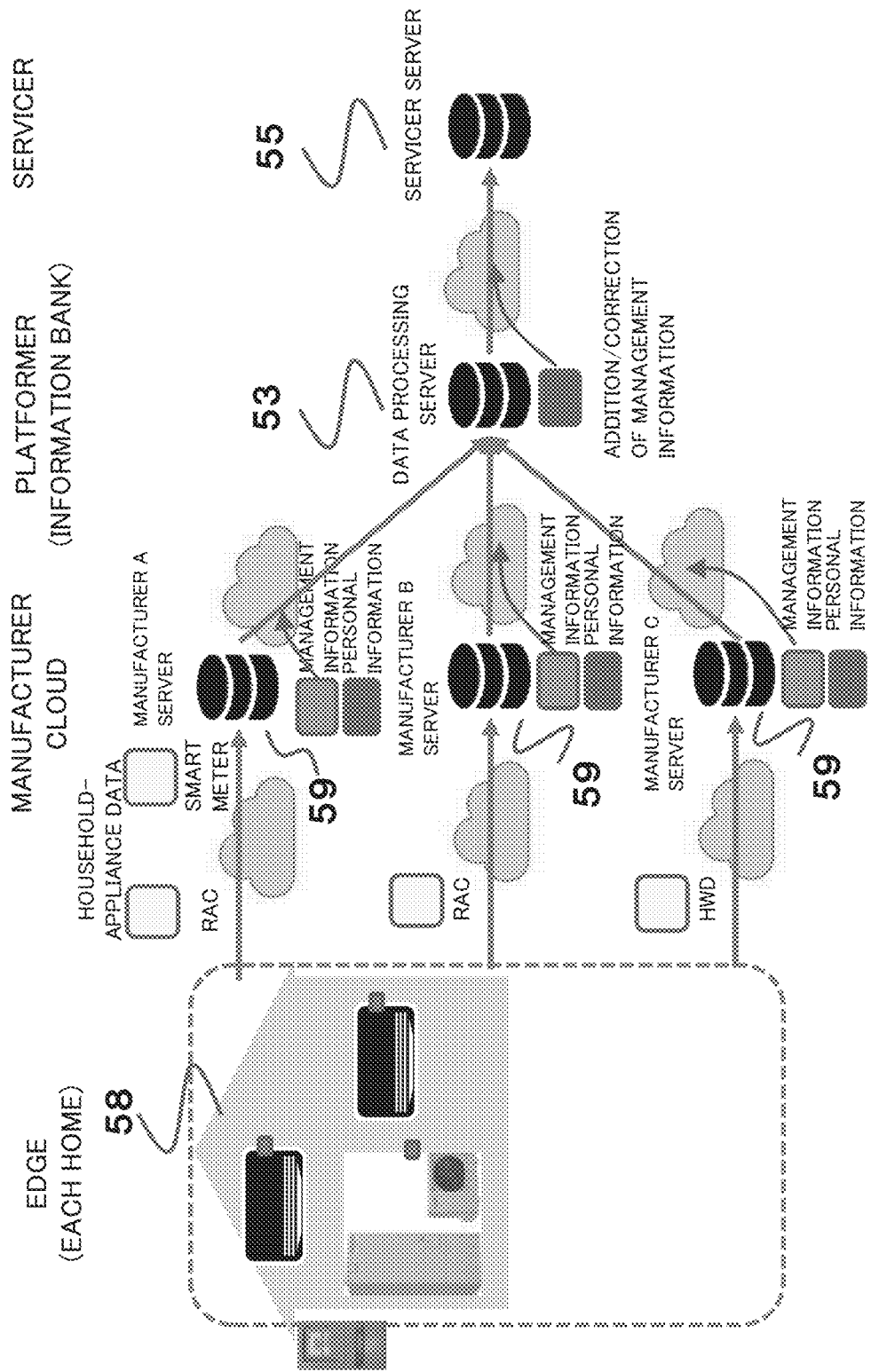
FIG. 29 is a diagram of known information transfer from household appliances to multiple known manufacturers.

FIG. 29 is a diagram of known information transfer from household appliances to multiple manufacturers. In a typical household 58, household appliances manufactured by multiple manufacturers, rather than by a single manufacturer, are installed. In particular, smart household appliances in these years provide the functions of the devices in cooperation with the manufacturer cloud 59 (system manufacturer server 59). In this case, devices manufactured by each manufacturer are connected to the cloud system 59 (system manufacturer server 59) of the manufacturer.

In such a case, data pieces from the devices are temporarily aggregated in a data processing server of the information bank 53 to regulate the data forms of different specifications from different manufacturers, or information used for the service of a servicer 55 is retrieved to implement a data utilization service.

FIG. 30 is a diagram of information output from devices. Each of the devices serially transmits information. Data uploaded from each of the devices (smart household appliances) of each household 58 has, for example, an ID of each adaptor attached to the device, and includes the meaning categorization indicating, for example, whether the data is ON/OFF control information, state information, or setting information, and the details of the data. Data is typically uploaded periodically for each polling or each operation in the form of a data set, reflecting the data uploaded on the cloud from each household 58 via a router, although also relying on the cache memory of the adaptor.

In the example, data 61 is uploaded from a room air conditioner (RAC) and data 62 is uploaded from a water heater (HWD). For a system of connecting to the cloud via a customer-premises controller such as a HEMS system, the customer-premises controller temporarily aggregates data and thus uploads data in a polling cycle determined between the controller and the cloud. For example, a typical system associated with power management collectively uploads data for every 30 minutes.

Figure 31:
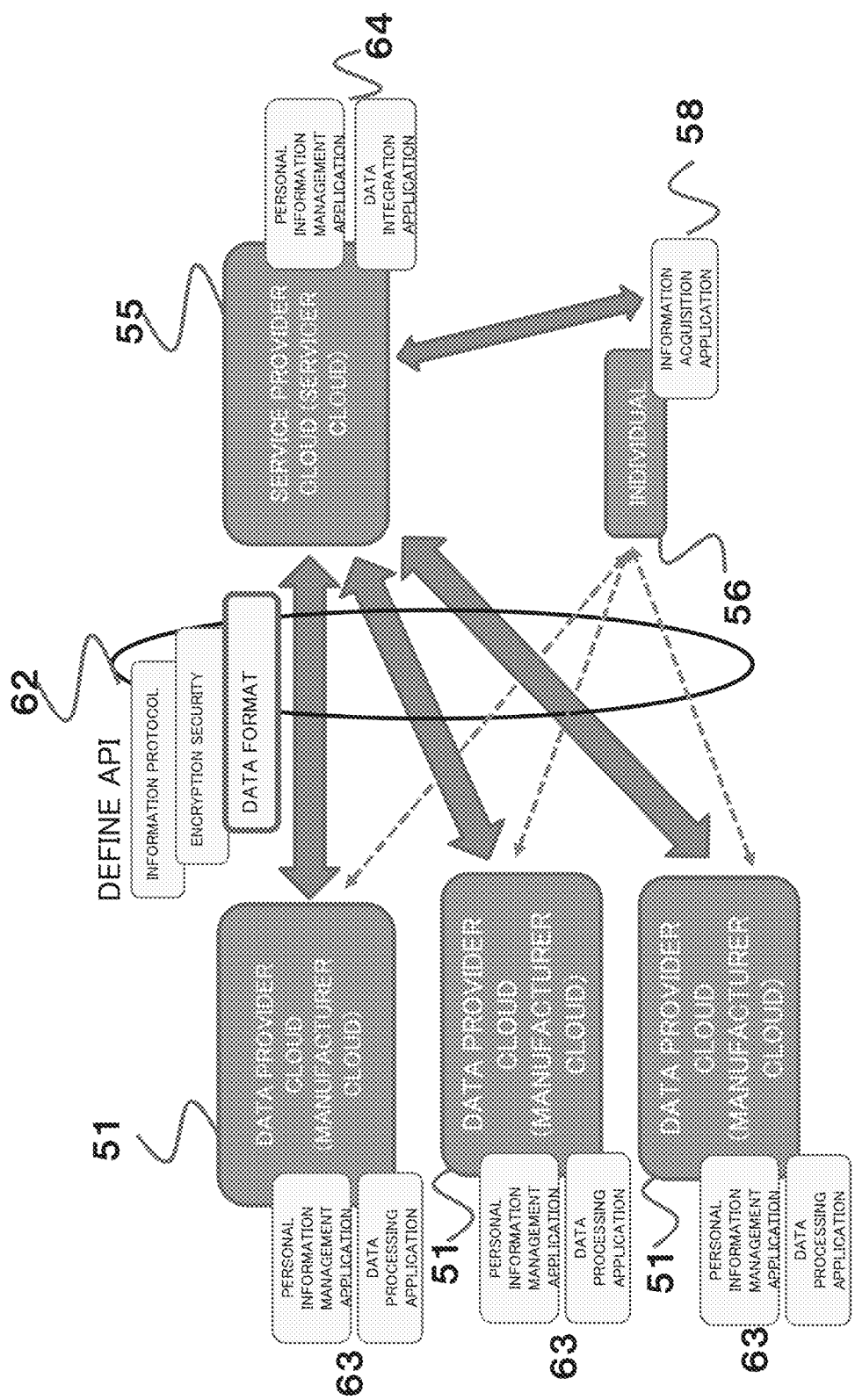
FIG. 31 is a diagram of data circulation between data providers and a servicer.

FIG. 31 is a diagram of data circulation between data providers and a servicer. In the embodiments according to the present disclosure, each data provider 51, such as a manufacturer cloud, directly exchanges data with the servicer 55 to implement an opener data circulation system and to expand the use of a servicer through data circulation. A personal information management application 63 is accredited by certification authorities. The information acquisition application 58 is provided by a servicer together with a service.

In this system, specifically defining an API 62 relating to the data form and data exchange between clouds allows the servicer 55 to receive data with the API 62 in the same form as any of the data providers 55. In this case, standardizing the form of a data catalog, the structure of a data set, a filing form, the encryption scheme, and other details eliminates individual processing of data from different manufacturers for each manufacturer or regulating the difference in format between different manufacturers.

This enables data integration and flexible cataloging with an application 64 on the cloud owned by the servicer 55. In these years, to comply with personal information protection, data of an individual may be browsed or deleted after licensed once. Standardizing the API 62 relating to the data form enables such browsing or deletion through the application of the individual 56. The individual 56 can acquire information through the information acquisition application 58.

Figure 32:
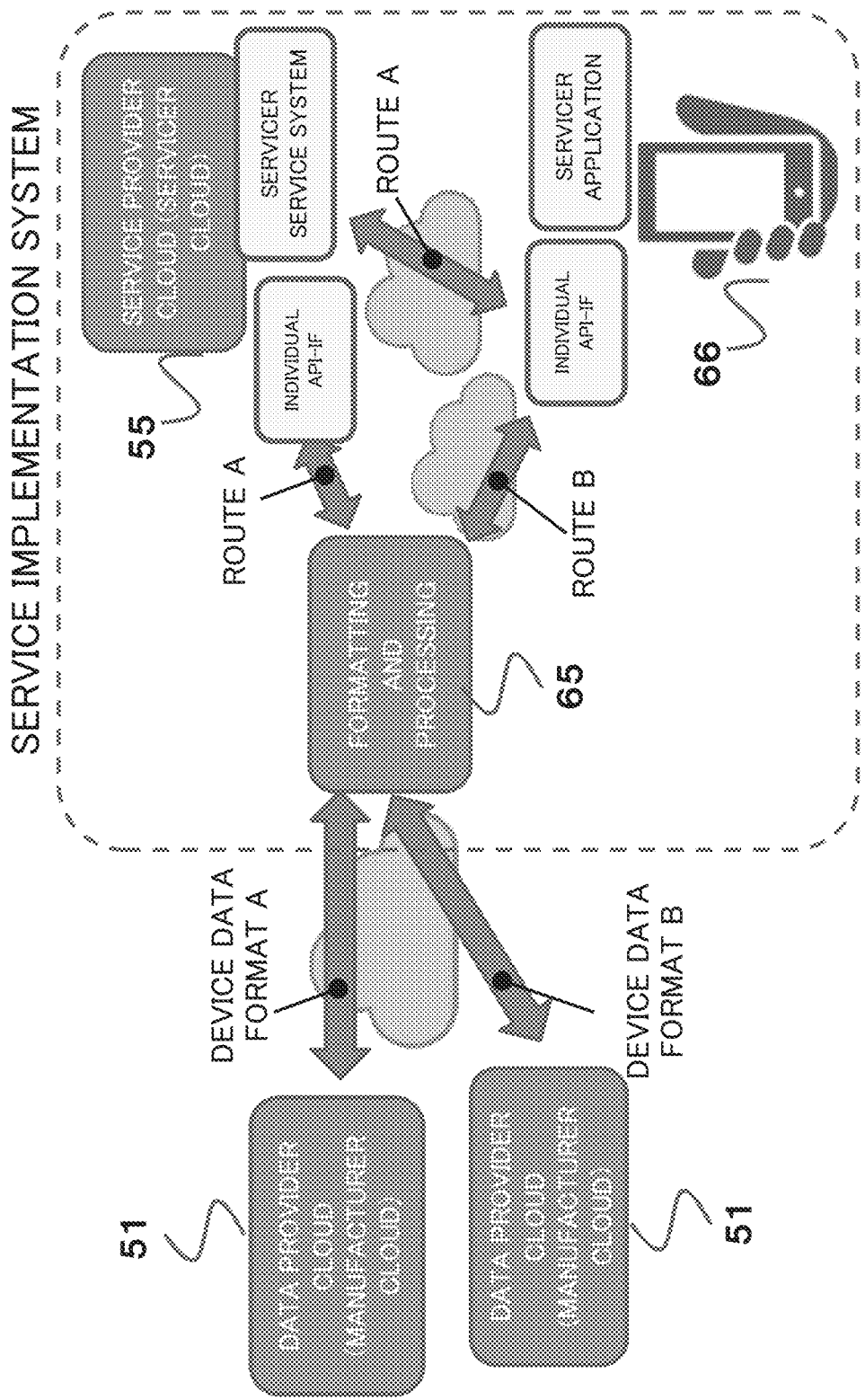
FIG. 32 is a diagram of data distribution during circulation between data providers and a servicer with different data formats.

FIG. 32 is a diagram of data distribution during circulation between data providers 51 and a servicer 55 with different data formats. When data uploaded from the data providers 51 such as manufacturers is not standardized, to implement the service, a preprocessing cloud system 65 is to be used, such as to regulate the data forms from different manufacturers, or to extract or process relevant portions. More specifically, the formatted and processed data is implemented with the application on the cloud that provides a service.

When, for example, the final service is a display operation through the application of a smartphone 66, data to be used may be provided via the service providing cloud 55 (servicer 55) (route A) or may be directly provided to the smartphone 66 (route B). In either case, a formatting system for a data format may be constructed on the cloud system of the servicer 55 or processing may be entrusted to a platformer, such as the information bank 53, to receive a service, and data is to be formatted and processed every time the data provider 51, such as a manufacturer that provides data, is changed. Such processing involves, for example, additional investment and contract negotiations for data exchange with different manufacturers. The additional investment, development, and individual contract preparations block spreading of data circulation.

FIG. 33 is a diagram of an example monitoring service with device information. In a HEMS, the device installed in each room is registered when a HEMS is constructed at the house. When, for example, the constructor that constructs and installs a communication adaptor of each device and a servicer that provides the system are the same operator, the operator can provide a simple monitoring service involving monitoring of ON/OFF of the device with display of a list of the device states based on the floor plan of the house acquired from construction information.

In a service case 67, the states of household appliances at a house are visualized through a tablet display. In another service case 68, the states of household appliances at a house are visualized through a smartphone outside the house.

In these cases, whether a child returns home can be determined in response to turning on of the device that has been off in a child's room, or whether an elderly person at a distant house lives as ordinarily can be monitored throughthe operation states of devices. Currently, such a system can be easily implemented when the provider of smart household appliances and the installation constructor are the same operator with the IDs connectable within the same cloud. However, when the operators are different, actual services may not be provided unless, for example, an ID connection system is constructed based on the contracts between the operators.

Figure 34:
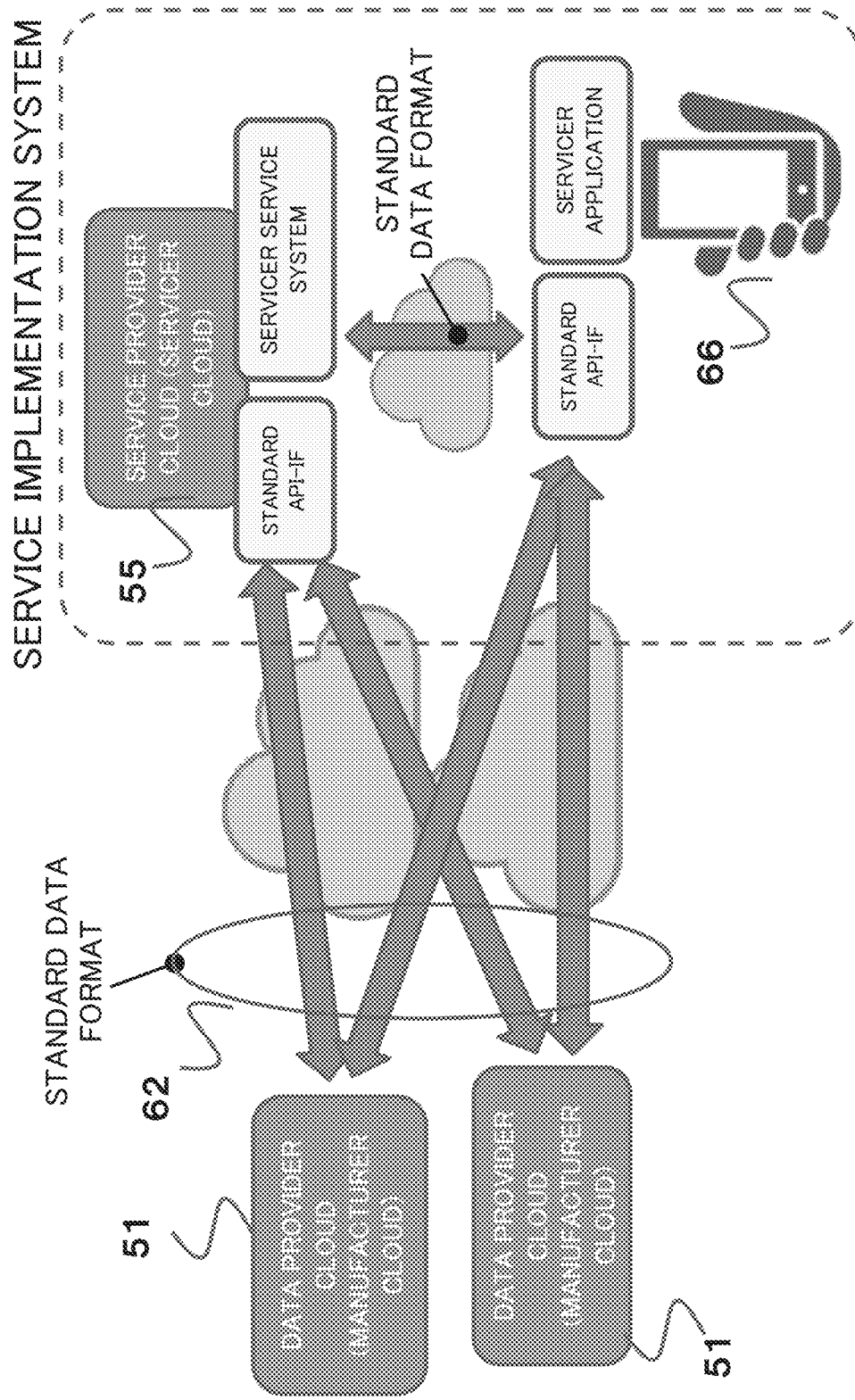
FIG. 34 is a diagram of distribution in a standard data format.

FIG. 34 is a diagram of distribution of circulation data in a standard data format. When the API 62 relating to the data format is standardized, and an API-interface (IF) for standard data exchange is constructed at the entrance of the cloud system of the servicer 55, a service system can be ready to be constructed irrespectively of the manufacturer of data that conforms to the standardization form. Data with a relatively large quantity may be temporarily accumulated and processed at the servicer cloud, and then the servicer cloud may be connected to the servicer application such as the smartphone application 66. Instead, for data with a quantity processible by a smartphone, the smartphone application 66 and the data provider 51 such as a manufacturer cloud can directly interface with each other. As in the data format, the standard API-IF on the cloud or the smartphone are versatile. Thus, a smartphone operator and a cloud operator may prepare the API 62 on the cloud or the smartphone as standard middleware.

These data provision forms include (1) providing data alone, (2) the application of the servicer 55 retrieving (browsing) data as appropriate, and (3) data provided and retrieved (browsed) as appropriate after the data is provided. For example, for a smartphone with memory limitation, particularly, the servicer 55 may avoid holding data.

Expanding the data circulation market involves increasing the efficiency of a service system through the above standard measures, and direct data exchange between the data providers 51 and the servicer 55. This facilitates construction of a business model relating to data trading.

Figure 35:
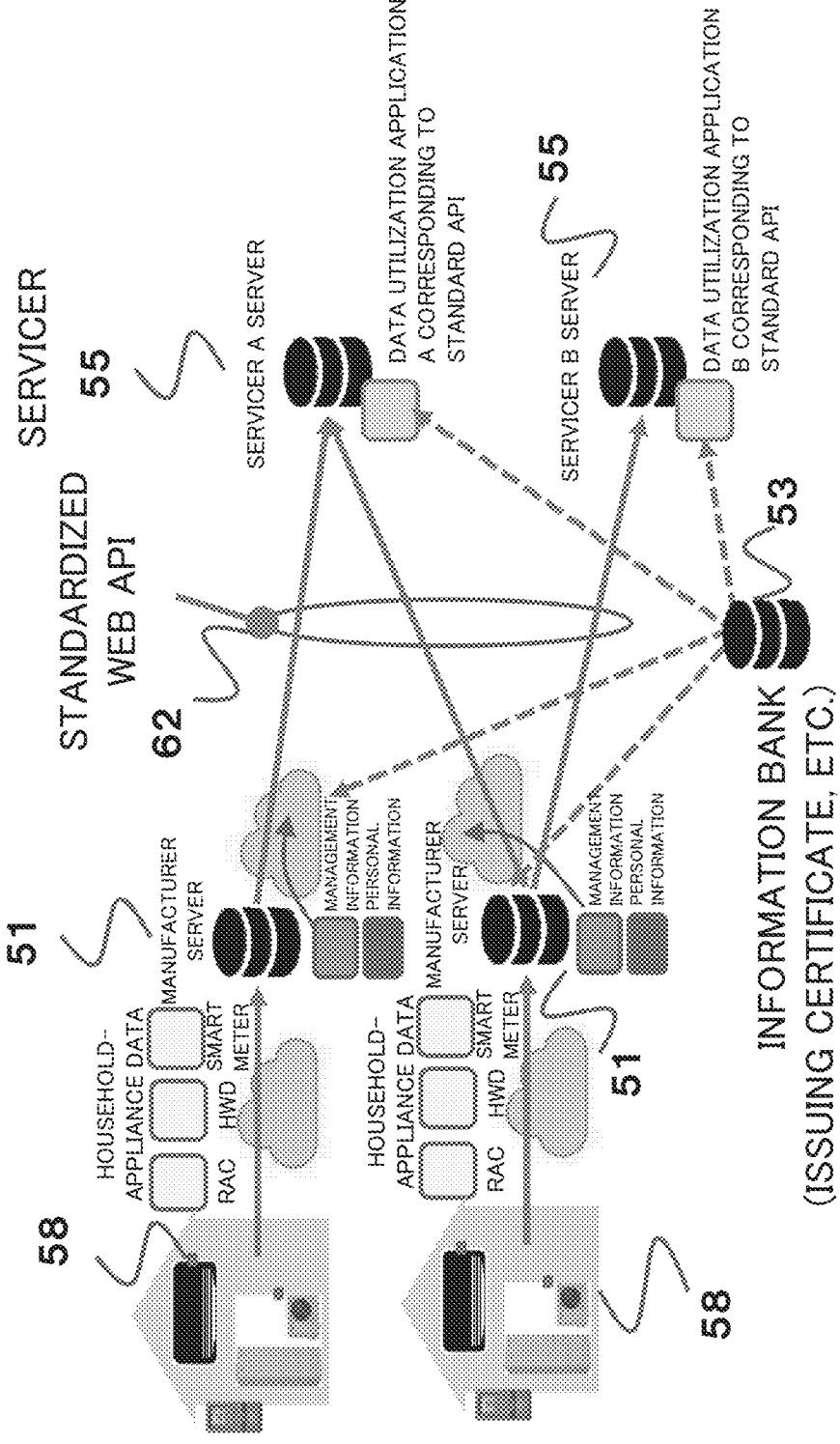
FIG. 35 is a diagram of a data flow in direct information transfer between manufacturers and servicers.

FIG. 35 is a diagram of a data flow in direct information transfer between manufacturers and servicers. When the devices are connected to the clouds of the respective data providers 51 such as device manufacturers, or when multiple system manufacturers are present, standardizing IoT data output from the devices with the web API 62 (API 62) enables individual circulation of data used on an inter-cloud cooperation system. The information bank 53 can also provide certificates and a data utilization IF application to the manufacturer data or the servicer. The standardized web API 62 defines a data, structure described later, a data exchange protocol including supplementary information, the meaning of labeling in the data catalog, and information about any hierarchical structure of data. Thus, data can be processed with a standard IF application held by the servicer 55. In contrast, when the web API 62 relating to the format is unclear, the application IF of the servicer 55 is to individually form the format, and each servicer 55 is to individually develop the application IF. This may prevent exceptional description, and limit the service details or manufacturers from which data is acquired. The standardized web API may thus clarify the definitions, and prepare definitions for exceptional description.

Figure 36:
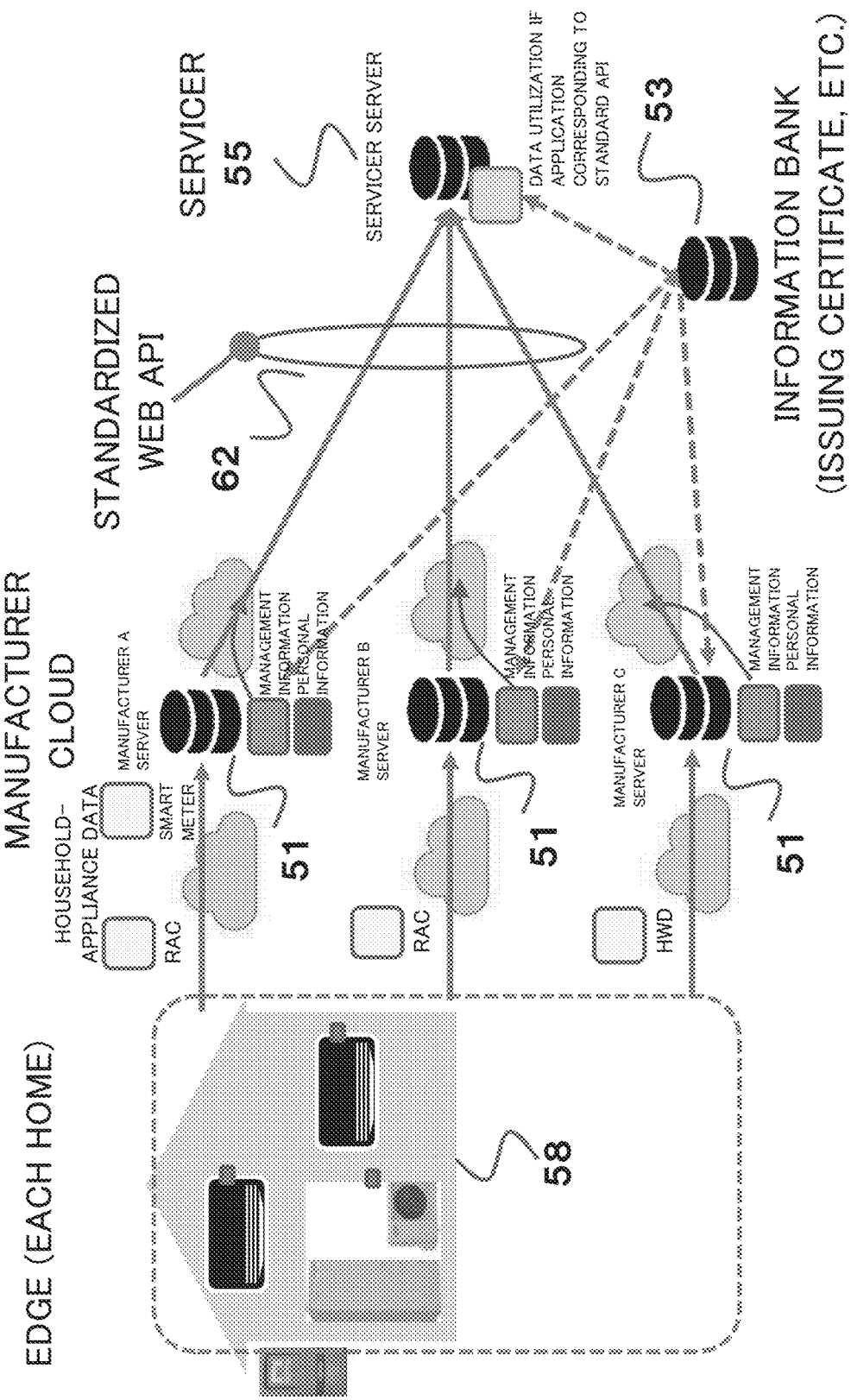
FIG. 36 is a diagram of information transfer with Web API with multiple manufacturers.

FIG. 36 is a diagram of information transfer with the web API 62 with multiple manufacturers. Also, when devices manufactured by multiple manufacturers are located in one household 58, standardizing data with the web API 62 enables acquisition of manufacturer information within the applications of the servicers 55 to provide a service. In particular, different manufacturers may have different manufacturer clouds 51, and the IF application of the servicer 55 retrieves data from individual manufacturers. When the definition of the web API 62 differs between the manufacturers, the application of each servicer 55 may misinterpret data or fail to operate. Thus, the definition between the manufacturers is to be uniformed.

Figure 37:
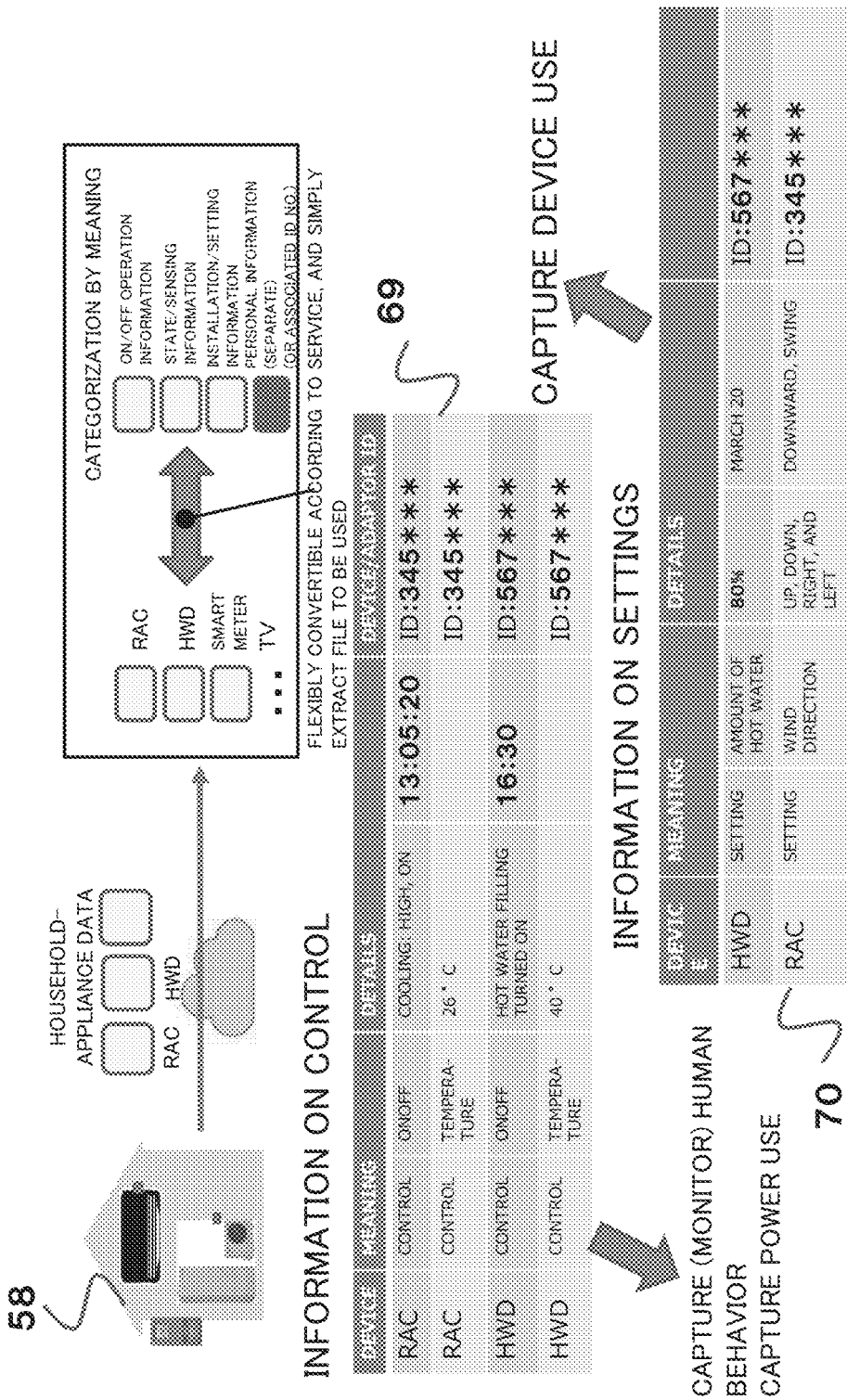
FIG. 37 is a diagram of data categorized by meaning.

FIG. 37 is a diagram of data categorized by meaning. In each data provider 51 such as a manufacturer cloud, IoT data uploaded for each device may be converted to data pieces for each meaning to be easily usable by the servicers 55. Data 69 uploaded by each device includes a combination of the meaning information (control or settings) and more detailed meaning information (ON/OFF, temperature, amount of hot water, or wind direction), and is to be stored in a manner convertible by each device and by each meaning. A cataloged data 70 lists examples of cataloged data, which is a collection of data relating to the settings.

Figure 38:
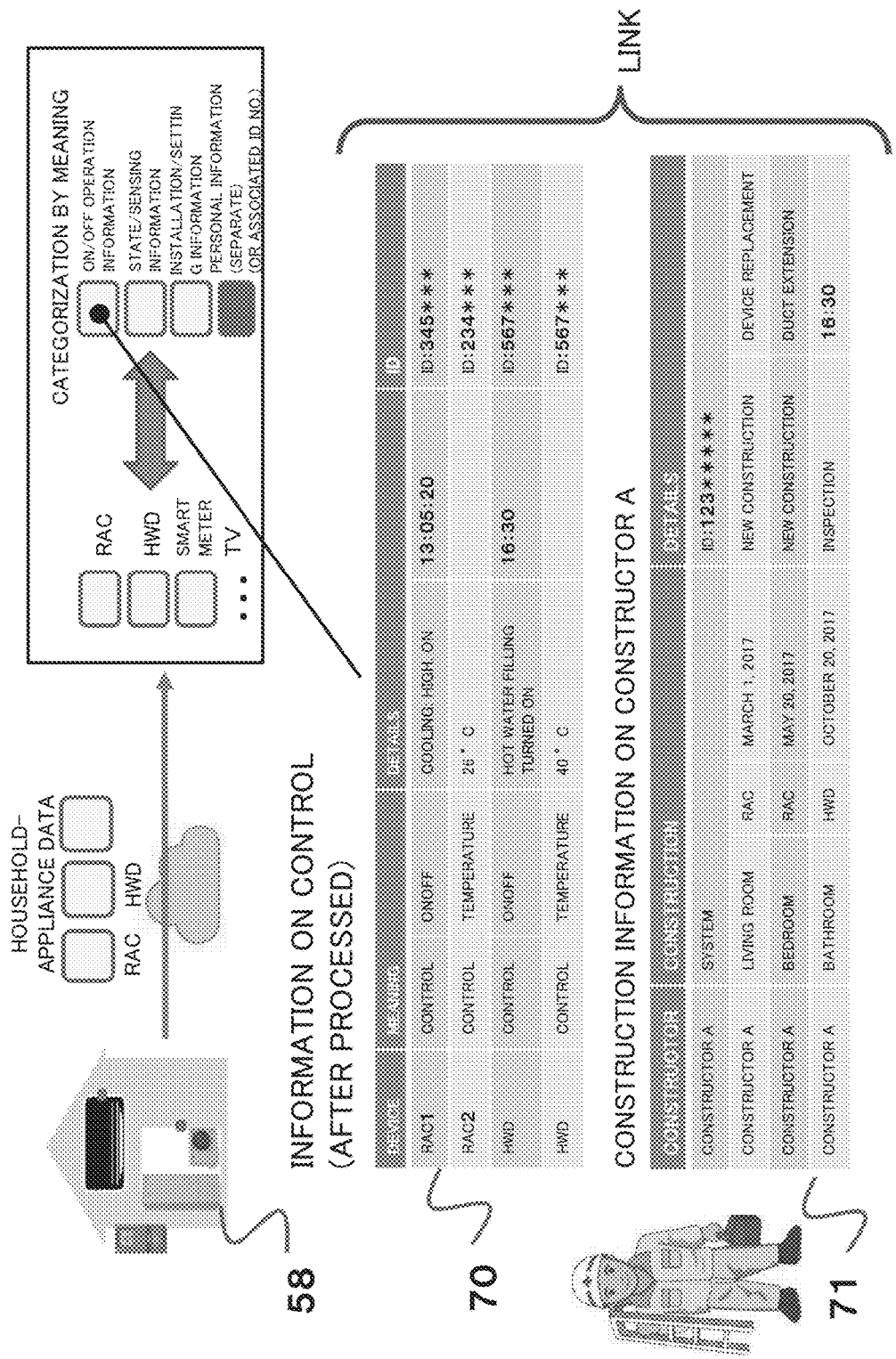
FIG. 38 is a diagram of data with values added by being linked with different information.

FIG. 38 is a diagram of data with values added by being linked with different information. For example, linking data uploaded from each device with data 71 from a constructor clarifies information such as a specific position in the household 58 at which a device in the household 58 is installed or the date when the device is constructed. This enables a monitoring service of monitoring the operation states of devices individually installed on the floor plan of the household 58, or a maintenance service or preventive maintenance through monitoring a device that has exceeded its service life and linking the construction date with error information from the device.

Although the device provision manufacturer and the construction operator are different operators, this mechanism enables provision of new services including monitoring relating to a simple monitoring service shown in FIG. 33 by setting up a link of data, without being restricted to the same operator.

Figure 39:
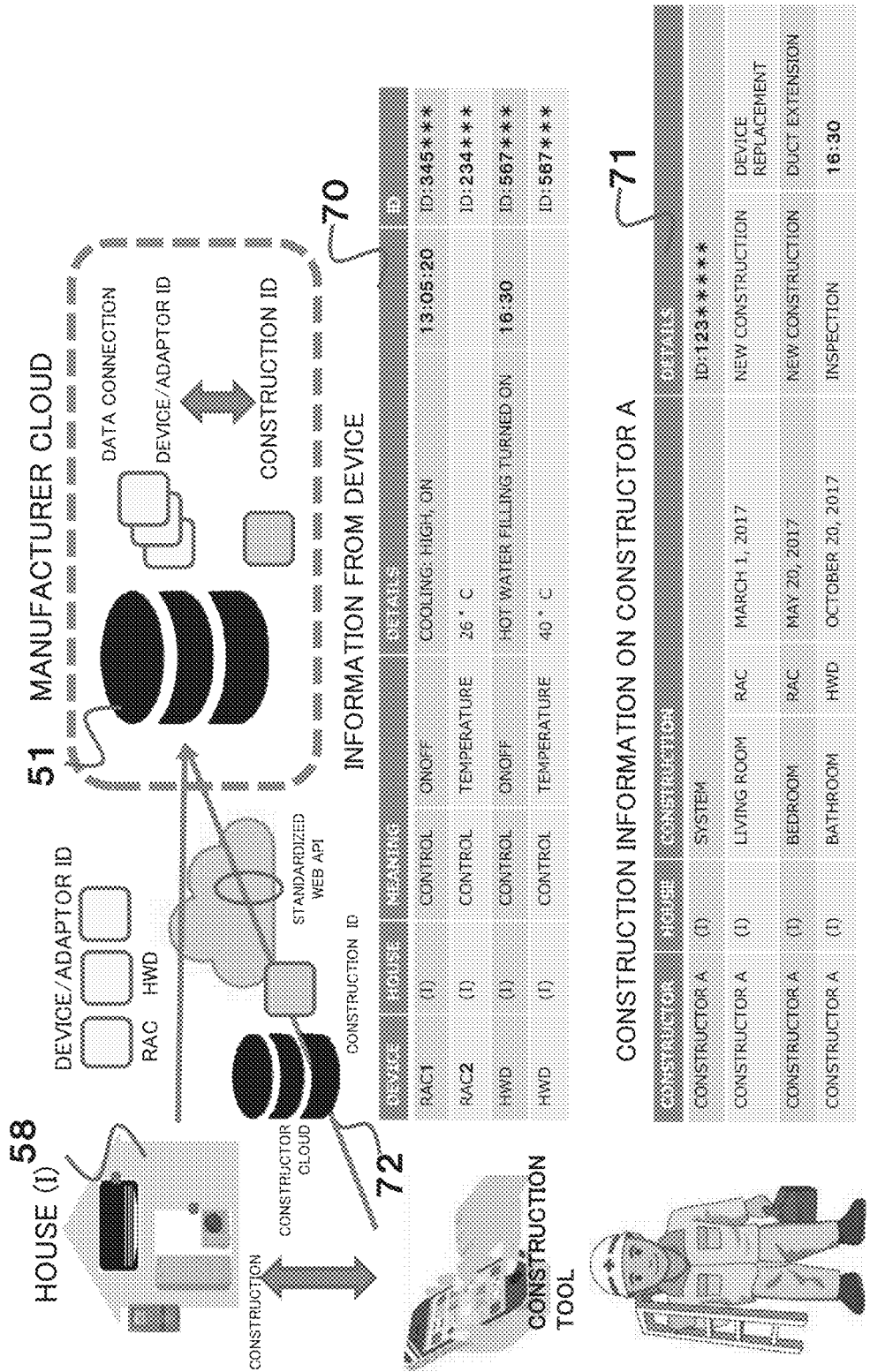
FIG. 39 is a diagram of example data with values added by being linked with different information.

FIG. 39 is a diagram of example data with values added by being linked with different information. Actually, a constructor may include a management cloud system 72 (constructor cloud 72). A link system can be formed by connecting the constructor cloud 72 with the data provider 51 such as a manufacturer cloud via the same standardized web API 62 and by linking the construction ID of the constructor with the device ID of the manufacturer. In particular, a house is highly likely to be constructed with multiple constructors instead of a single constructor. When the data provider 51 and the constructor cloud 72 are connected via the standard web API 62, and data includes link information for each household 58, the data can be provided to the servicer 55. For example, a monitoring service can be provided as in FIG. 38.

Figure 40:
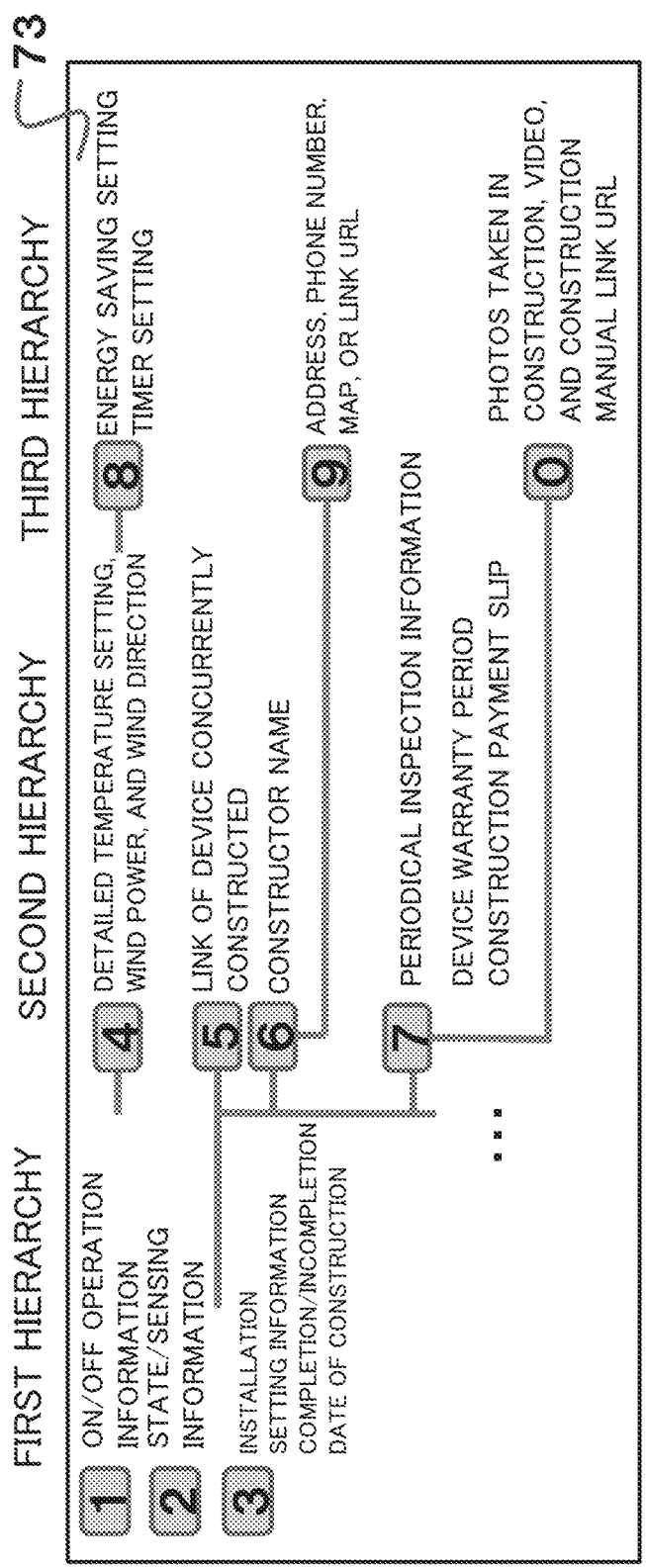
FIG. 40 is a diagram of hierarchization based on data depth.

FIG. 40 is a diagram of hierarchization based on data depth. When cataloged, data uploaded by each device and data including construction information can be described with a hierarchical structure. For example, as in the data structure shown in a hierarchical structure 73, control information includes basic information such as ON/OFF temperature settings, additional information such as detailed temperature settings, wind direction, or wind power, and information with different specifications that vary by each manufacturer, such as timer settings or energy saving settings. Hierarchically describing information pieces enables categorization between information pieces sharable between the manufacturers or typically used by users and information pieces differing by each manufacturer. Construction information can be similarly categorized between basic information such as the construction date or the completion date and detailed information that differs by each constructor such as periodical inspection, a warranty period, or photos taken in construction.

For example, in an actual monitoring case, categorization can be implemented with information about a first hierarchy alone. Thus, a first hierarchy information set may be simply transferred to a servicer without transferring the entire information.

The hierarchical structure 73 is defined in, for example, the following procedure.

Data hierarchization is defined in advance based on the data details recalled from the typical language meaning. Data is cataloged from the general definitions.

Data depth in control of household appliances
ON/OFF of device
(data relating to basic settings of device) temperature settings, wind power, and wind direction
(data relating to additional unctions of device) energy saving, and timer settings
Data depth in installation construction
Construction date and time and completion/incompletion device concurrently constructed, constructor name, periodical inspection information, device warranty period, and construction payment slip
constructor address, phone number, map, link uniform resource locator URL), photos taken during construction, video, and manual The hierarchical structure 73 is constructed in this manner.

Figure 41:
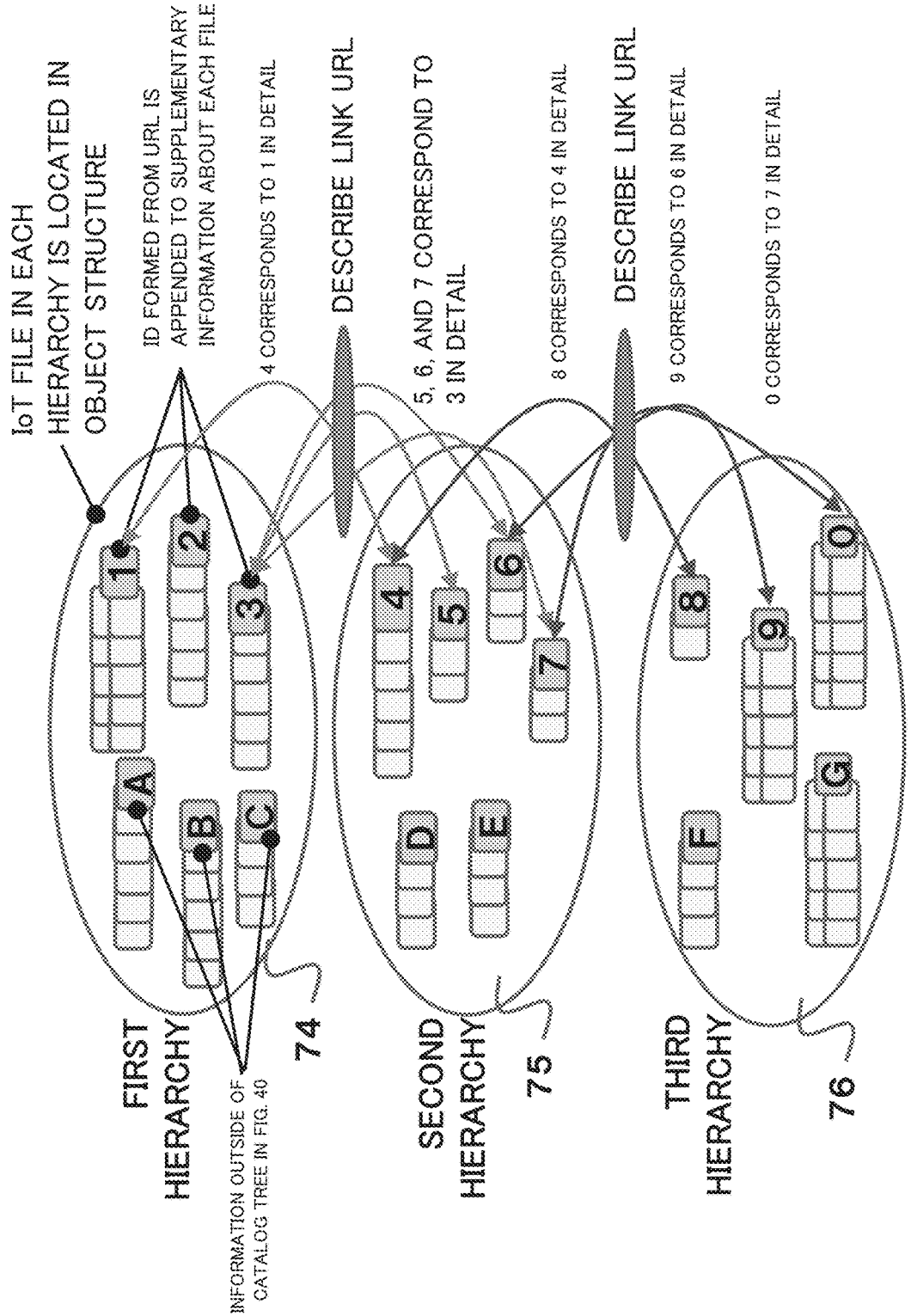
FIG. 41 is a diagram of an example hierarchization structure on a cloud server.

FIG. 41 is a diagram of an example hierarchization structure on a cloud server. In a typical public cloud, a data set with an ID defined with a URL is located in a server system storing data in an object structure.

When these pieces of data are described in the hierarchical structure 73, hierarchies to which each piece of data is to be categorized is basically defined by use frequency and information quantity (including images). In a typical server system, data is also typically filed between multiple options including a server system with no or a small cost per access, a server system with a cost per access and a large cost per unit of data capacity, and a server system in between these systems. According to the definition of this data hierarchy structure, data storage destinations of the respective cloud systems are set.

Data is separately filed in the different server systems. Thus, data file links between the hierarchies are to be set up. A IJRL serves as an ID. Thus, supplementary information in the data file is to include description of a link URL.

Figure 42:
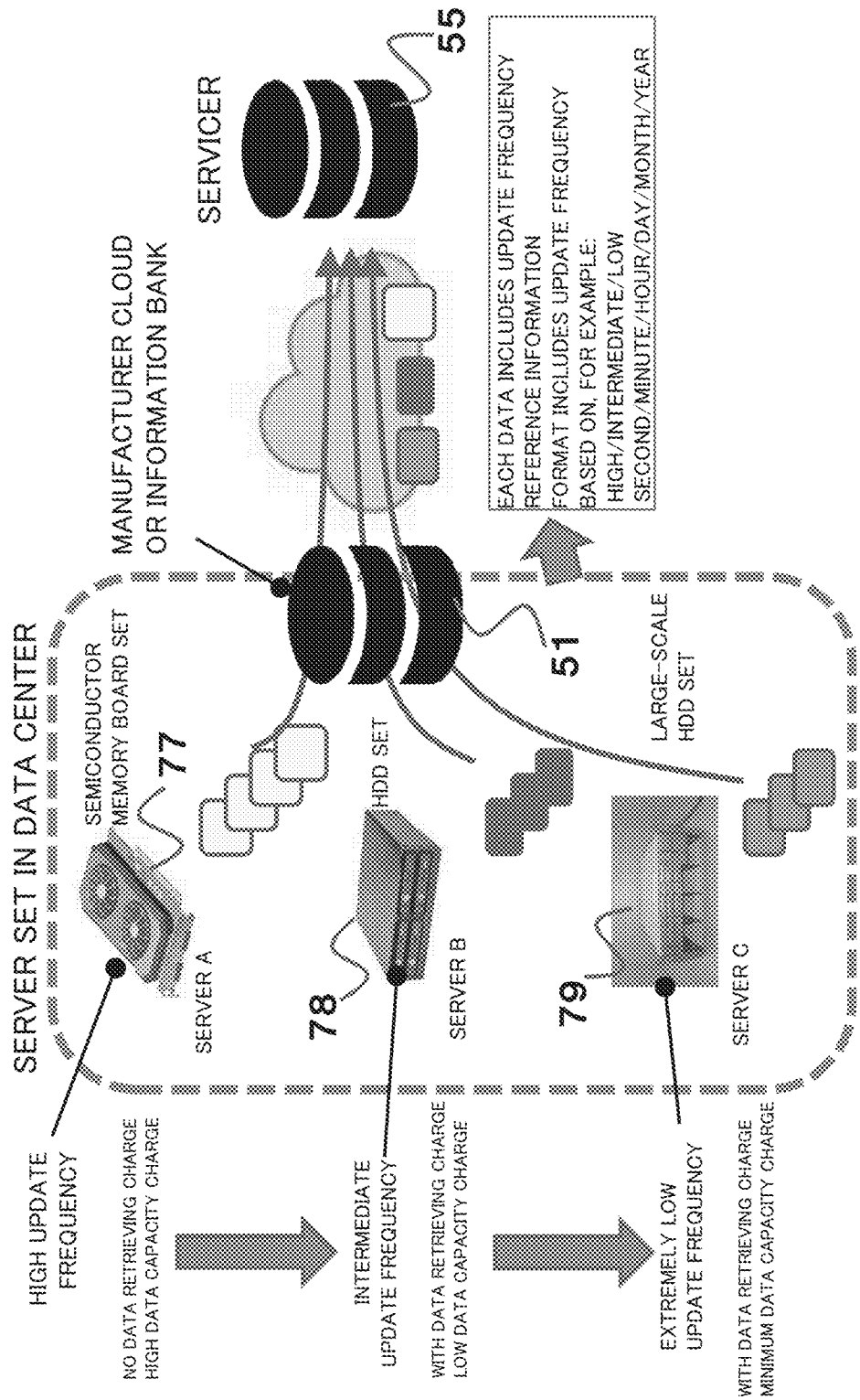
FIG. 42 is a diagram of data hierarchization reflecting server characteristics.

FIG. 42 is a diagram of data hierarchization reflecting server characteristics. The clouds of the servicer 55 and the data provider 51 such as a manufacturer cloud are to include a server system for storing IoT data. A typical public cloud includes any of server systems that vary in characteristics, including a server system with no or a small cost per access but with a large cost per unit of data capacity, a server system with a cost per access and a small cost per unit of data capacity, and a server system in between these systems.

Such variation may result from variation in the hardware of the server system, including hardware formed from a semiconductor memory 77 with a low access cost and a small capacity, and hardware formed from hard disks 78 and 79 with a large capacity and a low file hit rate.

Thus, an IoT system handling large-scale big data is to minimize the data file cost. The system may automatically set the file destination of the server based on hierarchization definition information determined with, for example, data access frequency. The same applies to the cloud of the servicer 55, which is a data user, besides the data provider 51 including a manufacturer. To eliminate the individual design and construction of an optimum server system for each servicer 55 and each data provider 51 such as a manufacturer, the hierarchical structure is defined in advance with the standardized web API 62 to allow the standard cloud application to handle filing. With the cloud application, the servicer 55 performs optimum arrangement of data in the cloud of the servicer 55 with reference to an update frequency standard of a data distributor.

When data is constructed into a hierarchical structure, information with high update frequency (no charge per access) is located at the highest, and information with low update frequency (small number of access) is located in the lower hierarchy. For example, a server A shown in FIG. 42 stores data updated per minute, hour, or day and data with the data quantity increased or decreased, a server B stores data updated per month or year, and a server C stores data not updated or updated with extremely low update frequency. Old pieces of data that have been originally stored in the server A are likely to reduce update frequency, and may be moved to the server B after undergoing deletion of data indicating seconds and minutes. Similarly, old pieces of data that have been originally stored in the server B may be moved to the server C after undergoing deletion of data indicating hours in addition to seconds and minutes.

Figure 43:
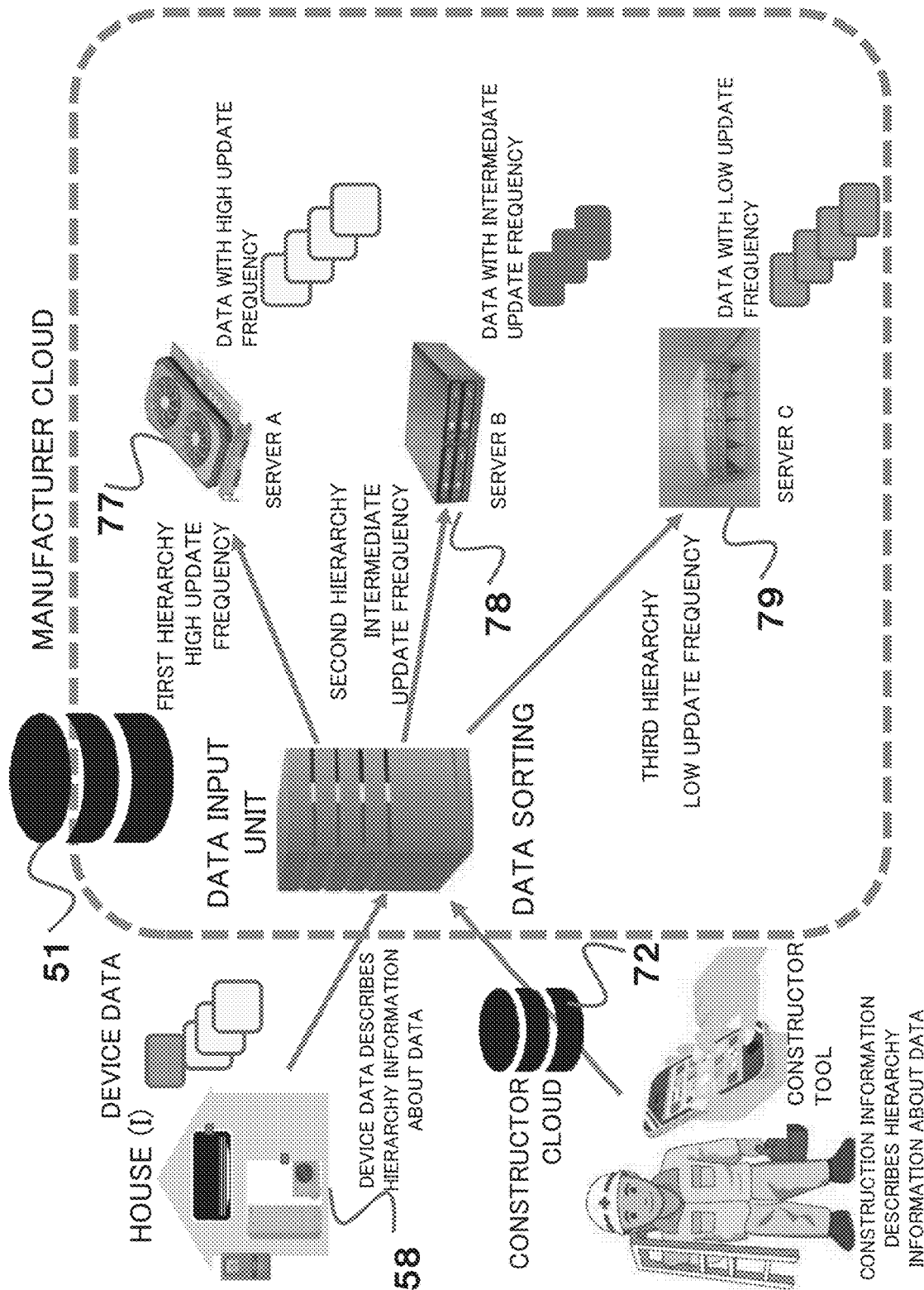
FIG. 43 is a diagram of hierarchization based on the server characteristics and data depth.

FIG. 43 is a diagram of hierarchization based on the server characteristics and data depth. Also, when data is located on both the constructor cloud 72 and the data provider cloud 51 such as a manufacturer, the hierarchical structure is also defined with the standard form to redefine a data set uploaded from the device by meaning to sort the data set to be handleable by the standard web API. Thus, the server system to which each data piece is to be sorted is automatically determined. This eliminates development every time.

To define a new catalog, describing a hierarchy in the hierarchical structure and information relating to update frequency in the new catalog enables automatic sorting of subsequent data.

In an IoT big data system, massive amounts of data are to be sorted efficiently. History information such as operation history or temperature sensor history is accumulated year by year. Such massive amounts of data are to be stored efficiently and managed at optimum costs. Data is thus to be classified by reflecting such server characteristics.

For example, examples of data with high update frequency include, as frequently updated data or data increase/decrease information (data updated per minute, hour, or day, or data with data quantity increased or decreased), energy management information, sensor information, operation history information, life activity history, and a call center operation.

Examples of data with intermediate update frequency (data updated per month or year) include a holiday/workday calendar, a commuting route, a lesson/gym contract, a credit card contract, an interne registration contract, and processed old information.

Examples of information with low update frequency (one-time data) include the construction details, information about the constructor (address or operation details), construction images, the address of the house, and a purchased product number.

To catalog these pieces of data, rough division is defined as update frequency standard in accordance with the catalog categorization. Thus, the storage hierarchy in which each piece of data is to be filed can be automatically determined.

Figure 44:
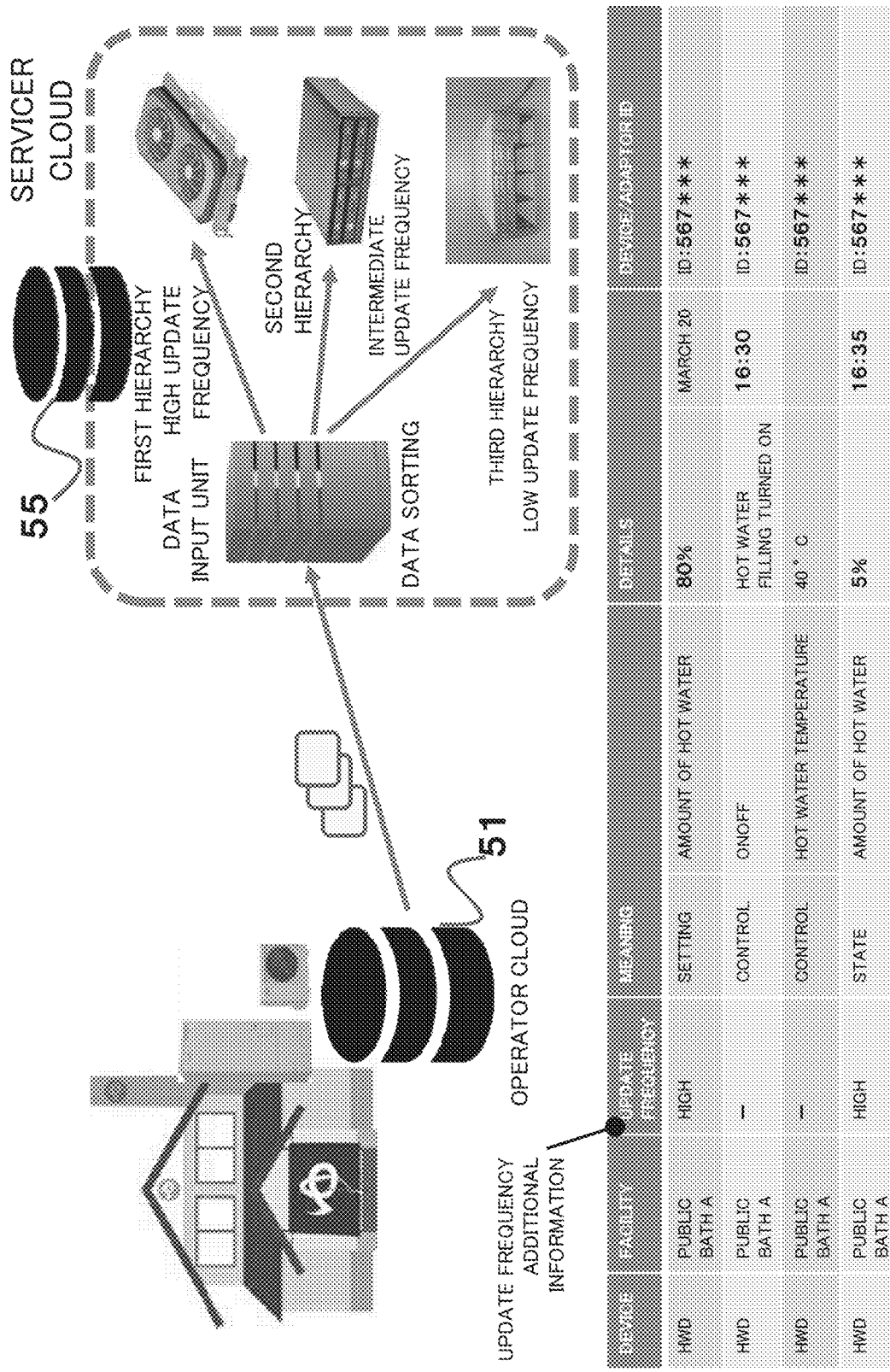
FIG. 44 is a diagram of an example exception application of update frequency information.

FIG. 44 is a diagram of an example exception application of update frequency information. This is an example of a public bath. A servicer cloud that manages a public bath chain also manages data in accordance with the hierarchical structure. In a typical house, neither the bath settings nor the amount of hot water is frequently changed. However, in the bath business such as a public bath, unlike bath management at a typical individual house, the settings are to be individually changed depending on everyday situations, and, for example, the amount of hot water is frequently changed. Thus, although the amount of hot water is described on the second hierarchy in the standard API, the amount of hot water is exceptionally described on the hierarchy for high update frequency. Thus, the entire management of the amount of hot water with the service system that manages the public bath chain can optimize the data storage cost.

Update frequency information 80a is thus added as a data format 80 uploaded from the data provider (bath operator), and the servicer 55 automatically and optimally sorts data based on the frequency information in the data storage in the cloud system of the servicer 55.

An optimum server arrangement varies depending on the update frequency of original data on the operator cloud 51. Thus, the data provider 51 appends the data update frequency standard to data and distributes the data. When an operator intends to change the hierarchy of data from the hierarchical structure of the data catalog defined by the standard, anew piece of update frequency information is described. The update frequency information is assigned priority.

Thus, data with a meaning deviating from the meaning defined in the cataloged wording can be treated as exceptional by referring to the data details. For supplementary information and comprehensive supplementary information described later, a flag indicating whether data is treated as exceptional may be prepared. The flag that is on can be used to check update frequency information and determine the hierarchy of the storage server.

Figure 45:
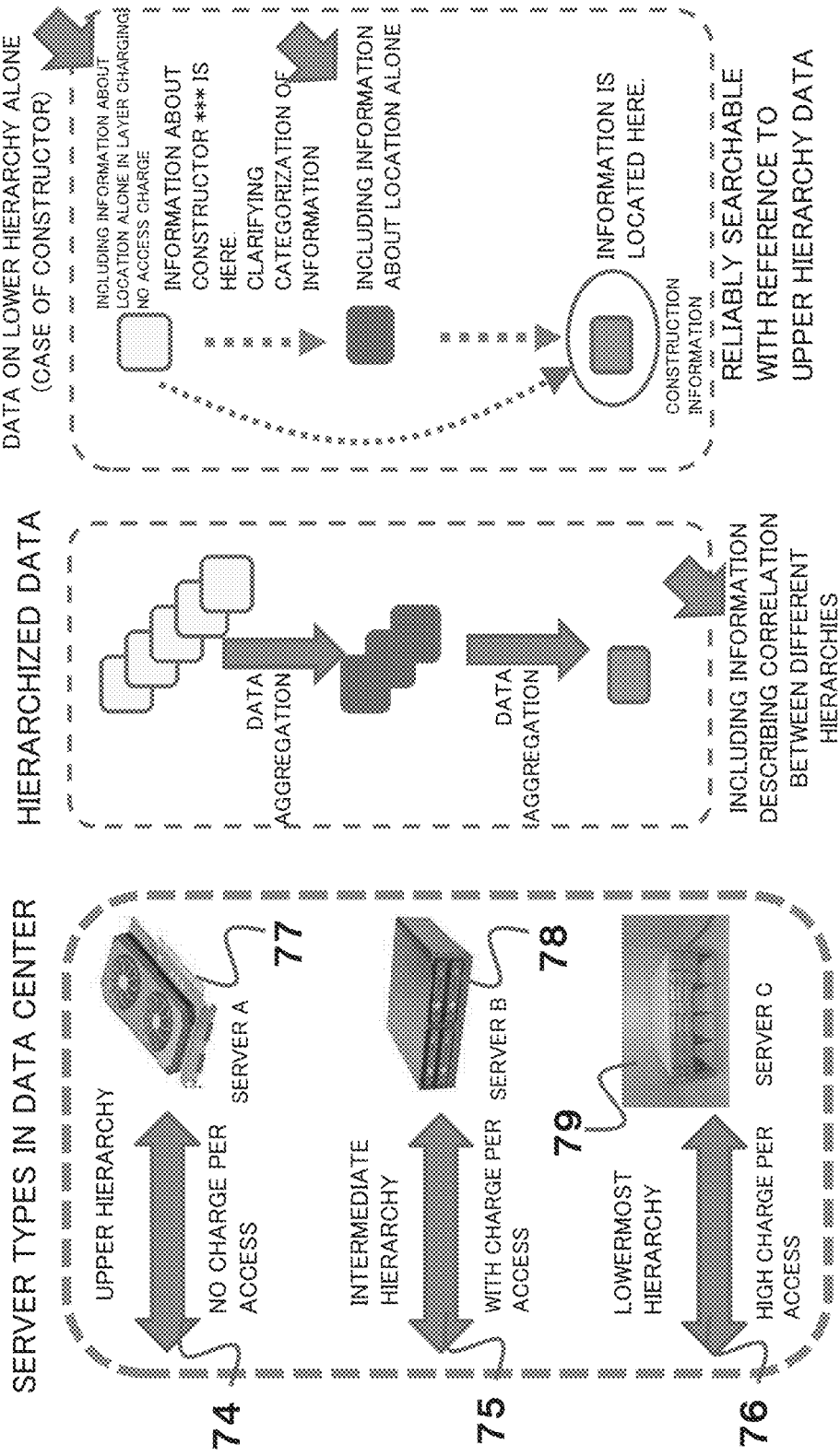
FIG. 45 is a diagram of a link in data hierarchies.

FIG. 45 is a diagram of a link in the data hierarchies. IoT data may include a single independent piece of information simply on a second hierarchy 75 or a third hierarchy 76. For example, when information about an additional constructor available in the future is described on a product of a specific manufacturer, or when information about the third hierarchy such as a constructor address, contact information, or a map is simply retained, a first hierarchy 74 that is frequently accessed may have description of information retained on the lower hierarchies although the information is stored in the lower hierarchy of the server system that is charged for access.

More specifically, frequently accessed data is stored in the upper hierarchy. Thus, when real data is stored in a lower hierarchy alone, information about the data in the linked lower hierarchy is described in the corresponding upper hierarchy.

For example, the first hierarchy 74 is constantly accessed. Thus, when the first hierarchy 74 simply includes arrangement information about information stored in the hierarchical structure, and data is retrieved from the lower hierarchies after the data is determined as necessary, the server access costs can be constantly optimized.

For supplementary information and comprehensive supplementary information described later, a flag indicating whether data includes arrangement information alone may be prepared. The flag that is on enables acquiring of lower hierarchy data when actual IoT data is to be used. The access to the uppermost hierarchy is charged minimum, and thus the entire costs can be reduced.

FIG. 46 is a pattern list of data storage examples. An example 81 is for a public cloud having multiple fee plans.

Such a typical cloud offers fee plans for highly frequent access, less frequent access, and access with intermediate frequency. The fee plan for less frequent access typically has a low storage bit rate.

Figure 47:
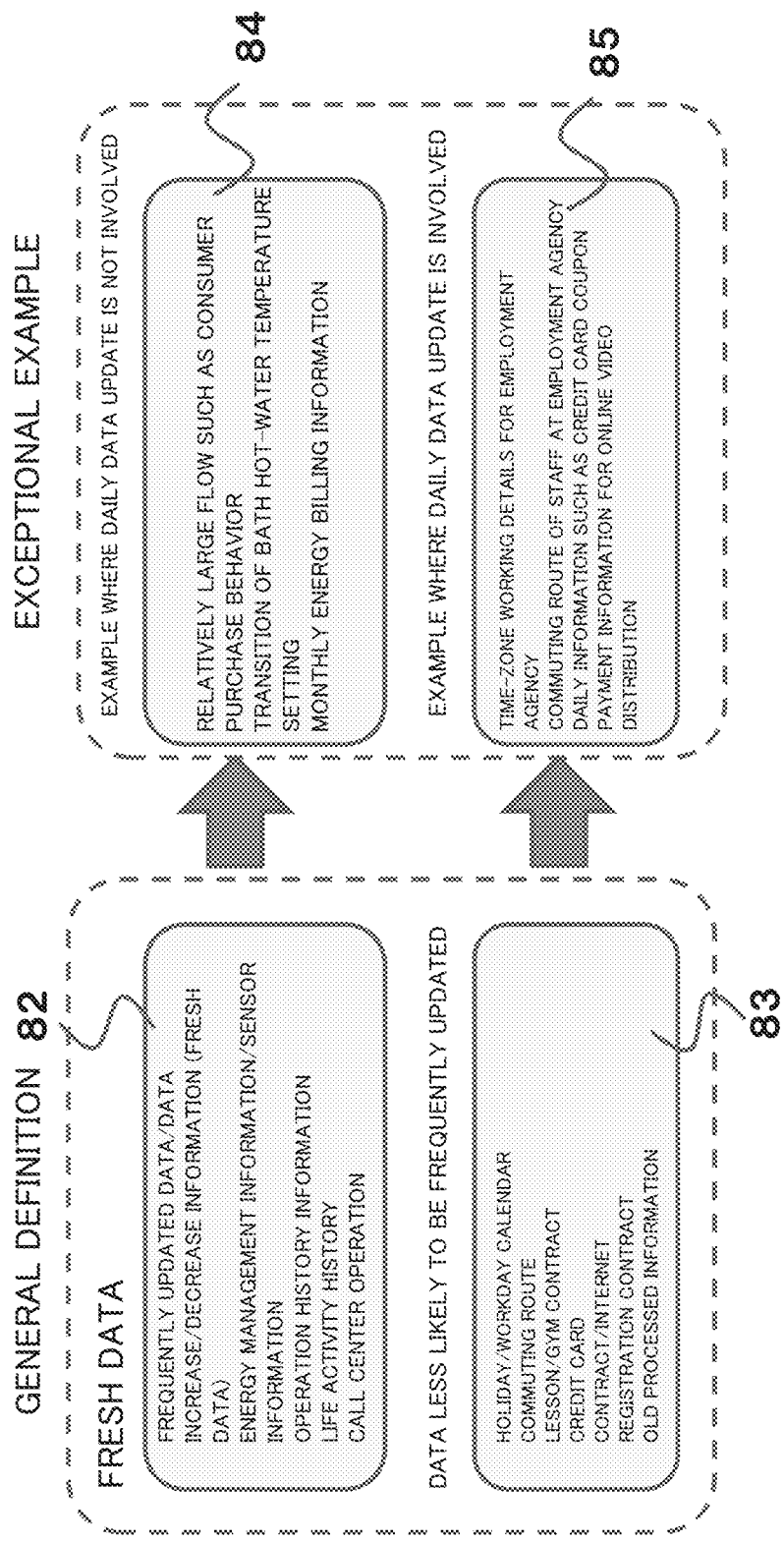
FIG. 47 is a diagram of description of update frequency information.

FIG. 47 is a diagram of description of update frequency information. For data hierarchization, the location in the hierarchical structure where data is to be located may be defined first based on each item in the catalog, and selection of the server system may also be automized.

When a servicer examines a new service, the servicer recognizes or images, with the catalog details (wording definition), that information is, for example, frequently updated or accessed first hierarchy information. The servicer can thus easily create or design the new service.

Further, although each update frequency may be numerically described, creating a service is difficult while individually checking the frequency values described in all the columns in a catalog.

A fresh frequently updated data example 82 includes energy management information, sensor information, operation history information, life activity history, and a call center operation. A data example 83 less likely to be frequently updated includes a holiday/workday calendar, a commuting route, a lesson/gym contract, a credit card contract, an internet registration contract, and old processed information.

In contrast, an exceptional example 84 without daily data update but with originally fresh data to be information used by a servicer includes a relatively large flow such as consumer purchase behavior, transition of bath hot-water temperature setting, and monthly energy billing information. An exceptional example 85 usually less frequently updated but having daily update includes daily information, such as time-zone working details for an employment agency, a commuting route of staff at an employment agency, and a credit card coupon, and payment information for online video distribution, As described above, IoT data uploaded from a manufacturer or a system operator includes exceptional data that deviates from the hierarchical structure defined by the standard API. This is because necessary update frequency varies depending on operators (generation operators) that generate data, with an exception for each operator irrespective of definition of the standard catalog format.

More specifically, necessary update frequency varies depending on operators (generation operators) that generate data, thus with an exception for each operator irrespective of definition of the standard catalog format.

This regulation depends on the business form of the data generators (such as manufacturers), and the data generation frequency and accuracy are determined by a data generator. The update frequency information is thus determined and described by the data generator. Update frequency information is added to cover an exception.

For example, holiday/workday calendar of a company is typically updated once a year. However, the calendar is changed daily for an employment agency. The calendar may also be changed based on a consultation (contract) between the servicer 55 and the data generator 51. The data provider may reprocess data based on the needs of the servicer.

Figure 48:
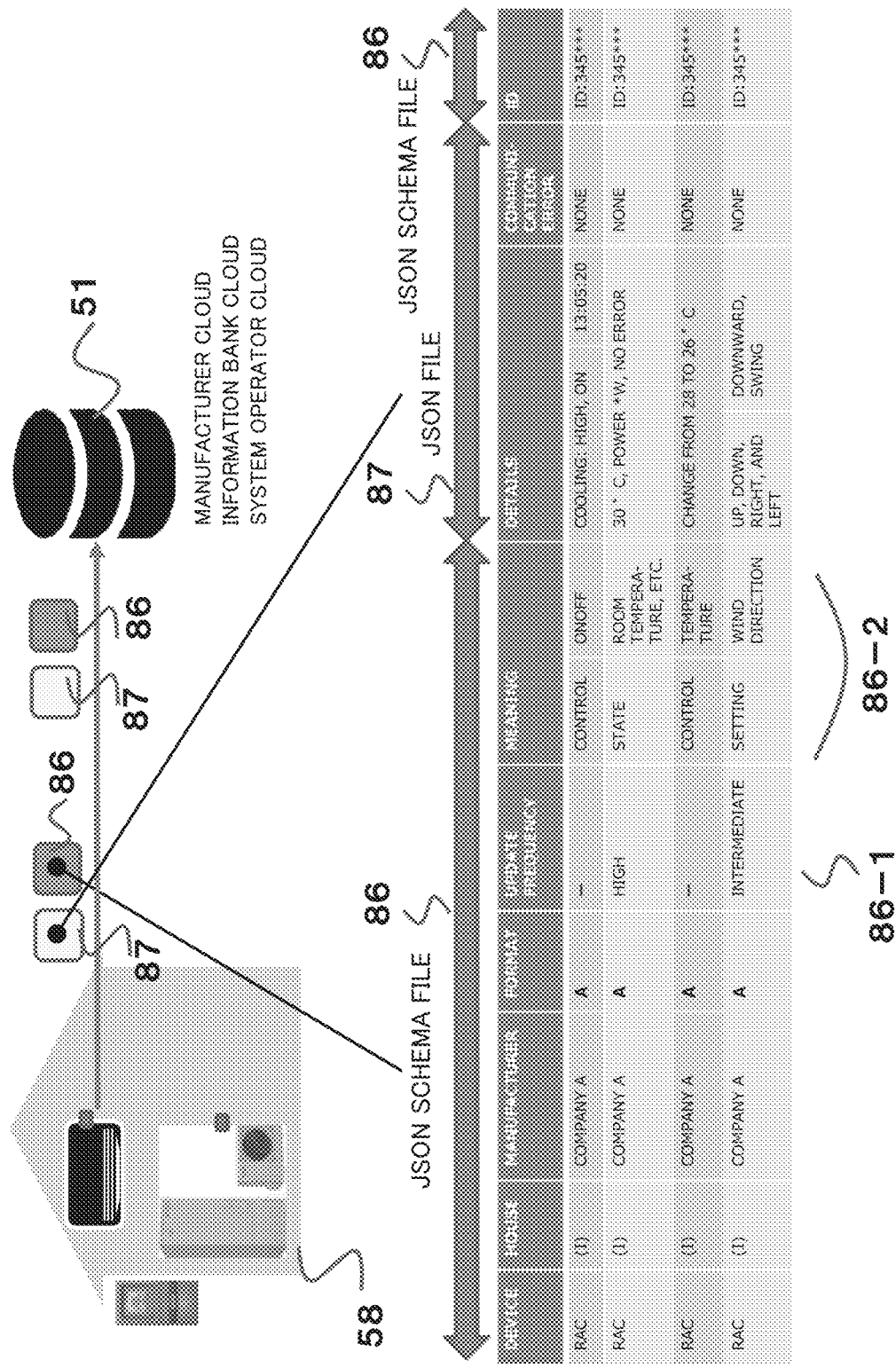
FIG. 48 is a diagram of a data file format from a device.

FIG. 48 is a diagram of a data file format from a device. Information uploaded from a device includes a JSON file 87 including information detected by a sensor, operation information, or actual information undergoing averaging or rounding.

Typically, data from a device is collectively output per device by the amount accumulated in a cache memory in the communication circuit by a communication adaptor or a communication circuit mounted on the device. Thus, device data is distributed from, for example, the communication adaptor. For example, device data is distributed periodically or when a user operates the device.

In addition to the above data, a JSON schema file 86 that describes information meaning, an ID, related meaning information, or a link ID is concurrently distributed as file supplementary information.

Figure 49:
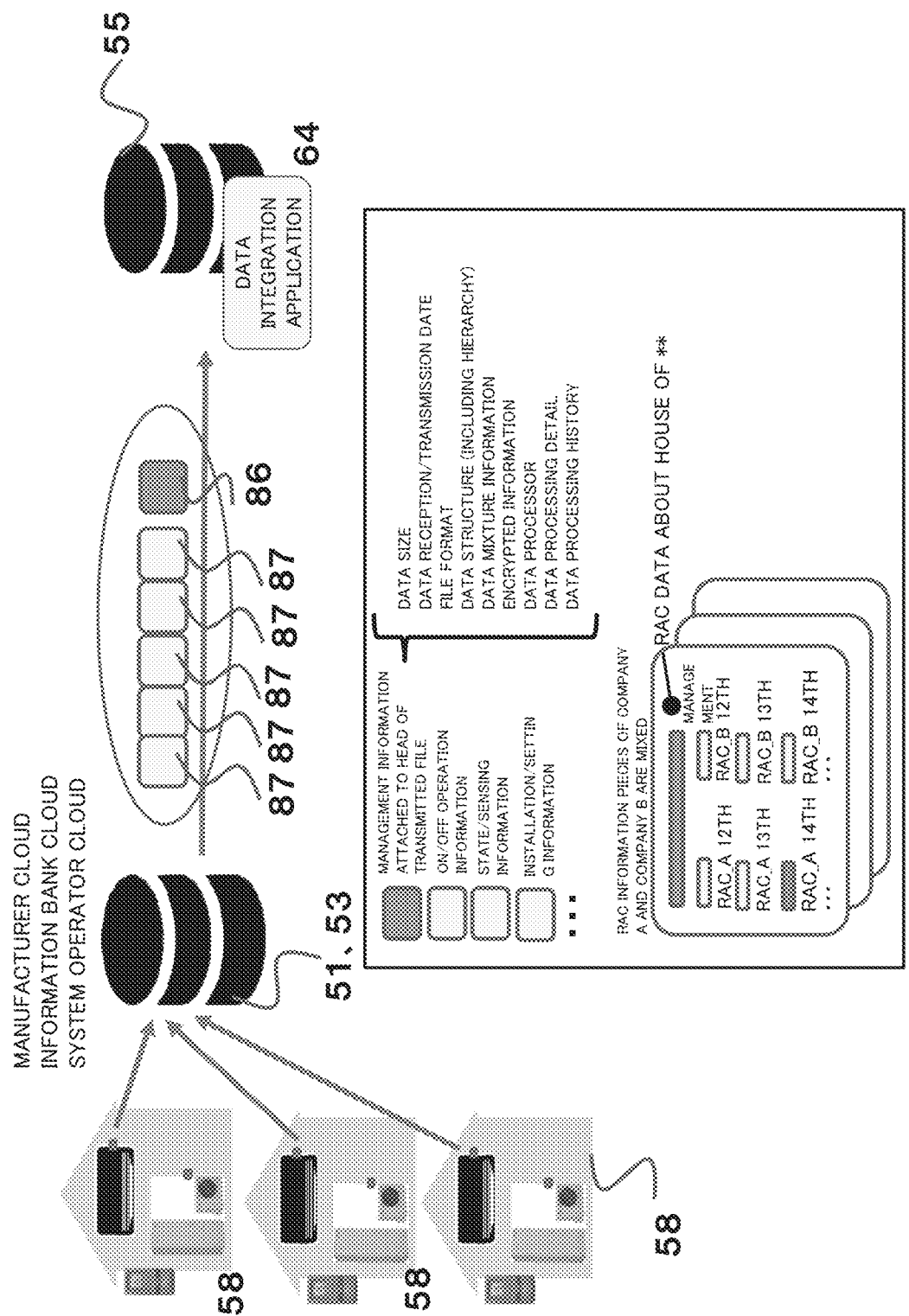
FIG. 49 is a diagram of a cataloged data file format.

FIG. 49 is a diagram of a cataloged data file format. A cataloged data file format will now be described. To the cloud of the servicer 55 to which data from the information bank 53 or the data provider 51 such as a manufacturer is applied, information to be used in a service is transmitted collectively or in multiple units of several catalogs.

Also, a JSON schema file 86 is located at the head of the data file as a management information file describing the general supplementary information. The JSON schema file 86 describes information used for data exchange, such as the data size, the data reception/transmission date, the file format, the data structure (including hierarchy), data mixture information, encrypted information, the data processor, data processing details, and the data processing history. The JSON schema file 86 is transmitted to the servicer 55.

Providing supplementary information at the heal of collective information allows the servicer 55 to learn the details of acquired data, and to confirm system selection and access appropriateness of the servicer 55 for acquiring server information.

When the service application 64 in the servicer 55 automatically confirms the details of the standardized supplementary information, data can be filed in multiple storage hierarchies in the servicer 55, data can be automatically deployed in the service application 64 that provides an actual service, and error information can be automatically returned to the data provider 51 when the data differs from intended data.

In particular, when a service is provided in response to distribution of multiple pieces of information from many data providers, individually acquired data pieces are to be automatically managed or categorized. Thus, data providers are to share the definition of supplementary information describing the details of such data pieces to enable automatic data exchange between providers and users.

Figure 50:
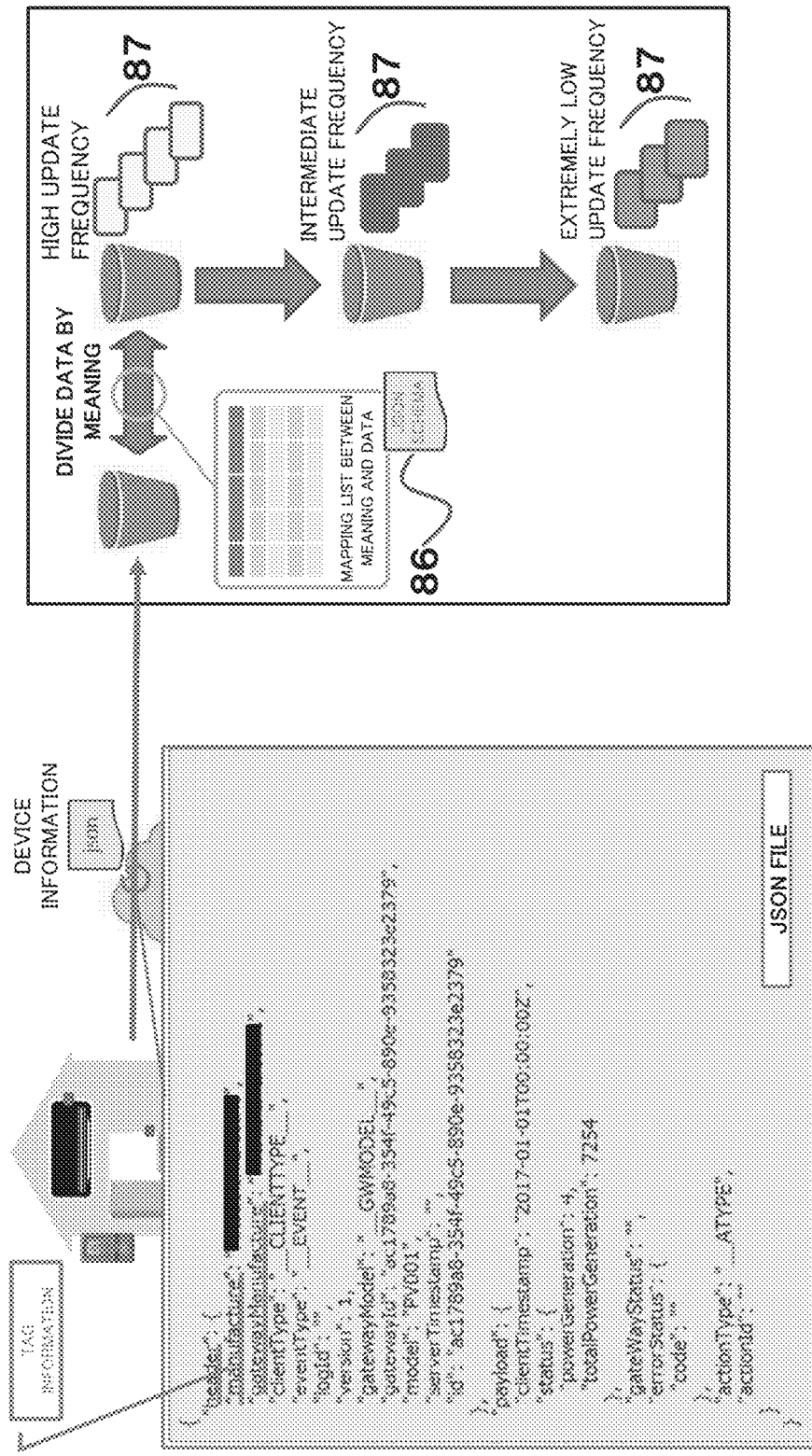
FIG. 50 is a diagram of example addition of format information based on a JSON schema.

FIG. 50 is a diagram of example addition of format information based on a JSON schema. An example information description of the JSON schema will be described. JSON information used in the current data circulation often includes description with the JSON schema as supplementary information for describing the meaning of data. Supplementary information in the IoT data is also described with this schema file. Preparing a mapping list between the meaning and data as the JSON schema allows any company that has acquired the JSON schema to understand the meaning of data. A similar system can also be constructed through data description with comma-separated values (CSVs) or the XML While supplementary information is being retained independently.

Figure 51:
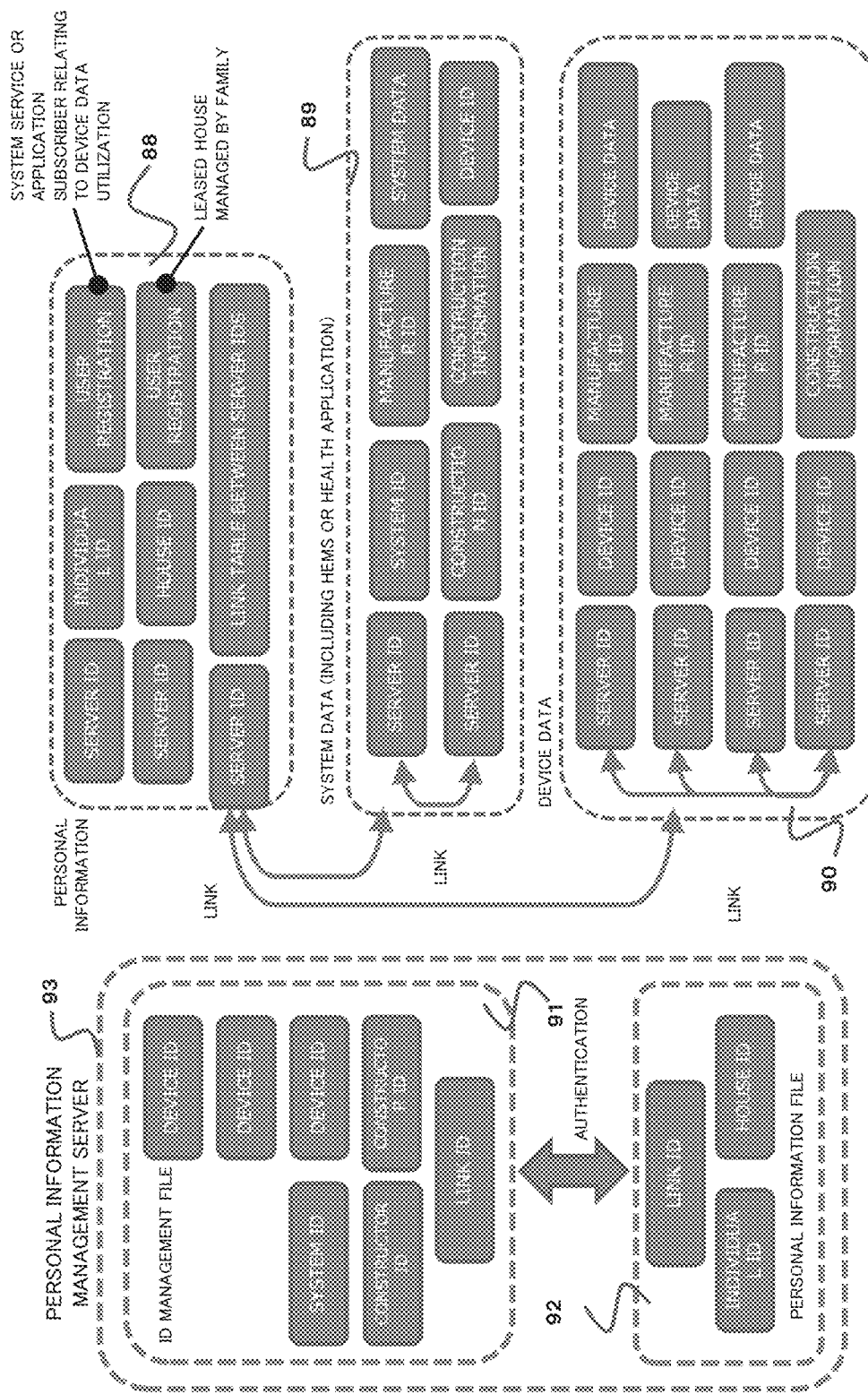
FIG. 51 is a diagram of links based on data file identifications (Ms)

FIG. 51 is a diagram of links based on data file IDs. A data file is identified with an ID of a server system, such as description of URL. For actual devices, a device ID written in an adaptor serves as an information ID of the household appliance. For a product incorporating an adaptor, the product number or the production number may serve as an ID.

The ID of device data 90 is not directly used as the ID of the server system, and thus the server ID is added. IoT data for system data 89 of the system operator is constructed through systematization of the devices. Thus, the IoT data includes a system ID including several device IDs of the corresponding devices as an upper ID. For a constructor, a construction ID is followed by construction information or a device 113 specifying the constructed device. Such IDs or information are determined for each system installed in a house or based on construction information from the same constructor. The system information or construction information is also managed while being appended with the server ID within a cloud.

Personal information is separately stored in a server system that manages a personal information file 92. The personal information is linked with each device, a system, and a construction using a link table in an ID management file 91 between the server IDs. The set of these IDs is described with, for example, a JSON schema (described later).

Each of the systems that use a cloud is provided with a link. In particular, during system construction, each of individual devices and systems is provided with an information link, and managed with the ID within the system (manufacturer) cloud.

In this structure, the personal information 92 can be separately managed, and the linkage between the device data relating to the personal information 92 and the individual can be deleted from the ID management file 91. More specifically, the personal information 92 can be centrally controlled to facilitate deletion or addition.

Figure 52:
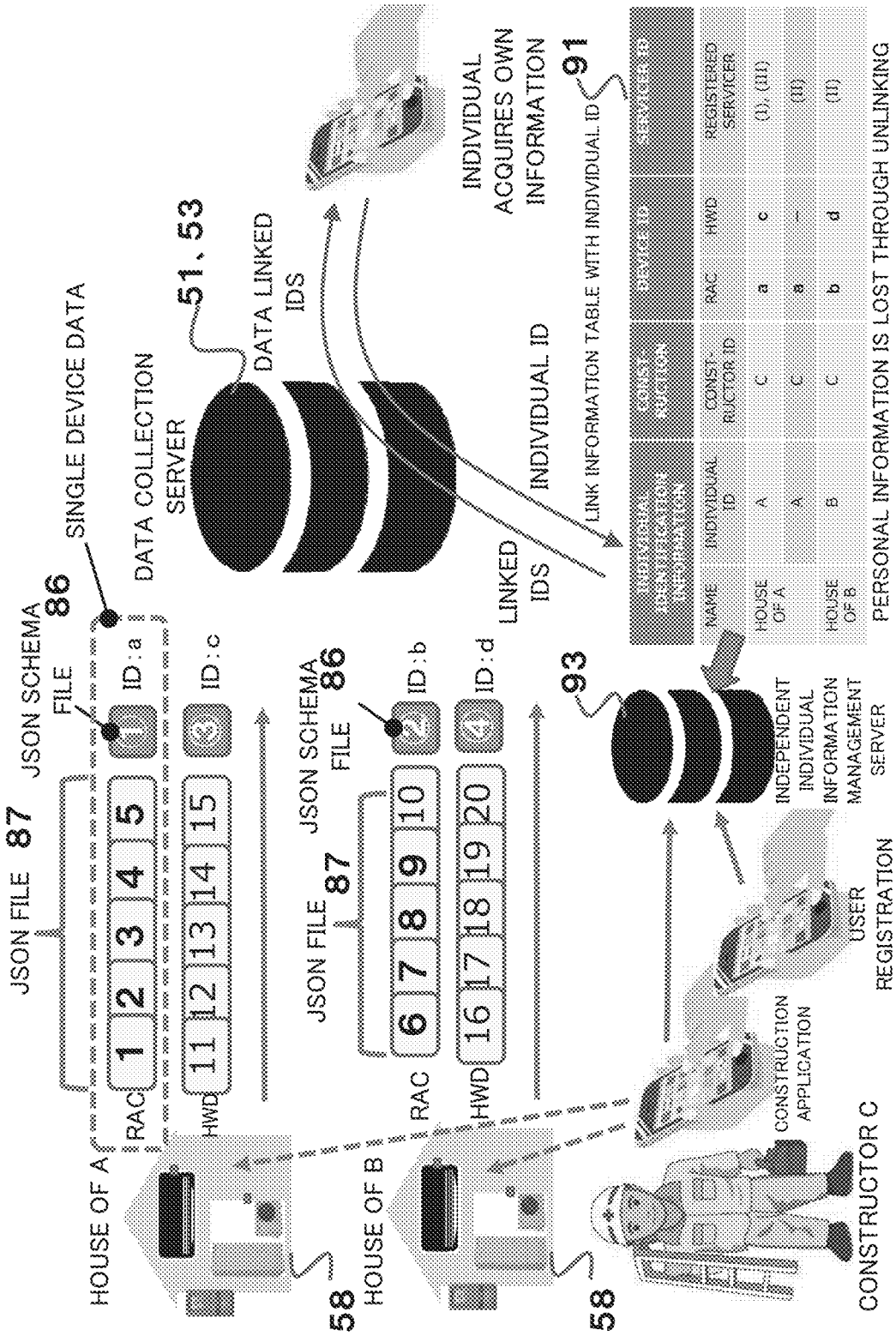
FIG. 52 is a diagram of example personal information management.

With reference to FIG. 52, an example actual management of personal information will now be described. Personal information such as user registration information and construction information and other related information are usually stored and managed in separate portions of the same server system. An independent personal information server 93 includes a link information table 91 that manages link information between device IDs, individual IDs, and construction IDs. For example, when an individual intends to browse his or her information, the individual accesses a personal information server via a main data collection server, and acquires the link information to retrieve and browse information about the data collection server in the data provider 51 or the information bank 53. When an individual intends to delete personal information, the individual can delete link information relating to the individual to delete the personal information. When the individual concurrently receives services from multiple servicers, and another service uses data from the same device or equipment, the individual is notified that the functions of the service are to be stopped or limited, in response to a data deletion request. Upon receipt of acceptance, the link in the information table is removed from the user registration ID in the link information table to disable identification of the individual. The link information may also include an ID of a servicer to enable identification of a link between an individual ID and a device ID of each servicer. When the device is not used by another service to have no effect on the service, the personal information link in the service that has received the deletion request is deleted. When the device is also used in another service, stoppage or limitation of the functions of the service is notified. Upon receipt of acceptance, the link in the information table is removed from the user registration ID in the link information table to disable identification of the individual.

Figure 53:
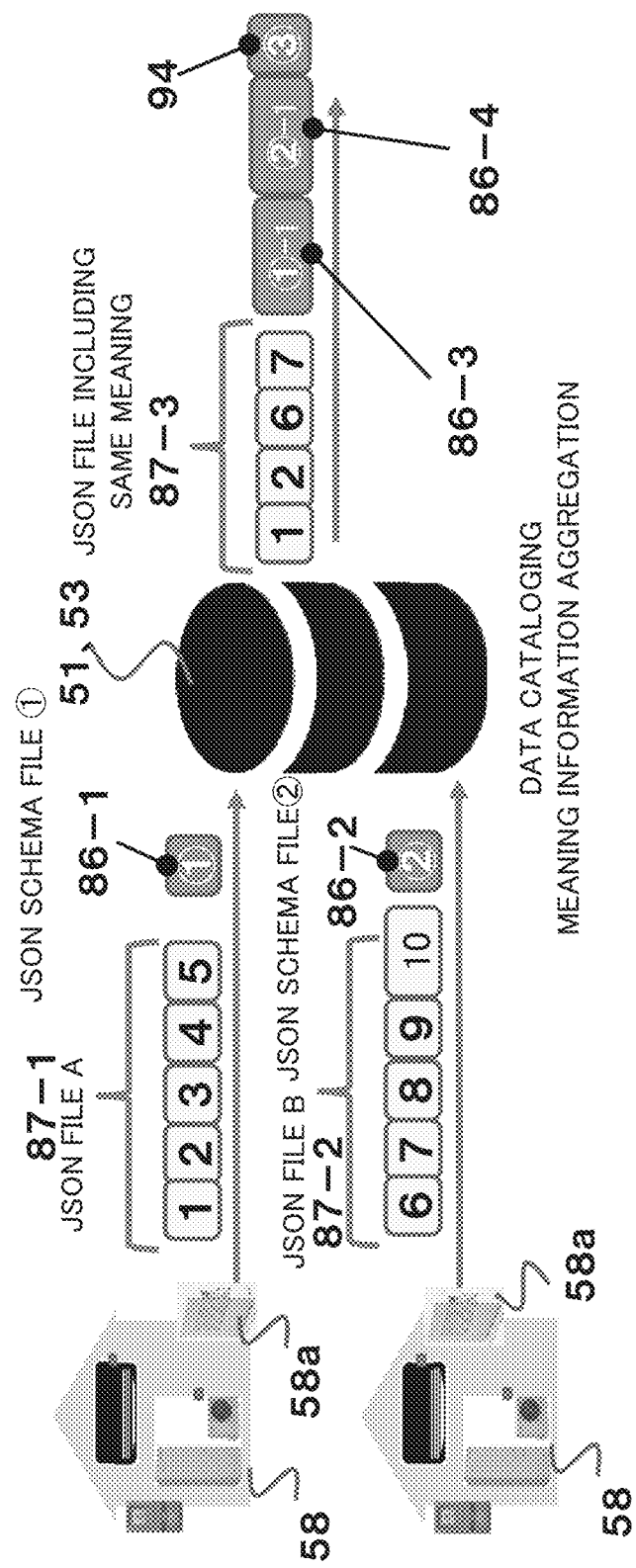
FIG. 53 is a diagram of integration of supplementary information.

FIG. 53 is a diagram of integration of supplementary information. Multiple JSON schemas may be collectively transferred. In particular, in a system such as a HEMS system including a controller 58a at each household 58, the controller 58a may integrate data of the corresponding household 58 and transfer the data after appending a JSON schema to the data. When data is distributed after being categorized by meaning (e.g., ON/OFF information alone), related portions are simply extracted from original JSON schemas 86-1 and 86-2 to form JSON schemas 86-3 and 86-4. Then, comprehensive supplementary information 94

(JSON schema 94) formed from a new JSON schema (3) is attached at the head to define, for example, the processing details, processing history, and a processing operator in the JSON schema 94.

Simply adding processing information while retaining the original schema information as much as possible achieves reliable data traceability.

Figure 54:
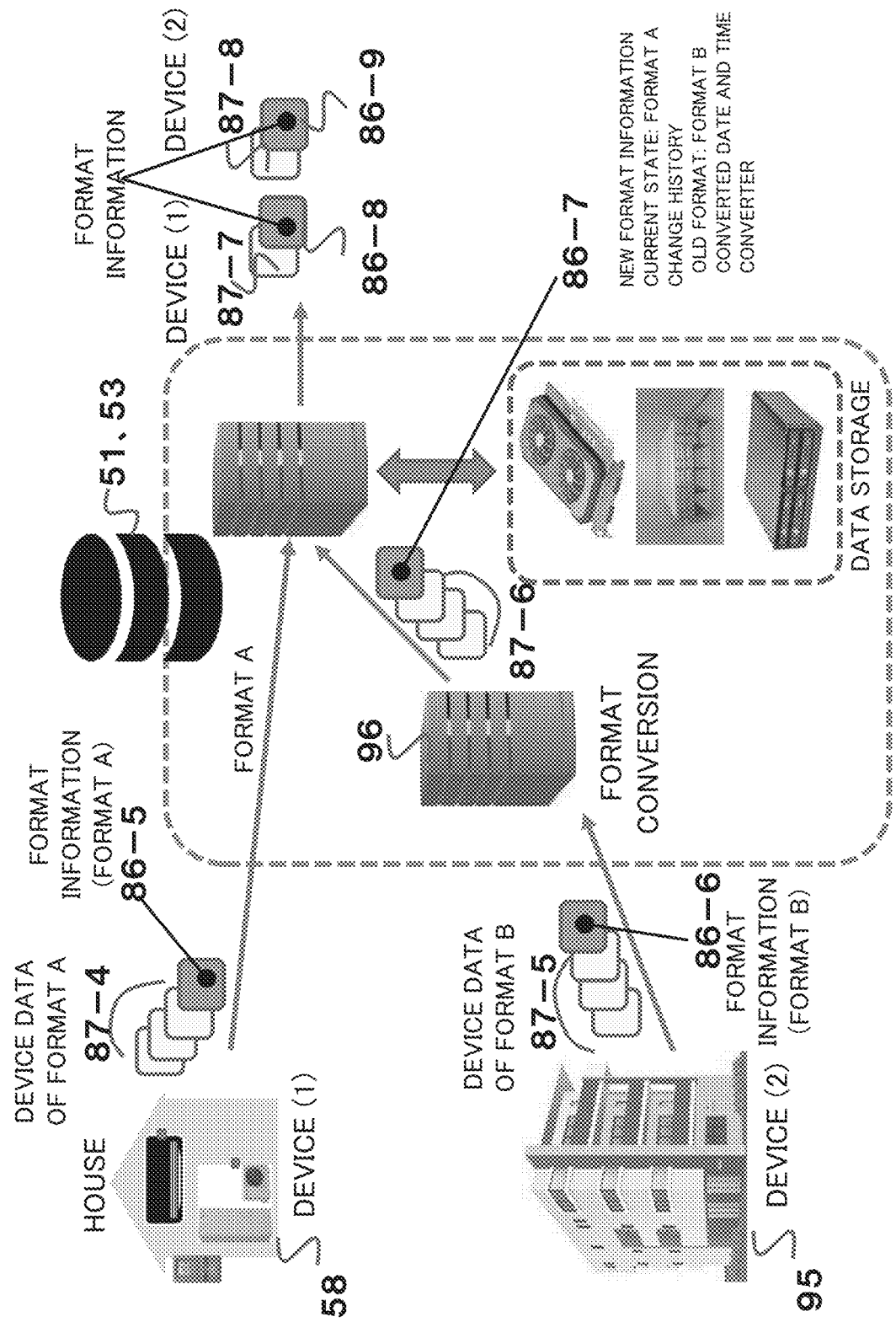
FIG. 54 is a diagram of format conversion in device data distribution.

FIG. 54 is a diagram of format conversion in device data distribution when data is circulated per device. For example, when IoT data 87-4 of a device (1) uploaded from the household 58 is processed and cataloged to be provided to a servicer, data is filed in accordance with the standardized web API. In this case, in addition to the data uploaded from the household 58, a data catalog for a device (2) for which another operator manages or processes the IoT data may be purchased, and an integrated data catalog including data of the devices (1) and (2) may be provided to a servicer. An example shown in the drawing includes, but is not limited to, an apartment 95 as the operator. In this case, the detailed specifications and definitions of a data catalog 87-5 may be different (e.g., for the specifications of temperature data, the temperature is expressed by 0.5 degrees at the household 58, and expressed by one degree at the apartment 95). In addition, the file format may be different, or specifically, the IoT data format may be a JSON format at the household 58 and an XML format at the apartment 95. A provider with frequently updated data may provide finely measured time, whereas another provider may provide roughly measured time.

To adjust these differences with each other, the information bank 53 or the data provider 51 such as a manufacturer may perform a format conversion 96. In this case, in addition to information about an old format 86-6, information at the conversion (date, details, and converter) is to be described on a JSON schema 86-7 undergoing the format conversion 96 for traceability of a data piece 87-6. This aims to track back to an old data provider or clarifying the responsibility demarcation point when a data certificate is issued at an information bank (described later) when a problem with data quality occurs.

When data of each device is returned to a servicer, data pieces 87-7 and 87-8, which are related portions extracted from original data pieces 87-4 and 87-6, are distributed with data pieces 86-8 and 86-9 attached respectively. For example, data relating to control is simply extracted for each device and distributed. Supplementary information pieces 86-8 and 86-9 are the Whole pieces or extracts from original supplementary information pieces 86-5 and 86-7. The supplementary information piece 86-9 to which information used for achieving traceability is added from format-converted information 86-7 guarantees data quality in data circulation.

Figure 55:
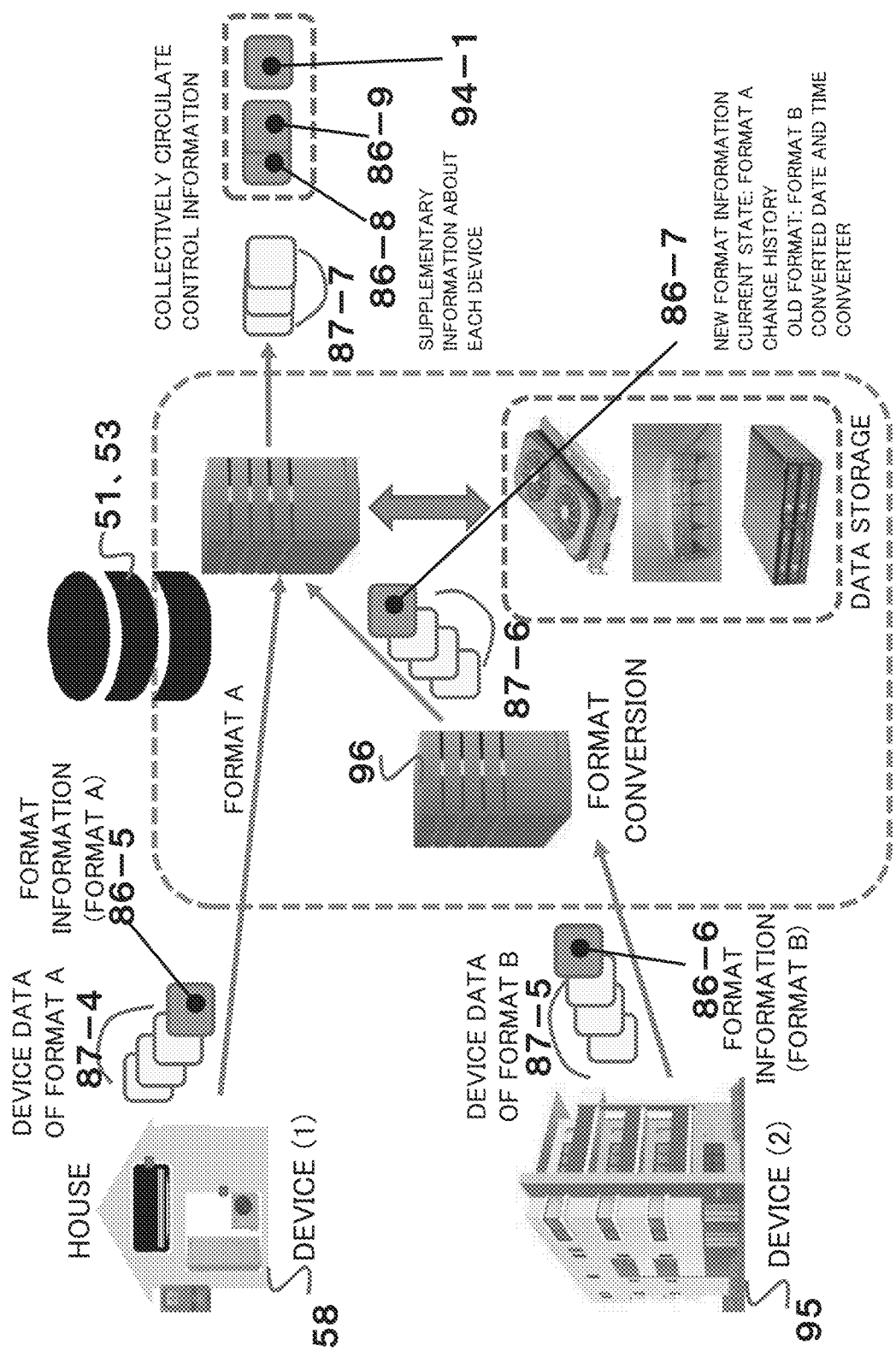
FIG. 55 is a diagram of format conversion in catalog data distribution.

FIG. 55 is a diagram of format conversion in catalog data distribution in circulation of data categorized by meaning. Also, when information categorized by meaning is provided instead of information categorized by device, data including format conversion history is transmitted to a servicer to guarantee the traceability. In this case, data may be transmitted with the original supplementary information attached to allow the servicer to confirm the states before and after the processing.

For example, when data relating to control is simply collected and cataloged, catalog data 87-7 including a collection of data simply relating to control is generated from original data pieces 87-4 and 87-6. Supplementary information pieces 86-8 and 86-9, which are the whole pieces or extracts from original supplementary information pieces 86-5 and 86-7, are prepared to generate comprehensive supplementary information 94-1 including a collection of these information pieces. Thus, the details of information relating to distributed control information and history information can be collectively provided to a servicer. The comprehensive supplementary information 94-1 includes new supplementary information for collected data and information indicating the presence of the supplementary information pieces 86-8 and 86-9 corresponding to the devices.

Figure 56:
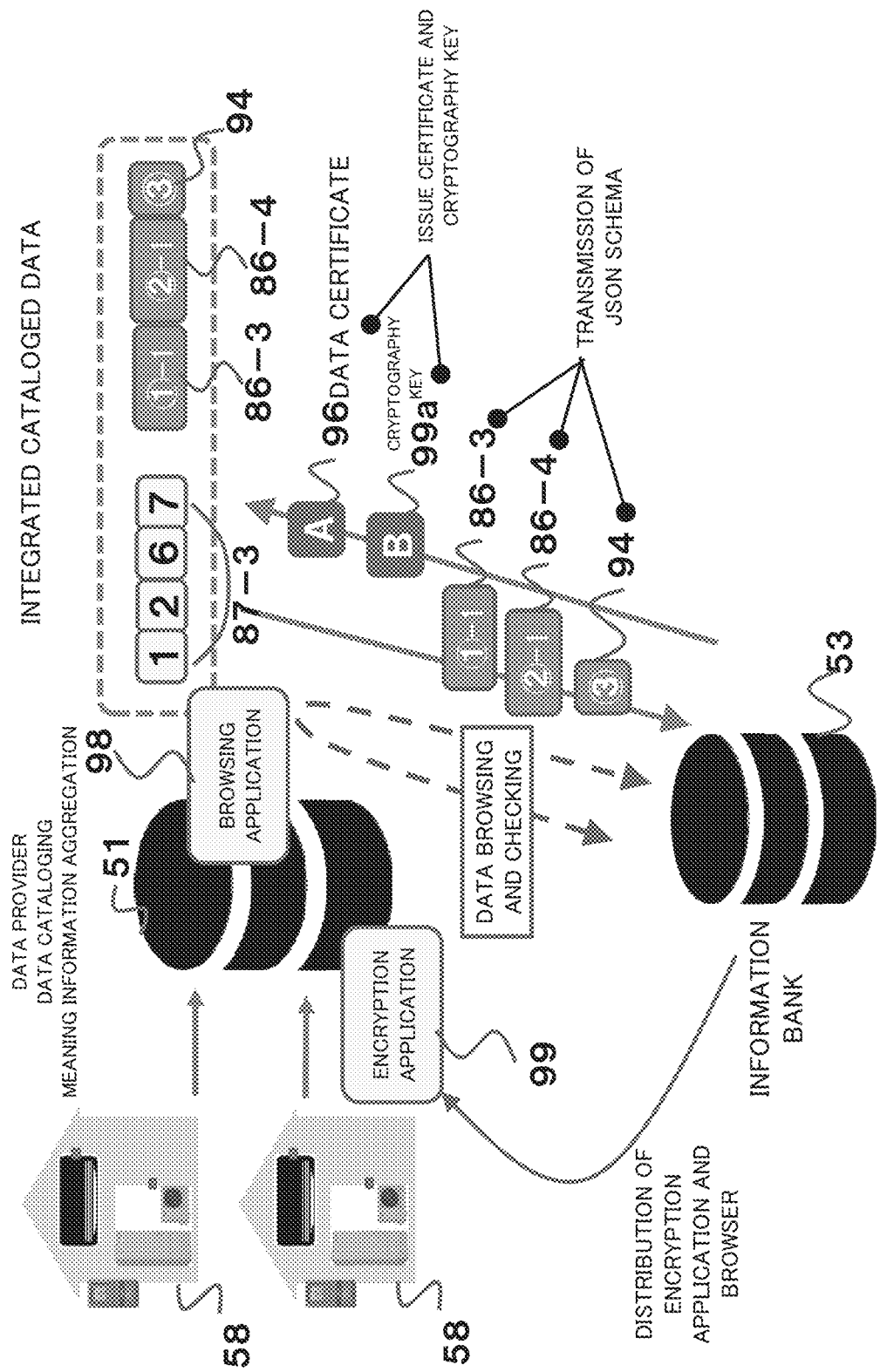
FIG. 56 is a diagram of issuing of a data certificate.

FIG. 56 is a diagram of issuing of a data certificate. To guarantee the data authenticity, the information bank 53 may audit inconsistency or missing in the data format and details, personal information, time information, and traceability, and may issue a certificate 96.

In FIG. 56, data is provided to the servicer without passing through the information bank 53. For example, JSON schema information pieces 86-3, 86-4 and 94 alone are first transmitted to the information bank 53. A data body is confirmed by browsing within the cloud of the data provider 51 such as a manufacturer with a browsing application 98 transmitted by the information bank 53 to the data provider 51. When data is confirmed with no problem after browsing, a data certificate 96 and a cryptography key 99a are issued.

In the manufacturer cloud 51, an encryption application 99 provided from the information bank 53 encrypts the confirmed IoT data 87-3, supplementary information pieces 86-3 and 86-4, and supplementary information 94 (without correcting after confirmation of the information bank 53) with the cryptography key 99a.

Thus. IoT data is transmitted while the encrypted data, the data certificate 96, and the cryptography key 99a are provided to the servicer.

In an architecture up to the encryption, the information bank first provides an information confirmation application and an IoT information encryption application to the IoT data provider, confirms IoT information based on the transmitted supplementary information or the comprehensive supplementary information via the IoT information confirmation application, and transmits a cryptography key to the IoT data provider based on the confirmation.

The data provider can thus transmit IoT data to the servicer as encrypted data granted by the information bank.

Figure 57:
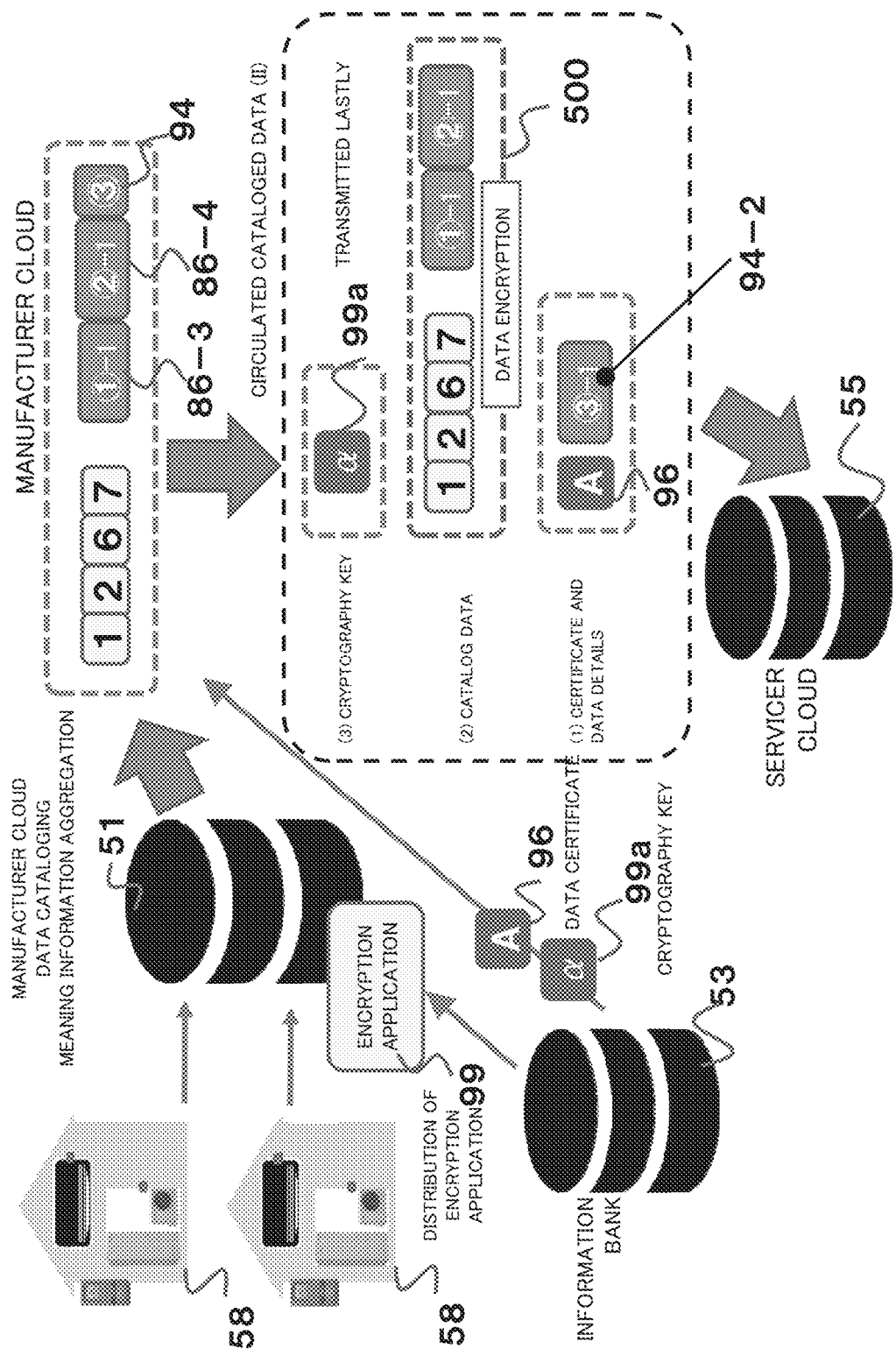
FIG. 57 is a diagram of generation of circulation data including a certificate (from a data provider to a servicer)

FIG. 57 is a diagram of veneration of circulation data including the certificate 96 (from the data provider 51 to the servicer 55). When IoT data with the data certificate 96 issued by the information bank 53 is transmitted to the servicer 55. JSON files 86-3 and 86-4 describing the data details and four IoT data pieces, which are real data, in the integrated catalog data (I) are collectively encrypted. The JSON file 94, which is circulation comprehensive supplementary information, is not encrypted.

This JSON file 94 is a JSON schema describing the general outline of these data pieces. At the encryption upon receipt of the certificate 96, the circulation comprehensive supplementary information 94 additionally describes information indicating that encryption and issuance of the certificate have been performed, and includes this information into a JSON file 94-2. The JSON file 94-2 is located at the head of circulation data (II) together with the certificate 96. The JSON file 94-2 is comprehensive supplementary information including a certificate and encrypted data in addition to the original circulation comprehensive supplementary information 94.

Thus, data acquired after the certificate 96 is issued can be transmitted to the servicer 55 without being changed (without the certificated data being changed) while including description of additional information.

Data is distributed from the data provider 51 such as a manufacturer to the cloud of the servicer 55 sequentially in order from circulation outline information and the certificate 96, then encrypted IoT data 500, and lastly the cryptography key 99*a*.

Figure 58:
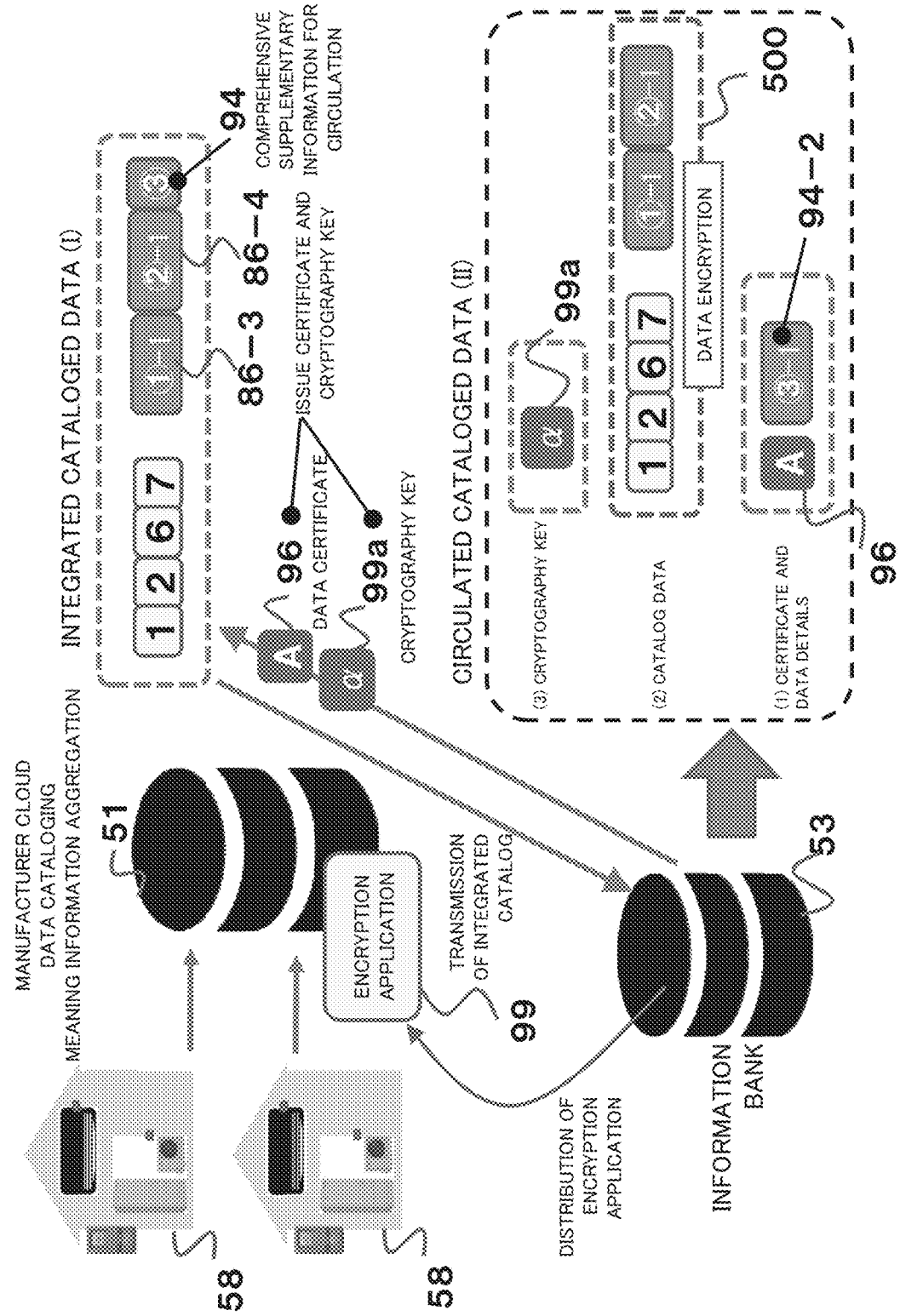
FIG. 58 is a diagram of generation of circulation data including a certificate (from an information hank to a servicer)

FIG. 58 is a diagram of generation of circulation data including a certificate 96 (from the information bank 53 to the servicer). To transmit IoT data with the data certificate 96 issued by the information bank 53 to the servicer, information may be directly transmitted to the servicer via the information bank 53.

In this case, the data details including the JSON schemas 86-3 and 86-4 and the circulation comprehensive supplementary information 94 are transmitted to the information bank 53 from the cloud of the data provider 51 such as a manufacturer. Similarly to the processing shown in FIG. 27, the information bank 53 collectively encrypts, in the integrated catalog data (I), the JSON schemas 86-3 and 86-4 describing the data details and four IoT data pieces representing real data.

The comprehensive supplementary information 94, which is circulation comprehensive supplementary information, is excluded from the coverage of encryption. The comprehensive supplementary information 94 is a JSON schema describing the general outline of these data pieces. At the encryption upon receipt of the certificate, the circulation comprehensive supplementary information 94 additionally describes information indicating that encryption is performed upon receipt of the certificate, and includes this information into comprehensive supplementary information 94-2. The comprehensive supplementary information 94-2 is located at the head of circulation data (II) together with the certificate.

In this case, data is distributed from the information bank 53 to the servicer cloud sequentially in order from the circulation comprehensive supplementary information 94-2 and the certificate 96, then the encrypted IoT data 500, and lastly the cryptography key 99*a*. In this system, to transmit data from the cloud of the data provider 51 such as a manufacturer to the information bank 53, data encrypted in the same manner as in FIG. 57 may be transmitted to the information bank 53 to guarantee the data security via the Internet.

Figure 59:
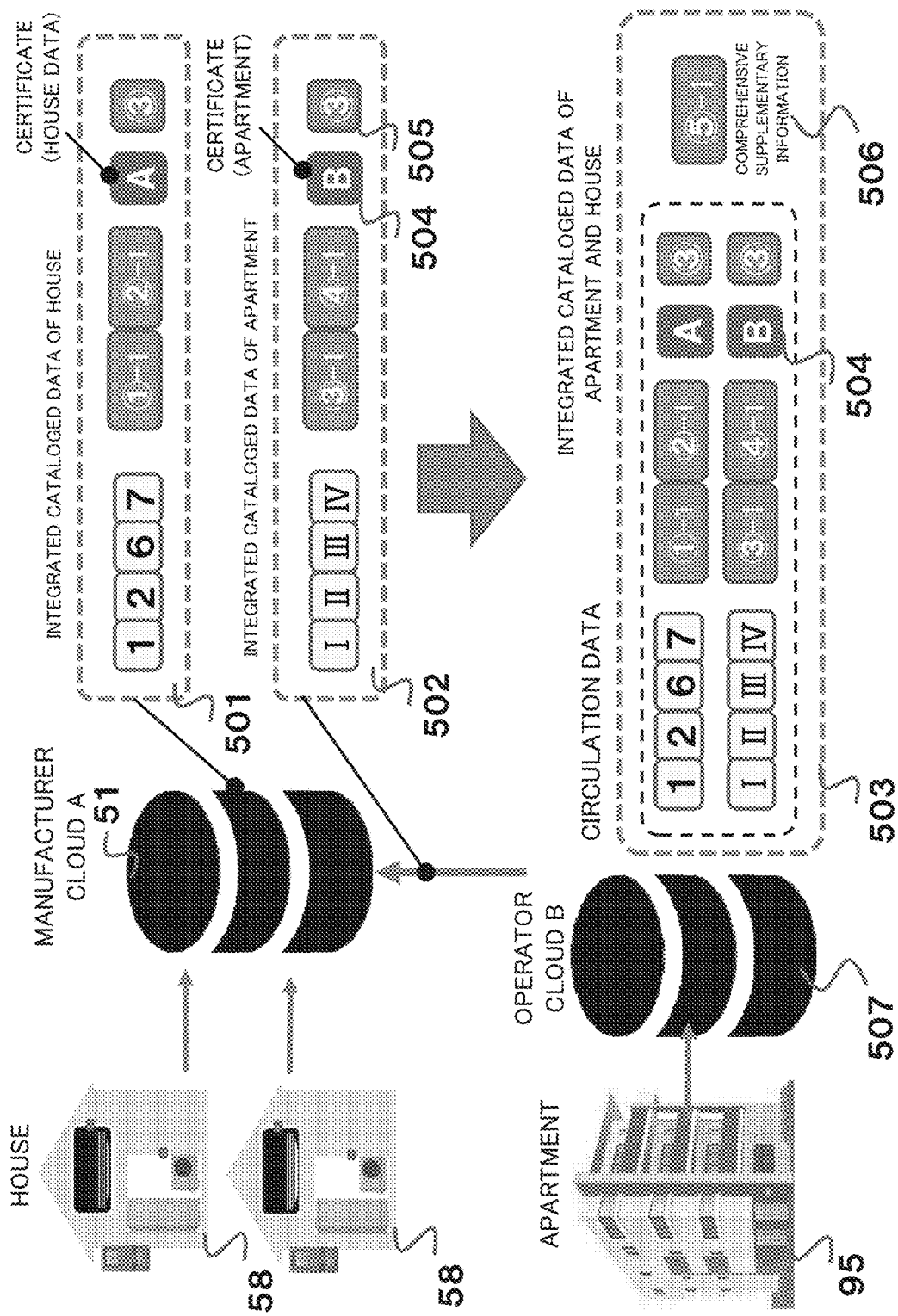
FIG. 59 is a diagram of distribution data including multiple certificates.

FIG. 59 is a diagram of distribution data including multiple certificates, Examples in which multiple original data pieces are collectively transmitted to the cloud of the servicer 55 include the data provider 51 such as a manufacturer that collets information about a house constructing an IoT system on the cloud, purchasing data of an operator cloud 507 of the apartment 97, and integrating data pieces of the household 58 and the apartment 95.

When data of the operator of the apartment 95 receives a certificate 504 from the information bank, the information including the certificate 504 is temporarily retained unchanged. A JSON schema 506, which is new circulation comprehensive supplementary information into which the information chiding the certificate 504 is included, is located at the head to circulate data.

A certificate A, supplementary information pieces (1)-1 and (2)-1, and comprehensive supplementary information (3) included in data 501 of the household 58, and a certificate 504, supplementary information pieces (3)-1 and (4)-1, and comprehensive supplementary information 505 included in data 502 of the apartment are distributed as one data piece. The general information about the collective data pieces is described in the comprehensive supplementary information 506. Thus, new processing detail history, a processor, the presence or absence of a new certificate, and other details in integration of two data pieces are described to enable checking of integrated data.

Thus, after the information comprehensive supplementary information 506, which includes these collective data pieces, is browsed, certified information pieces that are the data sources of the collective data pieces can be circulated. In addition, when multiple data sets are merged, the data traceability relating to, for example, merging or processing can be described. Thus, for example, traceability can be achieved and the circulation route can be determined when a problem with data quality occurs.

Figure 60:
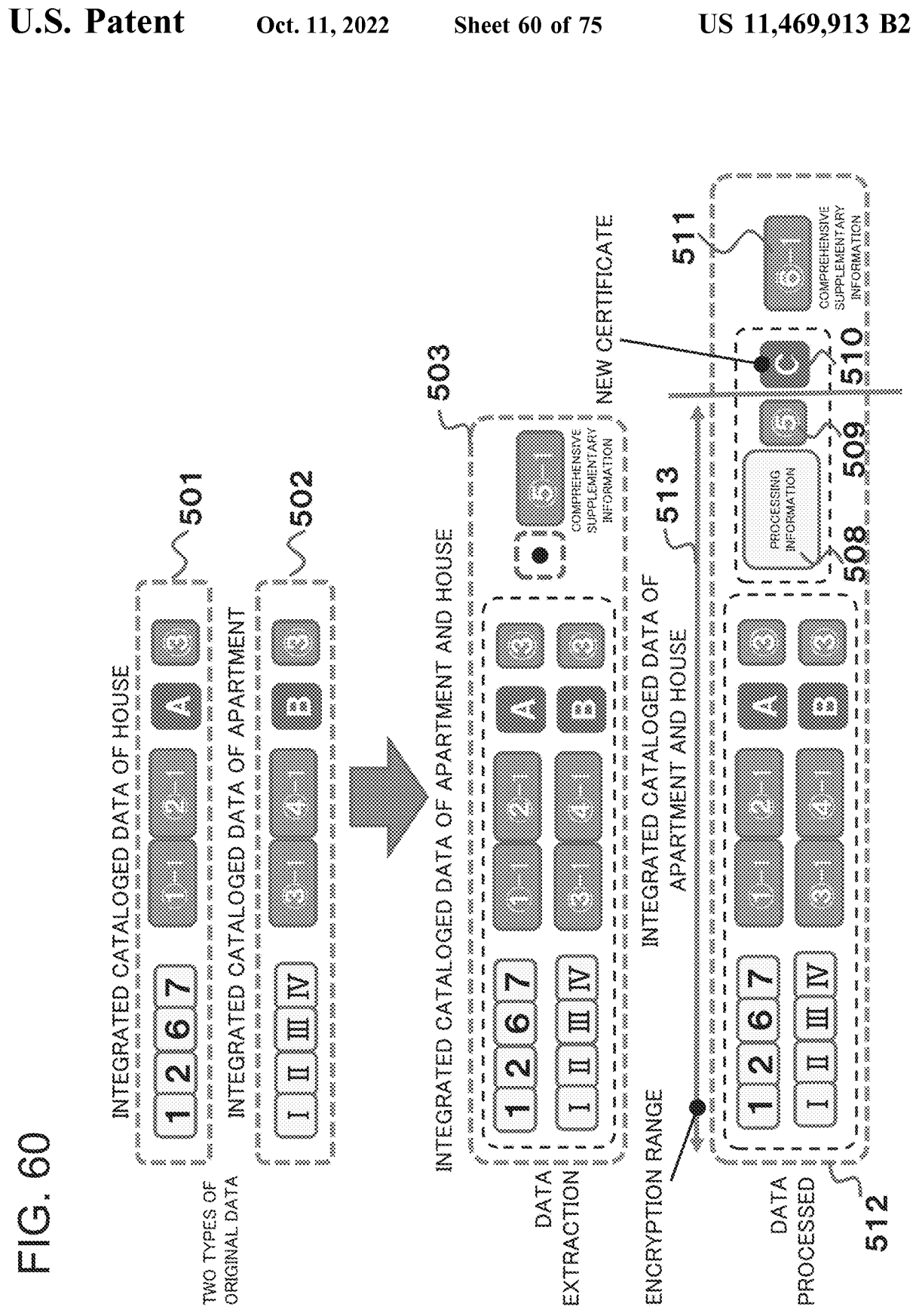
FIG. 60 is a diagram of distribution data undergoing data processing after integration and including multiple certificates.

FIG. 60 is a diagram of distribution data undergoing data processing after integration and including multiple certificates. Information pieces from two data providers are combined to form new processed data pieces (features extracted to be plotted on a graph), data extracted by characteristic such as the area, weather, or user attribute and by specific segment, data rearranged (in order from north to south or in age order) for ease of understanding, and extractions of history of the same operation in the same time zone. Distribution data including such processed data will be described below.

In addition to the original data 501 and processing information 508 acquired by processing data 502, a JSON schema 509, which is a JSON schema describing the general processing information, is prepared. The details of the processing information 508 are described in the JSON schema 509, and a new certificate 510 is received from the information bank 53. Thus, the reliability of the processing information is guaranteed. Then, circulation comprehensive supplementary information 511 is added to entire data 512. The outline of the processing information 508, the supplementary information 509, the processed data certificate 510, the original data 501, and the original data 502 is described in the circulation comprehensive supplementary information 511. When the original data is retrieved without any change or the portion including the original data is simply retrieved, a new certificate 510 may be omitted. Examples of processed data include data acquired by extracting data of the same time zone and the same operation, data acquired by extracting data having the same area ID, and data acquired by plotting the original data in a graph.

Encryption of this collective information covers an encryption range 513. All the collective data pieces excluding the certificate 510 and the comprehensive supplementary information 511 are encrypted again and distributed.

In some embodiments, three certificates may be separately transmitted, without circulation data encryption. When, for example, the original data remains unchanged without additional processing, the encrypted original data pieces 501 and 502 may be left encrypted, processing data 508 and supplementary information 509 on the processing data 508 may be newly encrypted, and a processed data certificate 510 and entire comprehensive supplementary information 511 may be added for distribution.

In this case, key information to decrypt the original data pieces 501 and 502 is to be distributed. A cryptography key for the original data pieces 501 and 502 may be described in the supplementary information 509 about the processed data, and may be encrypted again together with the processed data 509 to enhance encryption strength.

Figure 61:
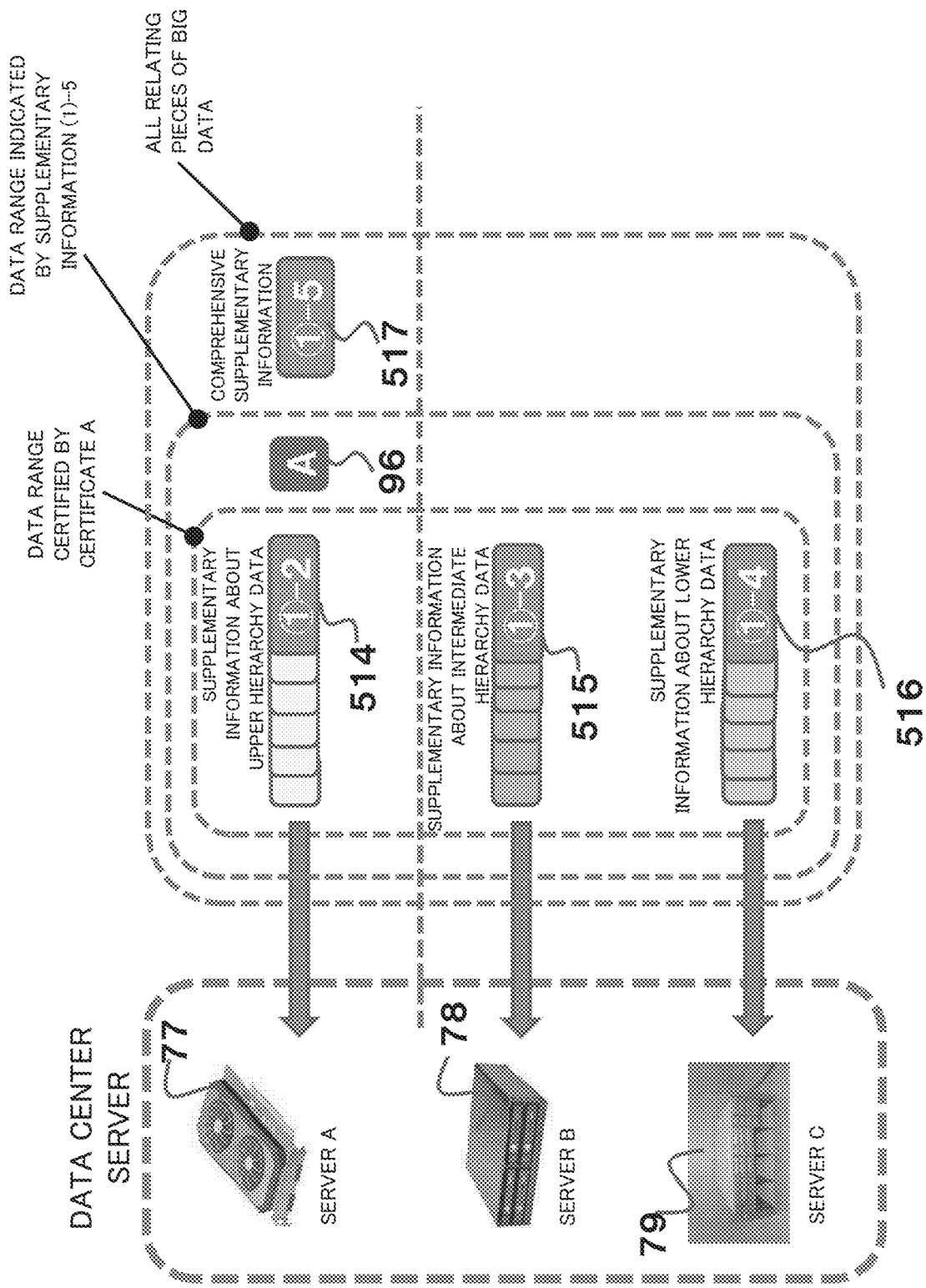
FIG. 61 is a diagram of a certificate for hierarchization data and supplementary information.

FIG. 61 is a diagram of a certificate for hierarchization data and supplementary information. With reference to FIG.

61, issuance of a certificate for hierarchized IoT data and supplementary information will be described.

As shown in FIG. 61, to collectively certify related data, a certificate covers the range over multiple hierarchies.

The details of data including supplementary information pieces 514, 515, and 516 are checked and audited in advance to allow the certificate 96 to be effective for all of or each of the supplementary information pieces 514, 515, and 516, or any combination of the supplementary information pieces 514, 515, and 516. For a combination of information pieces, the effective certificate 96 can cover the range of the upper hierarchy alone, the intermediate hierarchy alone, the lower hierarchy alone, or a combination of two or more of these hierarchies for transmission.

Multiple cryptography keys corresponding to combinations of separate data pieces are provided from the information bank, and a key corresponding to a combination of file sets based on the negotiation with the servicer is provided.

The certificate 96 is issued after a checking process of the information bank. When data categorized by hierarchy is to be transmitted in response to a servicer request, another certificate issue can be omitted. Thus, rapid circulation settlement can be processed with the servicer in the data circulation market.

A certificate does not cover outline supplementary information included in comprehensive supplementary information 517. When a data set transmitted in response to a servicer request is to be changed, supplementary information used for circulation or sales, including a data catalog outline, leaflet information, update data/frequency, the data size, the data hierarchy or structure, presence/absence of a certificate, presence/absence of personal information, sales price, a distributor, and contact information, can be changed. For example, when the data provider has changed the address, phone number, or sales price, a certificate is not to be reissued for each data piece.

Thus, instead of IoT data, information used for data circulation sales and excluded from the coverage of a certificate may have additions or changes as appropriate after a data certification is issued. This enables rapid circulation settlement in the data circulation market and reduces the system cost.

Figure 62:
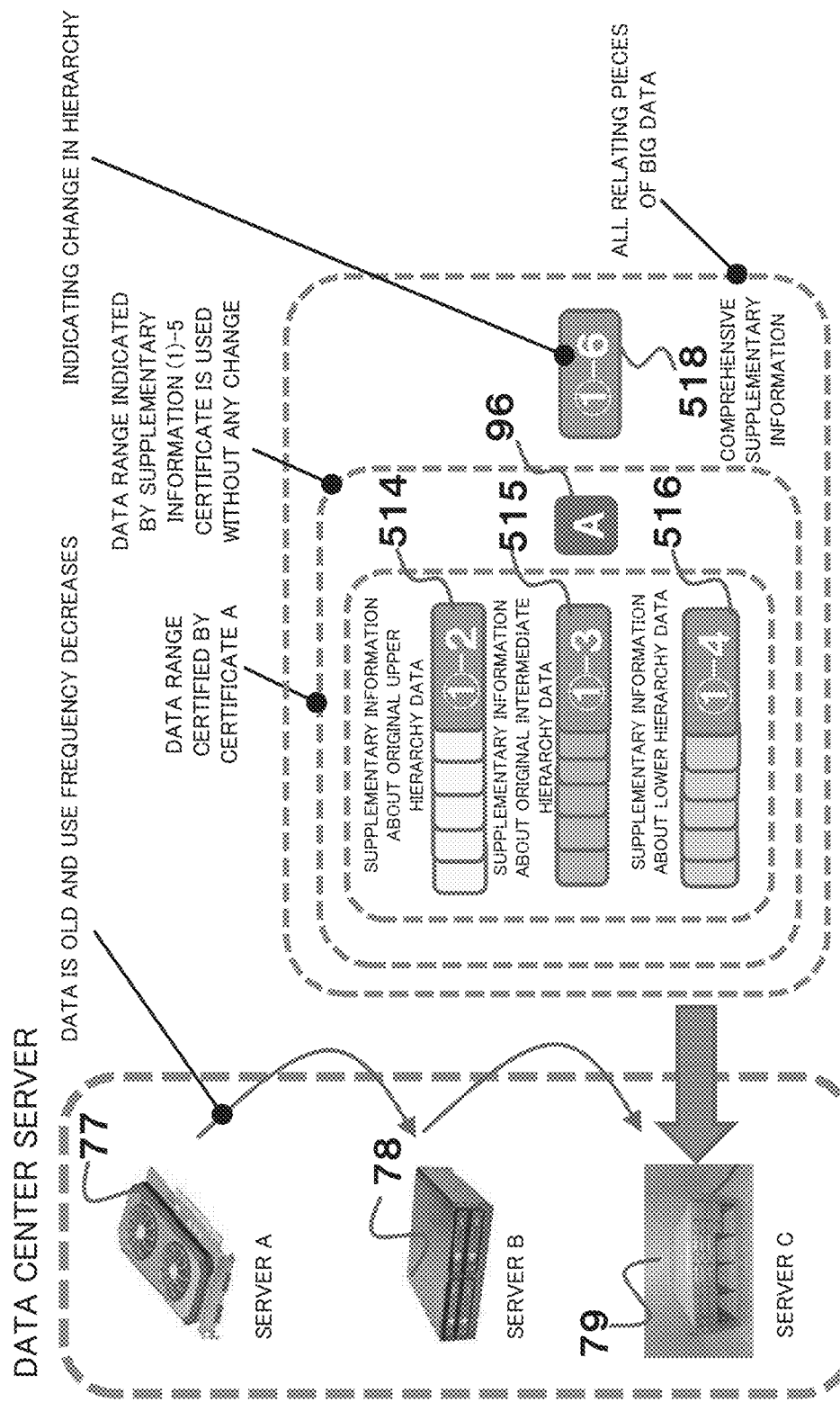
FIG. 62 is a diagram of a certificate and supplementary information after hierarchization and aggregation.

FIG. 62 is a diagram of a certificate and supplementary information after hierarchization and aggregation. Data that has lost freshness with time (rarely used data such as information ten years ago is moved to the lowest-hierarchy server system in the data server to reduce data management costs.

Also, a data set within the coverage of the certificate 96 is collectively located on the lowest hierarchy. This hierarchy change can be also handled by describing the change history in the above outline supplementary information, Thus, no certificate is to be issued when the hierarchy of past data is changed. Thus, the manufacturer cloud and the servicer cloud that manage massive amounts of data can reduce costs.

Describing the hierarchy change in comprehensive supplementary information 518 guarantees the contents of the certificate 96 although information including supplementary information is changed to a hierarchy different from the hierarchy when the certificate 96 is originally issued.

Figure 63:
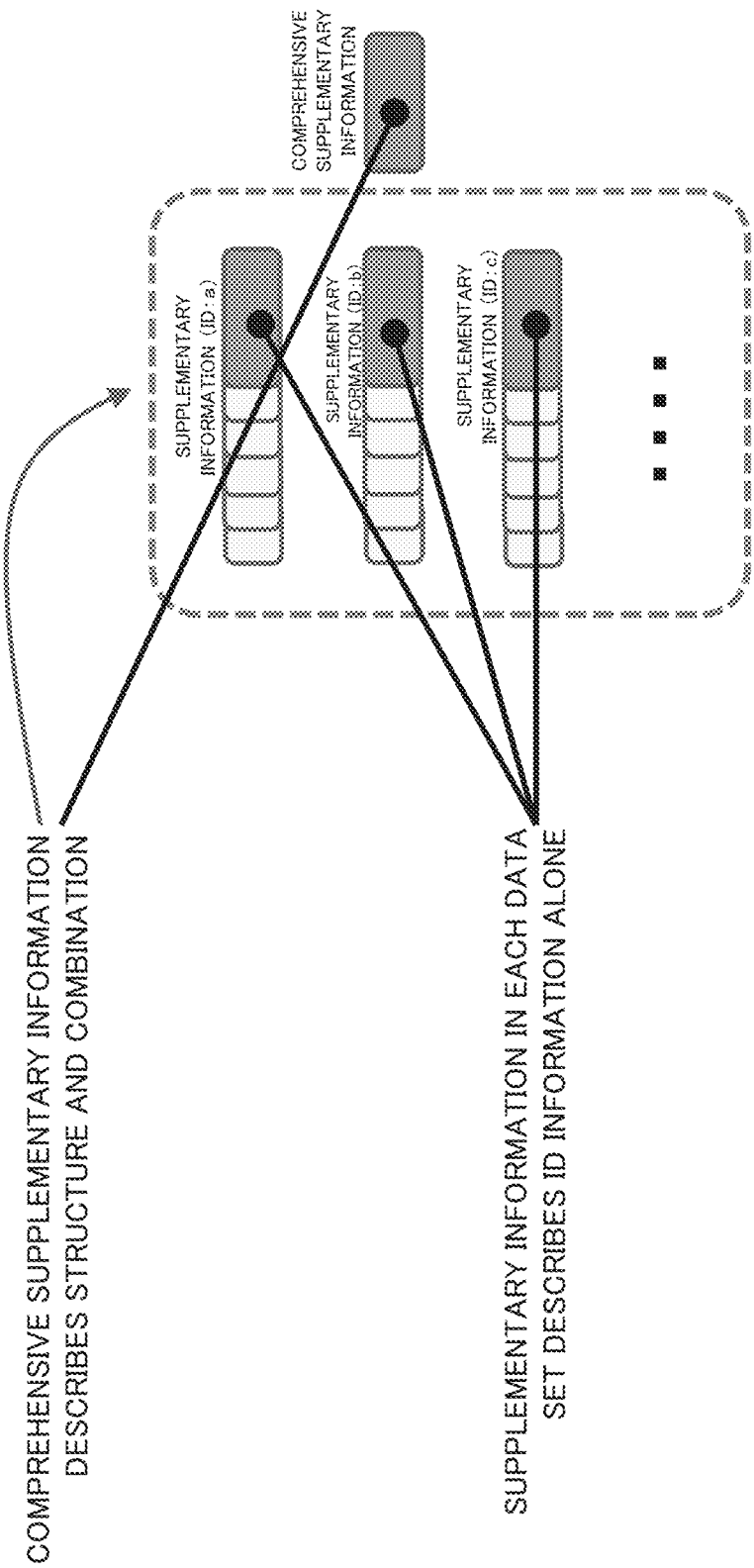
FIG. 63 is a diagram of categorization of data sets.

This eliminates the issuance of a new certificate after a hierarchy change in long term storage or a change of a hierarchy layer resulting from a change of servicer needs, and can reduce the maintenance cost of the entire data management system, FIG. 63 is a diagram of categorization of data sets. Data categorization includes rough categorization of data sets distributed to a servicer, in addition to hierarchization based on access frequency or use frequency.

A particular example of such categorization to distinguish the provision costs of high-value added data from the costs of general data is to distinguish data including personal information to be treated with special care.

Such rough categorization is to be used for a circulation mechanism when a servicer purchases data from the data circulation market, in the hierarchy above the data catalog information set categorized by device or meaning. In particular, categorizing circulation data sets by price effectively simplifies a charging system in trading in a frequently updated and distributed IoT data set.

Data including personal information is distinguished from other data because, as defined in, for example, the General Data Protection Regulation (GDPR) of the European Union (EU), data distributed to a servicer also undergoes deletion of related information when an individual corresponding to original data wishes deletion, and automatically storing data into a server system that charges high system and management costs and that allows deletion of personal information in the servicer can avoid information accidents. The presence/absence of personal information and Whether the circulation costs are high are to be described in the supplementary information.

The categorization of data into multiple data sets is to be described in detail in the comprehensive supplementary information.

Data sets are categorized as follows.

(1) Update Frequency Hierarchy Categorization: Data pieces are divided into files by data capacity and access frequency in the hierarchical structure reflecting server characteristics, and all the files are not updated at the shortest possible intervals;

(2) Data Price Categorization: Data pieces with different sales prices are categorized by price (or categorized by value added to data). For example, data is distinguished by the depth of the meaning of original data, or additionally processed data and raw data are priced differently;

(3) GDPR Compliance Categorization: In categorization by presence or absence of personal information, data to be treated carefully (care-taking data) is distinguished from the entire data to avoid the entire data to be carefully treated; and (4) Data Rounding Categorization: In data categorization by unit (year, month, or date) with which data is rounded, data categorized by month and year is highly rounded. Thus, rounded data pieces and data pieces not rounded are divided without being filed together.

Combinations of different types of categorization that form data are to be described in detail in supplementary information, Comprehensive supplementary information describes a structure with individual data. IDs to indicate the locations of information pieces following comprehensive supplementary information to clarify the entire structure with this information.

Figure 64:
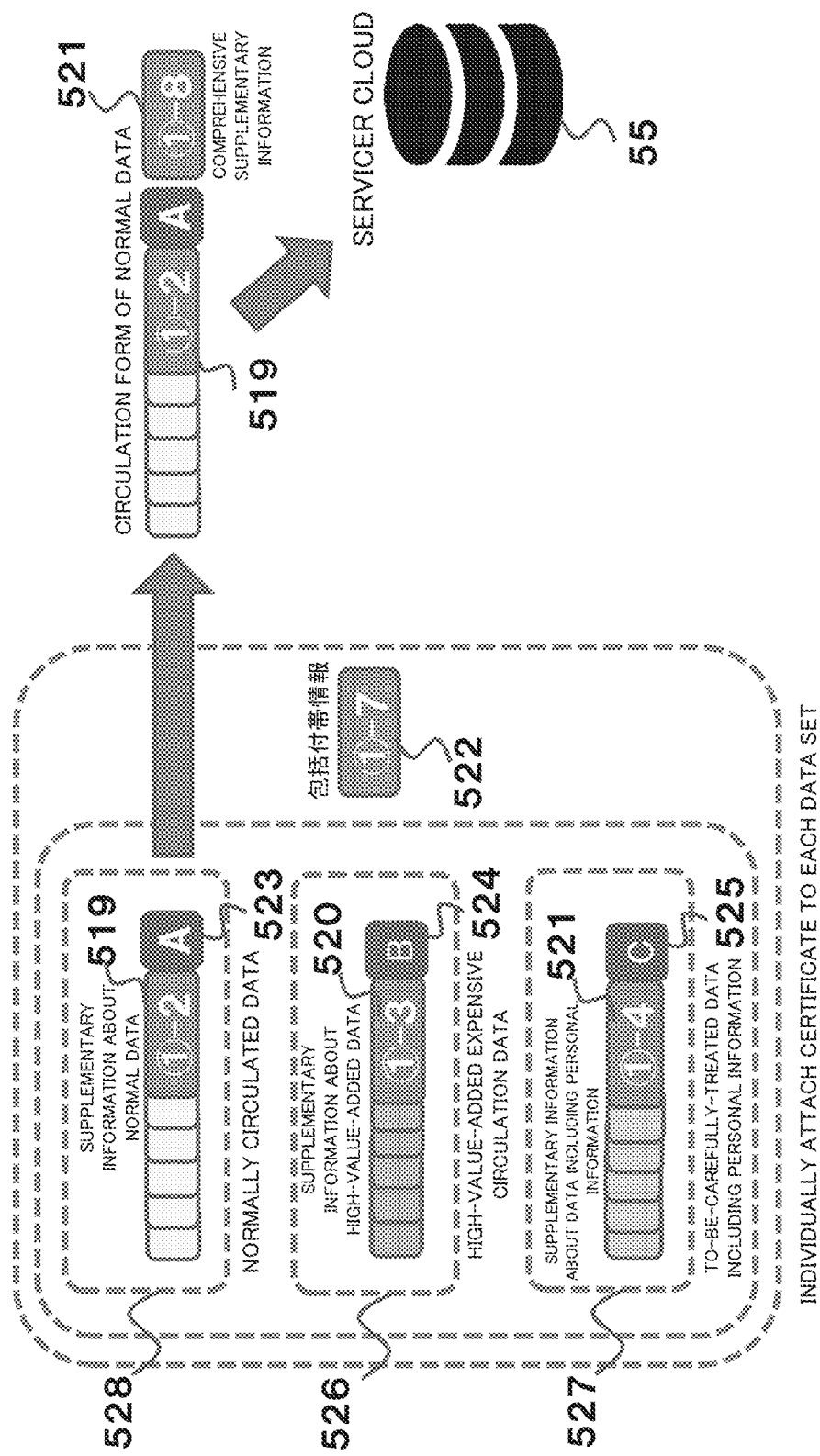
FIG. 64 is a diagram of distribution of information sets categorized by their details.

An example described with reference to FIG. 64 involves, for example, high-value added data 526 provided with high costs, and care-taking data 527 including personal information, in addition to normal data 528.

In a limited community managed by a specific data provider, for data pieces associated together to form a data set, such as data pieces for a specific device or device type or from collective data of a specific house (data connected to a specific house manufacturer or an apartment), the high-value added data 526, the care-taking data 527 including personal information, and the normal data 528 are respectively provided with supplementary information pieces 520, 521, and 519.

As described above, when associated data pieces have different added values (sales prices) or include a data piece including information to a limited receiver, data certificates 523, 524, and 525 are provided for each categorization, and comprehensive supplementary information 522 that describes entire information details is provided. To circulate normal data, the normal data 528 is encrypted, and distributed to the servicer 55 while the comprehensive supplementary information 521 extracted from the original comprehensive supplementary information 522 describing the data details to be transmitted is added to the normal data 528. The comprehensive supplementary information 522 is supplementary information relating to all the relevant pieces of big data, and changeable without involving a certificate.

The servicer 55 reads the details of the comprehensive supplementary information 521 to activate the service application, and automatically stores the data details in the storage server.

In this example, the high-value added data 526 and the care-taking data 527 including personal information are distinguished from each other. However, also when the high-value added data 526 and the care-taking data 527 are combined, separate files are prepared.

When data pieces have no difference in update frequency or access frequency, these data pieces may not be divided in the hierarchy of the storage server.

Thus, personal information management and expense control that are useful in file management can be reliably and speedily processed also for massive amounts of data.

Mixing data pieces with different charges or data involving strict personal information management with other data may cause other cloud processing, such as checking each piece of data, or removing or selecting the relevant data at the time of use. For big data, the data management scale is enormous, and the costs for processing these data pieces increase enormously. This file format optimizes the costs.

Figure 65:
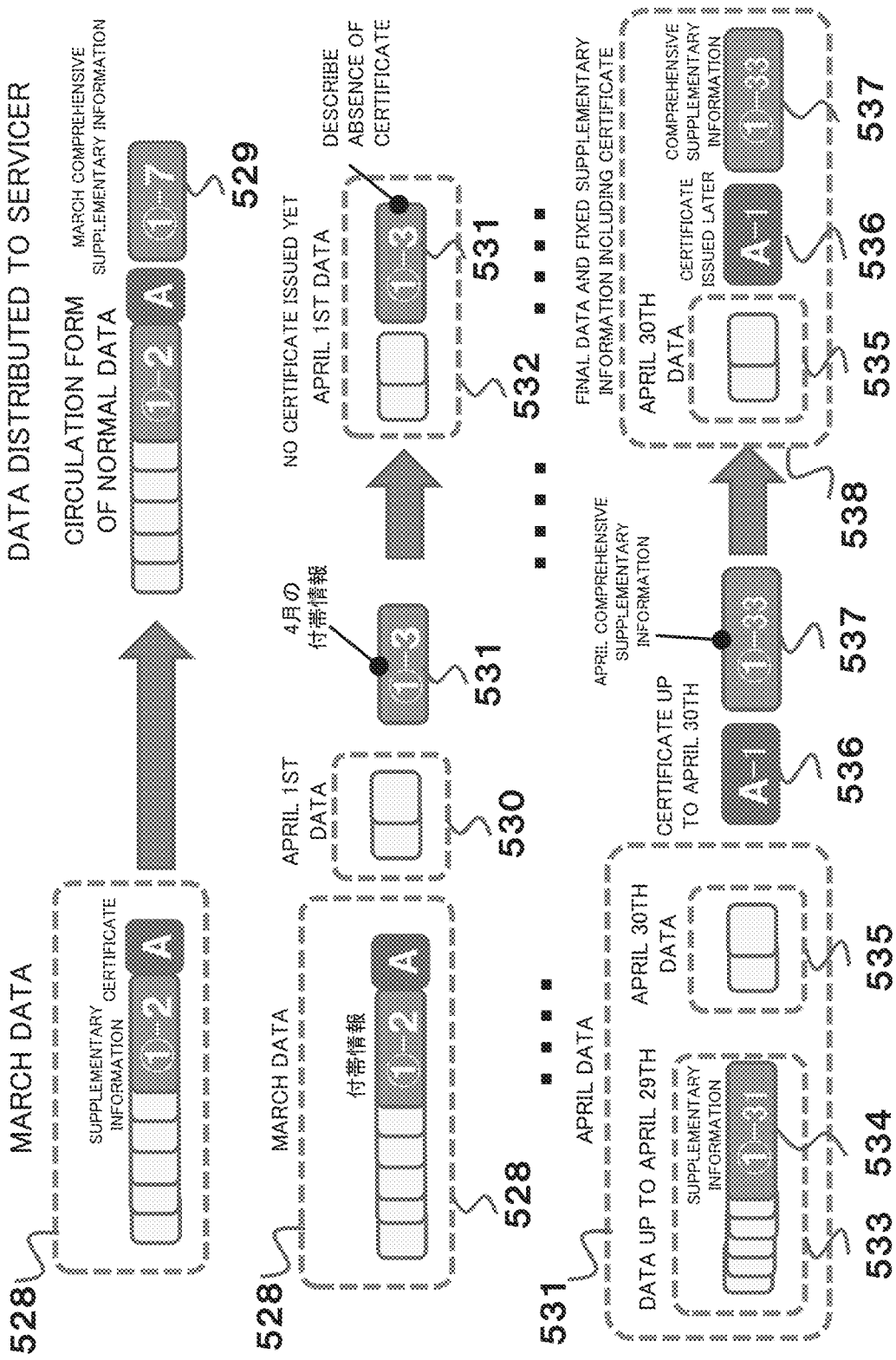
FIG. 65 is a diagram of distribution of real-time update data.

FIG. 65 is a diagram of distribution of real-time update data. Data used for energy management may involve, for example, information circulation per 30 minutes for energy management. For information used in a monitoring service that involves constant monitoring such as power data, real-time data circulation is to be used.

To attach a data certificate to such data, checking data authenticity and issuing the certificate are not easily performed in real time. Thus, for example, a certificate for monthly data may be issued at the end of the month to authorize the monthly data later.

For example, in FIG. 65, March data 528 is distributed to the servicer 55 while March comprehensive supplementary information 529 is attached to collective data including a certificate, but a certificate for April-first data 530 is not issued yet.

In distributing data with a certificate not issued, comprehensive supplementary information 531 describes the absence of a certificate, and describes, on a schema including the certificate, information indicating that data including the past data is certified after the certificate is issued at the end of the month.

Thus, comprehensive supplementary information 537 for data with a certificate issued at the end of the month serves as, for example, a schema that describes all the details of the month covered by the certificate.

April-thirtieth data 535, an April certificate 536 issued later, and the comprehensive supplementary information 537 are collectively transmitted to the servicer 55. When massive amounts of data are distributed, for example, when data is distributed from all the houses in a specific community, distributing data including past data every time increases the data cost. Thus, the data 535 on each current day is distributed alone.

The comprehensive supplementary information 537 specifically describes the coverage of the appended certificate 536, that is, a certified range ID for data transmitted in the past (an ID of data started to be certified and an ID of data finished to be certified), the certified period (certification start date and certification expire date), or IDs of all the certified files.

When past data is circulated further, the data provider and a servicer, or a receiver, confirm the data based on comprehensive supplementary information for the data with the certificate. Thus, IoT data for the corresponding period can be circulated.

With this particular operation, real-time data can be distributed, and a certificate can be acquired or issued with a certain interval after the distribution.

Figure 66:
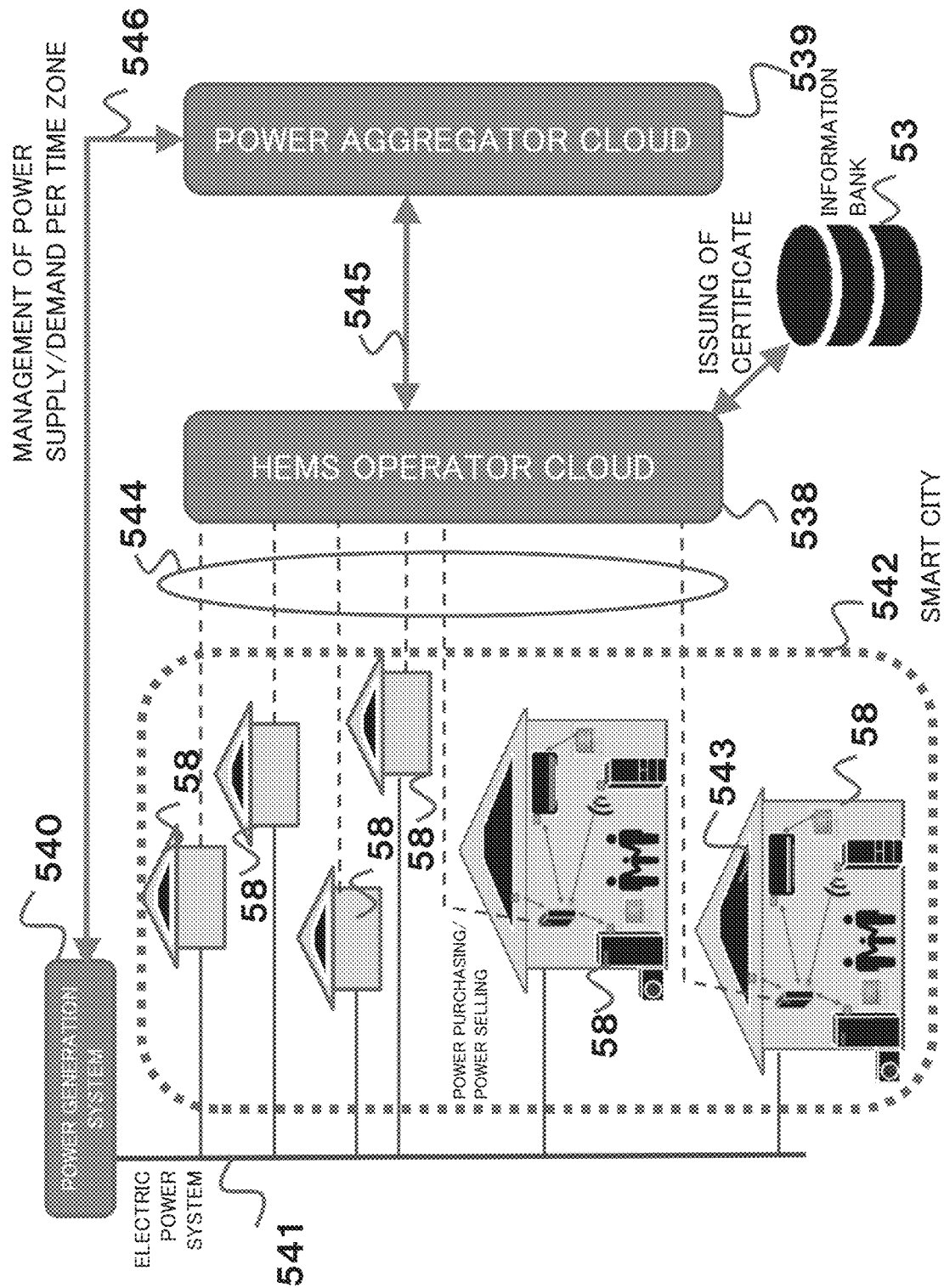
FIG. 66 is a diagram of a service example using real-time data.

FIG. 66 is a diagram of an example service using real-time data. An example shown in FIG. 66 involves a town power management system performed in a smart city 542 by a cloud 538 of a HEMS operator and a cloud 539 of a power aggregator through distribution of real-time data.

A solar power system 543 is installed at each household 58 in the smart city 542. Real-time data such as power consumption data at each house and an electricity output and an amount of electricity sold at the solar power system 543 is uploaded, for example, every 30 minutes. Smart household appliances (including the solar power system 543) at each household 58 are controlled via, tier example, a HEMS controller, by the cloud 538 of the HEMS operator to provide energy saving management and a life support service at each household 58.

In the operator that operates such a HEMS system, power information per 30 minutes at each household 58 is uploaded on the cloud 538. This real-time data 545 is distributed to the cloud 539 of the power aggregator. The power aggregator thus optimally operates a power generation system 540 of a power producer while performing, power supply and demand management. Thus, the entire energy management of the smart city 542 is implemented.

The power aggregator instructs the HEMS operator cloud through the cloud 539 to control a thermal storage device such as a water heater, to level out the power generation, such as to boil water with the water heater in the daytime. When large dump power is generated through solar power generation.

The output of the power generation system 540 is typically adjusted while the operation state of the power generation system 540 and the power generation state of the solar power system 543 are checked in real time.

When power supply and demand are in a difficult situation, the HEMS system may instruct energy saving setting.

These HEMS systems may be served by multiple operators in the same area. Thus, data uniformized with a standard format may be distributed to the power aggregator cloud 539 without developing individual interfaces or matching specifications to each other.

In particular, on the scale of a smart town, power data has a massive size, and includes information relating to personal information such as power consumption at each household 58 or operation states of the devices. In handling such data, the data may undergo a distribution data audit of the information bank 53 and receive a data certificate.

Thus, although a time lag is caused by the above distribution procedure of real-time data, periodically receiving data certification can minimize information accidents.

Figure 67:
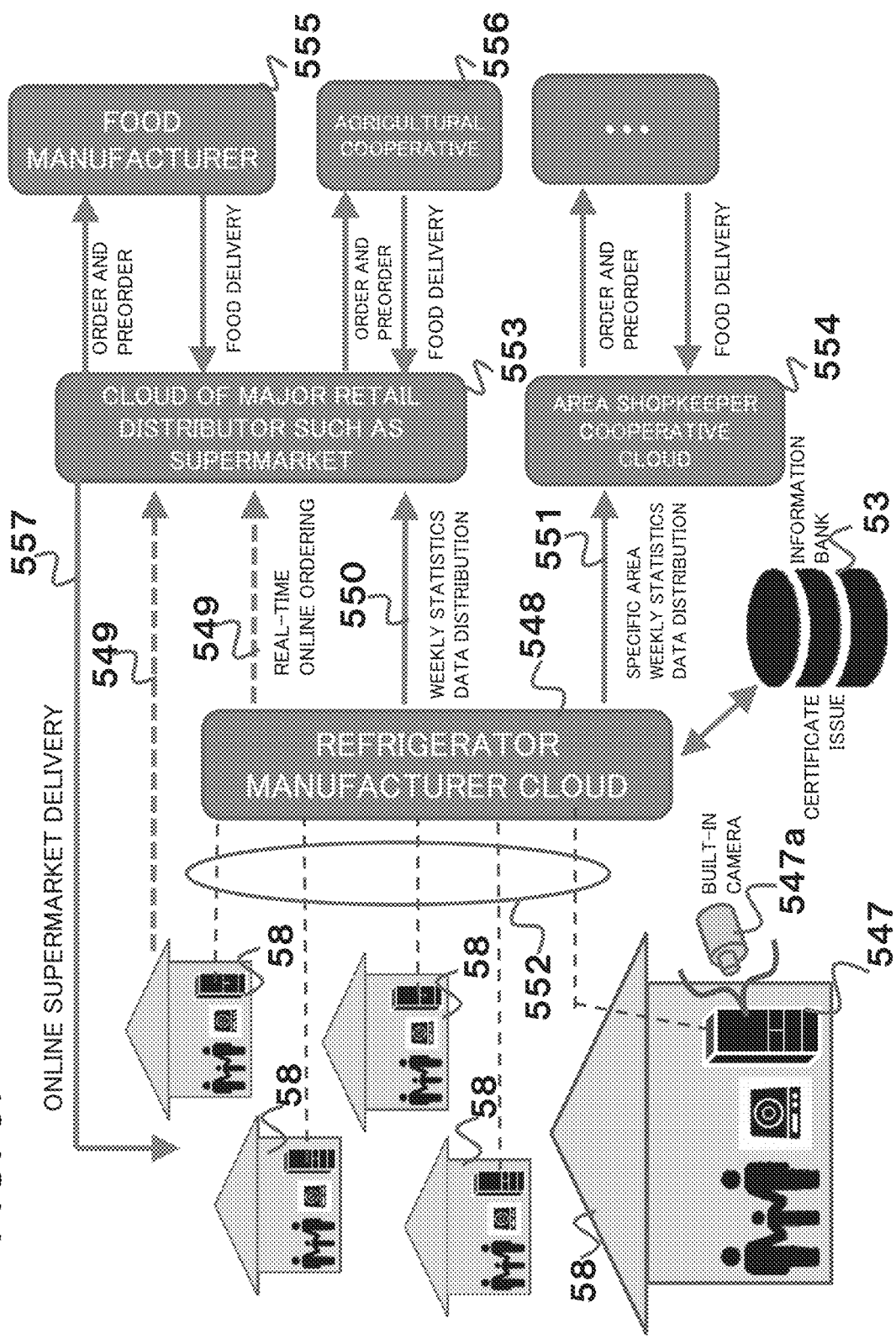
FIG. 67 is a diagram of a service example using accumulated data.

FIG. 67 is a diagram of a service example using accumulated data. When a device that stores foods such as a refrigerator 547 becomes smarter, for example, the following service can be implemented: a camera 547*a* installed in the refrigerator 547 photographs the food states inside, and transfers the photographs to a smartphone for enabling the states to be checked remotely.

Such a system is connected to a household-appliance management manufacturer cloud 548 operated by a refrigerator manufacturer. Within the manufacturer cloud 548, the system can identify the food details (e.g., five apples, three cucumbers, two beer bottles, one cabbage, one bottle of soy source, and one carton of milk) from food image information 552 through, for example, image recognition, and can generate data indicating the food details.

The manufacturer cloud 548 that manages refrigerator information about each house constantly receives updates of food inventory information at each house. Statistically processing this information enables accumulation and acquisition of big data including the types of food purchased and consumed and highly consumed food materials or products from specific manufacturers.

Such pieces of big data may be aggregated in each area from data in the houses including the refrigerator of the specific manufacturer, and distributed weekly to a supermarket cloud 553 or a shopkeeper cooperative operation cloud 554 in the area. The supermarket or shopkeepers can thus place orders, in advance, a food manufacturer 555 or a producer such as an agricultural cooperative 556 to suit consumer tastes or preferences of food in relation to the season, timing, or area. Thus, the supermarket or shopkeepers can manage food storage or place orders without missing the circulation timing of seasonal foods.

For example, the supermarket or shopkeepers can capture a sign of an increase in purchase of a specific product, and prepare the product in advance.

Such systems work with an online supermarket system for, for example, same day delivery through real-time ordering. On a product selection screen within a smartphone application or a personal computer (PC) application in online supermarket purchase ordering, products that are increasingly being sold may be preferentially displayed to further enhance sales together with enhancement of preparing the products in advance.

Data distributed from the manufacturer cloud 548 to the supermarket cloud 553 or the area shopkeeper cloud 554 includes information relating to personal information such as refrigerator food information. Thus, the details of such distribution data are audited by the information bank 53, and the data is transmitted together with a certificate attached to the data. When the data is statistical data, the data is not real-time data. When the data receives a certificate for every transmission, the data does not fall within real-time data in FIG. 65. However, when data is transmitted weekly but receives a certificate monthly, the data is treated as real-time data in FIG. 65.

Figure 68:
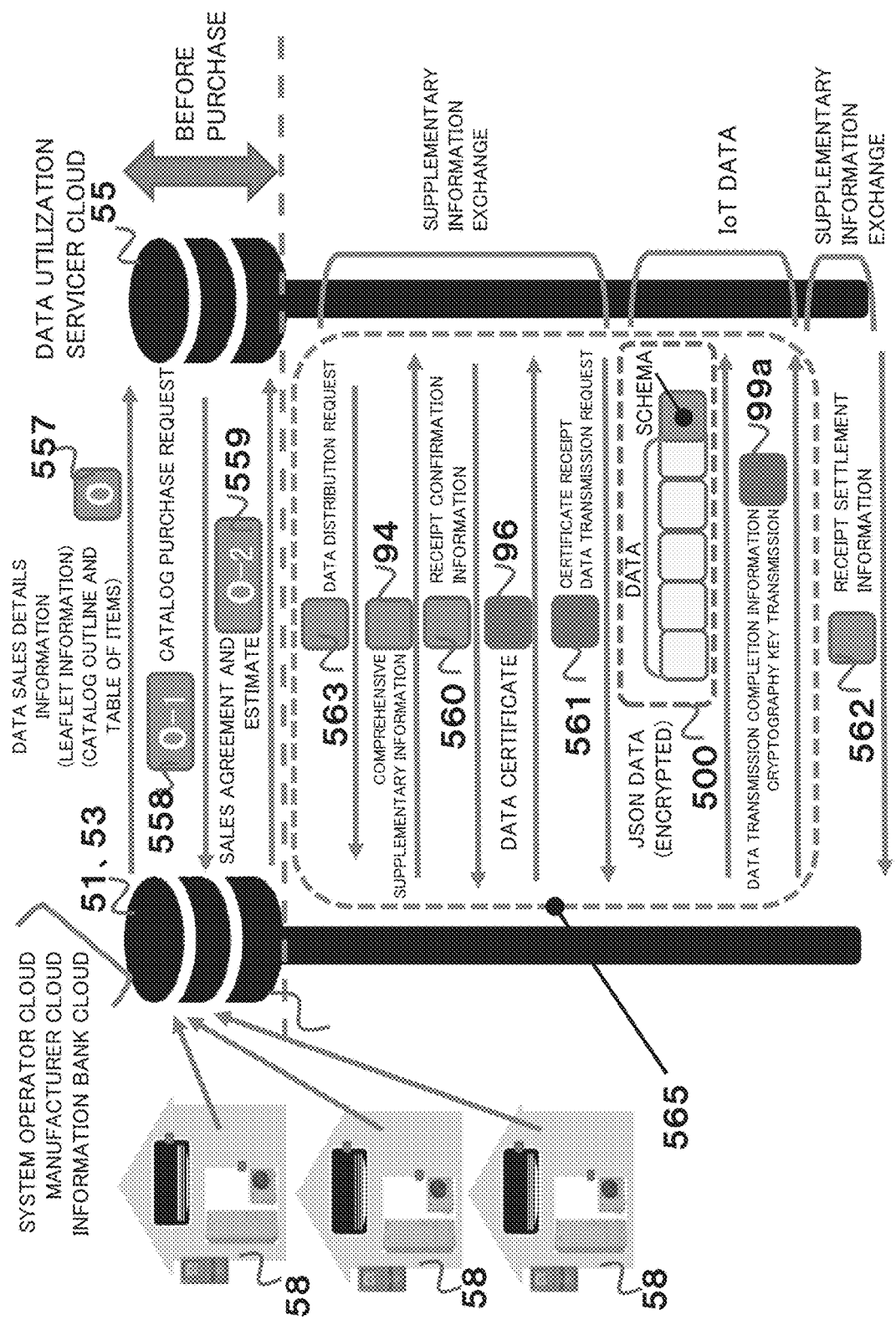
FIG. 68 is a diagram of a data file communication protocol.

FIG. 68 is a diagram of a data file communication protocol. Information exchange between the clouds of the information bank 53 and the data provider 51 such as a manufacturer and the cloud of the servicer 55 can be divided into exchange before data sales and exchange after the sales (contract) settlement.

Before data sales, leaflet information such as table details information indicating the details of catalog information is to be provided for browsing in the data circulation market. Leaflet information 557 describing information about the data sales details is first provided to the data circulation market.

Thereafter, after browsing the leaflet information 557, the servicer 55 issues a catalog purchase request 558 for the data provider 51.

A data sales agreement and an estimate 559 are issued, thus completing a purchasing contract before actual data distribution. The information before purchase is also exchanged in a file format of, for example, the JSON schema. Thus, the details can be matched together with description of comprehensive supplementary information (described later).

After the data sales settlement, the servicer 55 first transmits a data distribution request 563. Then, the manufacturer cloud transmits the comprehensive supplementary information 94. Upon receipt of receipt confirmation information 560, the manufacturer cloud transmits the certificate 96. After confirming a certificate receipt/data transmission request 561, the manufacturer cloud transmits an encrypted IoT data body 500 (including JSON or supplementary information in the JSON schema).

Thereafter, the manufacturer cloud transmits the cryptography key 99*a* of the above encrypted data, and the servicer 55 finally returns receipt settlement information 562. Thus, a series of data exchange may be finished.

The data certificate may be encrypted and transmitted together with the IoT data body. Instead, comprehensive supplementary information and a certificate may also be collectively transmitted in an encrypted file 565. This method can eliminate the procedure of confirmation with the servicer.

Such a collective operation has many advantages for facilitating concurrent data circulation, such as omission of a sequence between the manufacturer cloud and the servicer cloud and simplification of the procedure into three types of processing including before-sales processing, data transmission, and receipt settlement.

In particular, in data circulation, entire system simplification involves no management on the state such as a session based on the idea of a representational state transfer (REST) API. However, leaving confirmation and settlement protocols relating to trading alone is efficient and safe for the entire system.

Figure 69:
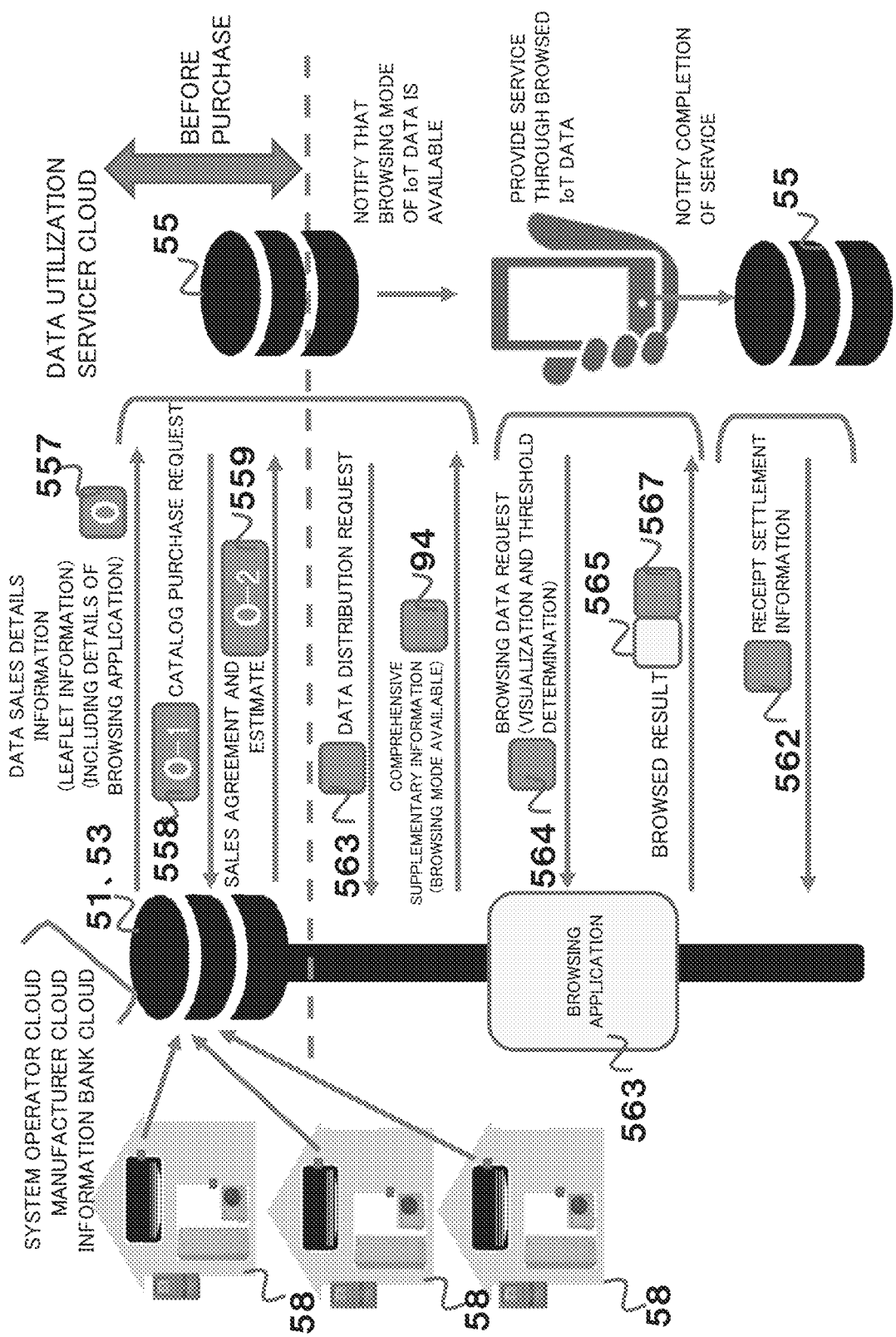
FIG. 69 is a diagram of a data file communication protocol when a data provider has an application.

FIG. 69 is a diagram of a data file communication protocol when a data provider has an application. In this example, IoT data has a large scale, and the cloud of the servicer 55 has a storage of a small capacity. When a service application of the servicer 55 is implemented on a smartphone, supplementary information that simply includes flag information indicating whether the servicer can handle actual IoT data by accessing the cloud of the data provider 51 as appropriate is transmitted to the servicer 55. Thus, the servicer 55 can access the cloud of the data provider 51 after checking the flag, and can provide the service without downloading all the pieces of :EDT data into the storage server of the servicer 55. This application can visualize IoT data or enables determination as to whether the data exceeds a certain threshold.

The leaflet information 557 browsed by the servicer before the servicer purchases data describes the application details that can be performed by the cloud of the data provider 51, such as data visualization or threshold determination, and the servicer determines purchase based on the details of the application. In real service activation, when schema information from the manufacturer cloud includes a flag indicating that a browsing mode is available, the servicer cloud notifies the smartphone application within the servicer cloud that the browsing mode is available, and transmits, through the smartphone, a schema requesting to browse data within the manufacturer cloud.

The browsing data request includes visualization of IoT data including the service details (e.g., a graph of power consumption, or a graph of use frequency of a device), data conversion or determination, such as threshold determination (e.g., whether the temperature exceeds a set temperature), and displaying, on a smartphone, the browsing results acquired from the browsing application installed on the manufacturer cloud or using the browsing results for determination. Thus, memory space of the smartphone application can be saved.

Figure 70:
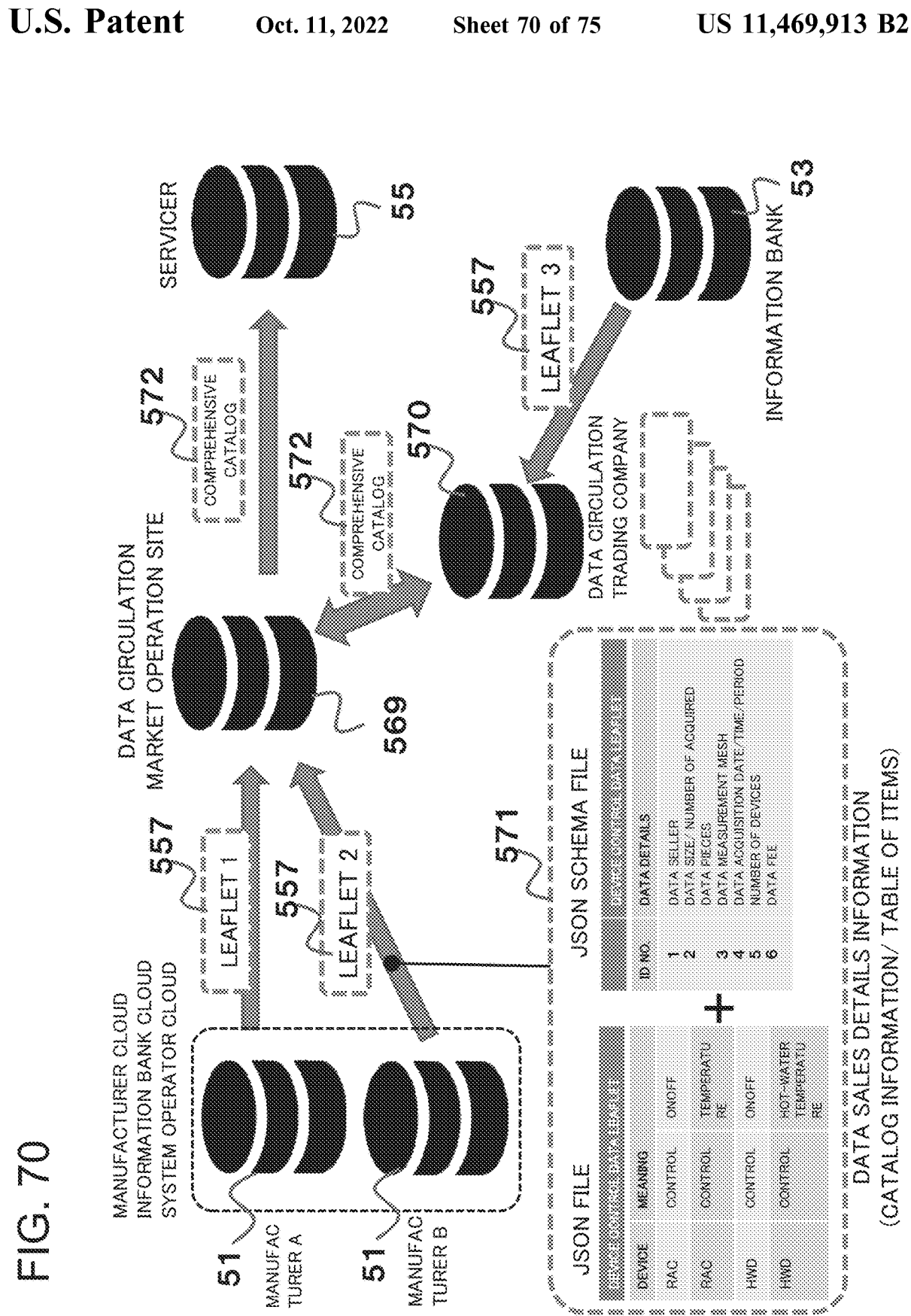
FIG. 70 is a diagram of IoT leaflet information before data circulation.

FIG. 70 is a diagram of IoT leaflet information before data circulation. Leaflet information browsed before sales in IoT data circulation is visualized information in the form of a typical advertisement document. Leaflet information may first be spread in the market in the JSON or the JSON schema that describes the items of a catalog.

For example, the leaflet information 557 described in this schema is used to integrate table details information pieces in the leaflet information from the clouds of the multiple data providers 51 and thus to generate new comprehensive catalog information 572. Thus, a data circulation market operation site 569 or a data circulation trading company 570 having the function of a data circulation trading company can operate a market on a data sales site using the data comprehensive catalog 572.

Leaflet information 571 lists some or all of cataloged data providers, the data size, the number of acquired data pieces, a measurement mesh, an acquisition period, the device type, the number of devices, and price information, and is spread on the data circulation market operation site 569. Although information disclosed in advance from the data provider 51 may be partially missing, the leaflet information 571 can manage the information with part or all of the details on the list or the numbers attached to the details. Thus, the comprehensive catalog 572 can be formed easily.

The comprehensive catalog 572 eliminates the work of the servicer 55 for searching for the individual data providers 51 to collect intended information. In addition, the comprehensive catalog 572 in, for example, the visualized form created by a data circulation trading company or a data market operation site is effective in promoting data sales to the servicer 55. When the comprehensive catalog 572 includes a collection of data pieces from multiple manufacturers' clouds, a circulation trading company can provide data pieces categorized by device, meaning, or characteristics as main business of the circulation trading company.

Figure 71:
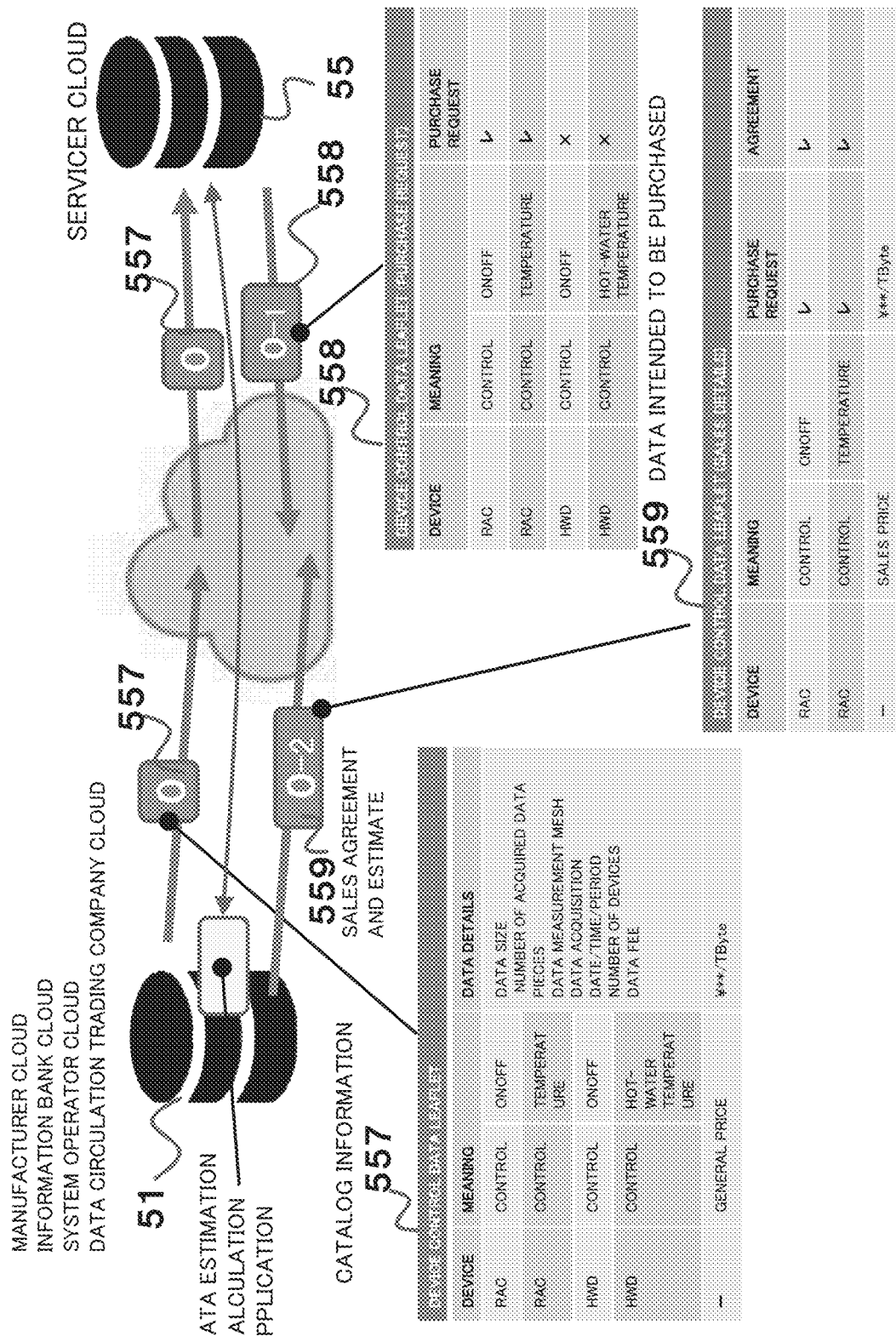
FIG. 71 is a diagram of purchase requests and sales details information before data circulation.

FIG. 71 is a diagram of purchase requests and sales details information before data circulation. The IoT leaflet information 557 does not include real data, and typically provides, in the leaflet form basic information such as catalog information, a table of items, a data quantity, an acquisition period, or a mesh. For example, the IoT leaflet information 557 does not include actual data such as temperature information or power data, but includes information used for data trading.

Thus, the details of data, such as a device from which data is output, whether the data is control information or state information, or the sales price of the data are exchanged before real data is provided.

Data may be priced based on the number of device IDs, update frequency, data accuracy, or simply, transmission data bytes. From the IoT data leaflet information disclosed on the market, the servicer 55 or a purchaser may select intended data, the estimate for data may be calculated, and the sales price may be finally agreed by both parties.

Examples of an estimation method include a method of implementing, on the seller cloud, an application program of Web-based automatic calculation, and allowing a servicer for using data to access this estimation system to check the price.

After checking the leaflet information 557, the servicer 55 distributes purchase request information 558. The purchase request information 558 is description of requested or non-requested data pieces in the leaflet information. Each data piece includes information indicating whether a purchase is requested.

For example, a remarks column may be additionally filled with a request for information other than the leaflet information 557 or a request for update frequency or rounding of data (such as averaging).

Based on the purchase request information 558, the data provider transmits confirmation on sales details and the estimate information 559. Agreement or disagreement is described on the data catalog.

Defining a standard format also in such settlement enables many data providers 51 and servicers 55 to trade data through a standard trading application.

FIG. 72 is a diagram of table details for supplementary information about IoT data. This table information is described in a language such as the JSON, the JSON schema, or the XML, and described in a URL used as an ID number within the cloud.

The table details include an ID of the supplementary information, a file format, a data storage link ID, a lower-hierarchy supplementary information link ID, file distribution frequency, with or without encryption, an encryption type, a data distributor, a data processor, an original-data supplier manufacturer, presence/absence of a certificate, a certifier such as an information bank, a data size, data processing history, data processing details, data update frequency, a data seller, a data acquisition period, a data distributing device, and data catalog details. The supplementary information clarifies the type of data pieces that are to be distributed.

In particular, description of the data processing details clarifies the processing details per, for example, meaning, device, time, or area. In addition, based on the data catalog details or update frequency information, the data can be automatically sorted and stored into appropriate storage hierarchies described above.

The number of data distributing devices, the data size, the acquisition period, and a certificate are information relating to the data sales value besides the data size, and thus are to be provided to the servicer.

FIG. 73 is a diagram of table details for data leaflet information. The table corresponds to the data leaflet information 557 before data sales, and includes the data size, data processing history, data processing details, data update frequency, data catalog details, a data distribution device, presence/absence of a data certificate, a file format, a data browsing mode, an intended data sales price, an attached file ID, and attached file details.

This information is not circulation data, but an extract of information used by the servicer 55 for purchase evaluation, and excludes the details of the items that are to be concealed by the data provider 55.

When these items are circulated as standard leaflet information in the data circulation market, all the servicers can check data from the same viewpoint, or automatically determine purchase with an application for purchase evaluation.

In particular, when a service is provided with information pieces from many data providers 51, these leaflet information pieces are to be standardized. As the providers or purchasers increase further, the needs of automatic purchase through a purchase application increase.

The leaflet information 557 describes an attached file ID and the details of the attached file. An attached file 564 following the leaflet information 557 includes attached information such as examples of use of the data or a method of using the browsing mode. The servicer drafts and executes a service based on the data details of IoT data. However, providing some examples of use from a data provider that knows the device characteristics well may expand the data market circulation. Thus, such description other than the data details may be Included. The data structure that may be disclosed is written in the examples of use. The data structure is a piece of information, and thus will not be described in the leaflet in principle.

In particular, a small-scale service provide such as a shop or an individual running a business may be unfamiliar with the use of data well. Directly attaching examples of use or instructions in use of texts, pictures, photos, or videos in a file format or describing a URL of a data provider that describes these examples enables more users to perform data circulation trading.

FIG. 74 is a diagram of table details for comprehensive supplementary information 94. The front portion of the table is the same as the portion in the data leaflet information 557 before data sales, and includes an ID of the file, a data size, data processing history, data processing details, data update frequency, data catalog details, a data distributing device, presence/absence of a data certificate, a file format, a data browsing mode, and an intended data sales price.

In addition, information following the leaflet information 557 describes a data structure (including hierarchies), the location of the file, file distribution frequency, with or without encryption, an encryption type, a data distributor, a data processor, an original-data supplier manufacturer, a certifier, a data file ID, and a data estimate. This information and the leaflet information 557 constitute the comprehensive supplementary information 94. The comprehensive supplementary information 94 is attached after sales, and supplementary information can be updated without a certificate. The comprehensive supplementary information is checked by the servicer 55 as to, for example, whether the leaflet remains unchanged from the leaflet before purchased, or the leaflet is corrected through, for example, subsequent negotiations. This checking process may be automatized with an application of the servicer 55.

The comprehensive supplementary information is data that allows addition or correction after undergoing encryption processing or certificate acquisition. Thus, the comprehensive supplementary information describes information such as the file location, the distributor, and prices.

FIG. 75 is a diagram of the details of the comprehensive supplementary information table to indicate description of the data structure. In particular, when IoT data is structured into multiple files, description on the structure is to be included. When the file including the comprehensive supplementary information is included in the entire structure, the presence or absence of an upper hierarchy above this file is described, and the entire structure including the upper hierarchy is described in comprehensive supplementary information about the further upper hierarchy.

For example, this drawing shows an example of data structured with different update frequencies and different sales prices while being categorized into three files of a first hierarchy, a second hierarchy, and a third hierarchy.

Entire data structure (including hierarchies): three hierarchies categorized by update frequency+categorized by price Present file location: uppermost hierarchy data file File 1 (ID: **): first hierarchy (high update frequency)+ for free File 2 (ID: ): second hierarchy 1 (intermediate update frequency)+¥100/T File 3 (ID: ): second hierarchy 2 (intermediate update frequency)+¥200/T File 4 (ID: **): third hierarchy (low update frequency)+ ¥500/T The comprehensive supplementary information table describes the entire structure and the location of each IoT data file in the entire structure.

However, particularly when a personal information file is separately located, the entire data structure may be treated as secret information. To simply show the hierarchical structure of distributed data the hierarchy of the file and all the data pieces to be distributed in the same hierarchy, and the hierarchical structure of the distributed data set hanging from the hierarchy are described in the comprehensive supplementary information. The structure of the portion not distributed and on the upper hierarchy above the hierarchy and the portion not distributed on the same hierarchy and lower hierarchy are concealed.

Also, when data on the upper hierarchy above the hierarchy is to be distributed, the comprehensive supplementary information simply describes as to whether the data on the upper hierarchy is distributed without describing the details or the hierarchical structure to conceal the structure.

Particularly after receiving the data, the servicer may divide the data to provide the divided data to another servicer. The information about the upper hierarchy structure is not described in the comprehensive supplementary information about the lower hierarchy to prevent transmission of the structure information.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2018-157582, filed on Aug. 24, 2018, the entire disclosure of which is incorporated by reference herein.

REFERENCE SIGNS LIST

1 Data circulation system
10 Data collection server
11 Storage server
12 Personal information storage
20 Data utilization server
21 Storage server
22 Personal information storage 30 Device
40 Constructor server
50 Certification server
100 Communicator
110 Controller
120 Storage
200 Communicator
210 Controller
220 Storage
300 Communicator
310 Controller
320 Storage
1101 Meaning i den tiller
1102 Use frequency estimator
1103 Supplementary information generator
1104 Data saver
1105 Retrieving condition determiner
1106 Data retriever
1107 Comprehensive supplementary information generator
1108 Catalog generator
2101 Data requester
2102 Data saver
3101 Device data generator
3102 Meaning identifier
3103 Use frequency estimator
3104 Supplementary information generator
8000 Bus
8001 Processor
8002 Memory
8003 Interface
8004 Secondary storage
NT Internet

The invention claimed is:

1. A data collection server, comprising:
a processor coupled to a memory and configured to:
receive device data from a device;
identify a meaning of the device data received by the processor based on a device type of the device indicated in the device data and based on details indicating device operation and/or device status of the device included in the device data,
estimate use frequency of the device data received by the processor as corresponding to the meaning identified by the processor; and
store the device data in, among a plurality of storage corresponding to different levels of use frequency, one of the plurality of storage that corresponds to the use frequency estimated by the processor.

2. The data collection server according to claim 1, wherein
the processor estimates the use frequency of the device data to be predetermined use frequency corresponding to the meaning which is identified.

3. The data collection server according to claim 1, wherein
the processor estimates the use frequency of the device data based on acquisition frequency of device data having the same meaning as identified by the processor.

4. The data collection server according to claim 1, wherein the processor is further configured to
receive, from the device, information about the use frequency associated with the device data, and
estimate the use frequency of the device data to be the use frequency indicated by the received information about the use frequency.

5. The data collection server according to claim 1, wherein the processor is further configured to
receive personal information associated with the device, and
store the personal information which is received in a personal information storage to store personal information.

6. The data collection server according to claim 1, wherein the processor is further configured to:
retrieve the device data stored in the one of the plurality of storage; and
transmit the device data which is retrieved and supplementary information including information about the use frequency of the device data to a data utilization server as circulation data.

7. The data collection server according to claim 6, wherein the processor is further configured to:
generate comprehensive supplementary information relating to a data set including a plurality of pairs of the device data and the supplementary information,
wherein the processor transmits the data set and the comprehensive supplementary information to the data utilization server as the circulation data.

8. The data collection server according to claim 7, wherein the processor is further configured to:
generate a sales catalog of the data set based on the comprehensive supplementary information,
transmit the sales catalog to the data utilization server,
receive a request for the circulation data corresponding to the sales catalog from the data utilization server, and
transmit the circulation data to the data utilization server in response to the request from the data utilization server.

9. The data collection server according to claim 6, wherein the processor is further configured to
transmit a request for certifying authenticity of the device data and information for certifying the authenticity to a certification server, and
receive a certificate certifying the authenticity of the device data from the certification server.

10. A data utilization server, comprising:
a processor coupled to a memory and configured to:
receive, from a data collection server, circulation data including device data acquired from a device and supplementary information including information about use frequency of the device data, wherein the supplementary information further includes information about a meaning of the device data based on a device type of the device indicated in the device data and based on details indicating device operation and/or device status of the device included in the device data; and
store the device data included in the circulation data received by the processor in, among a plurality of storage corresponding to different levels of use frequency, one of the plurality of storage that corresponds to the use frequency indicated by the circulation data.

11. The data utilization server according to claim 10, wherein
the circulation data further includes personal information associated with the device, and
the processor is further configured to store the personal information associated with the device and included in the circulation data which is received in a personal information storage to store personal information.

12. A device for communicating with a data collection server, the device comprising:
a processor coupled to a memory and configured to:
generate device data;

identify a meaning of the device data based on a device type of the device indicated in the device data and based on details indicating device operation and/or device status of the device included in the device data,
estimate use frequency of the device data generated by the processor as corresponding to the meaning identified by the processor; and
transmit, to the data collection server, the device data and supplementary information including information about the use frequency.

\* \* \* \* \*